(12) United States Patent
Wong et al.

(10) Patent No.: US 11,763,011 B2
(45) Date of Patent: Sep. 19, 2023

(54) ZERO TRUST COMMUNICATION SYSTEM FOR FREIGHT SHIPPING ORGANIZATIONS, AND METHODS OF USE

(71) Applicant: OOCL (Infotech) Holdings Limited, Hong Kong (HK)

(72) Inventors: Shun Hok Wong, San Jose, CA (US); Wei Ming Belinda So, Hong Kong (HK)

(73) Assignee: OOCL (Infotech) Holdings Limited, Hong Kong (HK)

( * ) Notice: Subject to any disclaimer, the term of this patent is extended or adjusted under 35 U.S.C. 154(b) by 0 days.

(21) Appl. No.: 17/837,990

(22) Filed: Jun. 10, 2022

(65) Prior Publication Data
US 2022/0318404 A1 Oct. 6, 2022

Related U.S. Application Data

(63) Continuation of application No. 17/397,315, filed on Aug. 9, 2021, now Pat. No. 11,361,088, which is a (Continued)

(51) Int. Cl.
*G06Q 20/00* (2012.01)
*G06F 21/60* (2013.01)
(Continued)

(52) U.S. Cl.
CPC ............ *G06F 21/602* (2013.01); *G06F 16/93* (2019.01); *G06F 21/6218* (2013.01);
(Continued)

(58) Field of Classification Search
CPC .... G06F 21/602; G06F 16/93; G06F 21/6218; G06F 21/64; G06F 2221/2141;
(Continued)

(56) References Cited

U.S. PATENT DOCUMENTS

| 6,112,190 A | 8/2000 | Fletcher et al. |
|---|---|---|
| 7,353,382 B2 | 4/2008 | Labrou et al. |

(Continued)

FOREIGN PATENT DOCUMENTS

| CN | 101821762 A | 9/2010 |
|---|---|---|
| CN | 104376445 B | 2/2015 |

(Continued)

OTHER PUBLICATIONS

First Office Action on TW Appl. No. 109106120, dated Jan. 14, 2021.

(Continued)

*Primary Examiner* — Dante Ravetti
(74) *Attorney, Agent, or Firm* — Foley & Lardner LLP

(57) ABSTRACT

Presented herein are systems and methods of securely sharing data from multiple sources with different client terminals. A server may establish an electronic document for defining a transaction. The electronic document may have data fields. Each data field may be from a client terminal. The server may identify encryption keys to encrypt the corresponding data fields included in the electronic document. The server may distribute the encryption keys across the client terminals in accordance with an access control policy. The access control policy may specify access permissions for a client terminal to each of the plurality of data fields based on a role of the client terminal in the transaction. The server may provide, to each client terminal with access to the data fields in the electronic document via the encryption keys distributed in accordance with the access control policy.

18 Claims, 37 Drawing Sheets

Related U.S. Application Data continuation of application No. PCT/US2020/019661, filed on Feb. 25, 2020, which is a continuation-in-part of application No. 16/501,399, filed on Apr. 6, 2019, now abandoned.

(60) Provisional application No. 62/919,097, filed on Feb. 25, 2019.

(51) Int. Cl.

| | | |
|---|---|---|
| *G06Q 10/083* | (2023.01) | |
| *H04L 9/30* | (2006.01) | |
| *G06F 16/93* | (2019.01) | |
| *H04L 9/14* | (2006.01) | |
| *H04L 9/32* | (2006.01) | |
| *G06F 21/62* | (2013.01) | |
| *G06F 21/64* | (2013.01) | |

(52) U.S. Cl.
CPC ........... *G06F 21/64* (2013.01); *G06Q 10/083* (2013.01); *H04L 9/14* (2013.01); *H04L 9/30* (2013.01); *H04L 9/3242* (2013.01); *G06Q 2220/10* (2013.01)

(58) Field of Classification Search
CPC ............... G06F 21/606; G06F 21/6227; G06F 21/6245; G06F 2221/2107; G06Q 10/083; G06Q 2220/10; H04L 9/14; H04L 9/30; H04L 9/3242; H04L 9/50
USPC .................................. 705/16, 21, 59; 380/44
See application file for complete search history.

(56) References Cited

U.S. PATENT DOCUMENTS

| | | | |
|---|---|---|---|
| 7,463,738 | B2 | 12/2008 | Nii |
| 7,484,245 | B1 | 1/2009 | Friedman et al. |
| 7,587,608 | B2 | 9/2009 | Haller et al. |
| 7,685,645 | B2 | 3/2010 | Doyle et al. |
| 7,840,487 | B2 | 11/2010 | Hatano et al. |
| 7,917,771 | B2 | 3/2011 | Forlenza et al. |
| 8,001,370 | B2 | 8/2011 | Kamijo |
| 8,176,004 | B2 | 5/2012 | Malaney et al. |
| 8,307,427 | B1 | 11/2012 | Wisilosky et al. |
| 8,473,740 | B2 | 6/2013 | Vion-Dury |
| 8,539,606 | B2 | 9/2013 | Zhang |
| 8,542,823 | B1 | 9/2013 | Nguyen et al. |
| 8,543,827 | B2 | 9/2013 | Garcia et al. |
| 8,769,270 | B2 | 7/2014 | Orsini et al. |
| 8,798,272 | B2 | 8/2014 | Cross et al. |
| 8,924,724 | B2 | 12/2014 | Johnson et al. |
| 9,031,876 | B2 | 5/2015 | Mittal et al. |
| 9,407,440 | B2 | 8/2016 | Roth et al. |
| 9,866,375 | B2 | 1/2018 | Reilly et al. |
| 9,984,006 | B2 | 5/2018 | Amarendran et al. |
| 10,033,702 | B2 | 7/2018 | Ford et al. |
| 10,242,217 | B1 | 3/2019 | Leavy et al. |
| 10,530,580 | B1 | 1/2020 | Walker |
| 10,554,635 | B2 | 2/2020 | Lim et al. |
| 2004/0103147 | A1 | 5/2004 | Flesher et al. |
| 2010/0031021 | A1 | 2/2010 | Arnold et al. |
| 2010/0158254 | A1 | 6/2010 | Schaad et al. |
| 2010/0217987 | A1 | 8/2010 | Shevade |
| 2011/0016318 | A1 | 1/2011 | Syngkon et al. |
| 2013/0031366 | A1 | 1/2013 | Simske et al. |
| 2014/0006244 | A1 | 1/2014 | Crowley et al. |
| 2014/0156513 | A1 | 6/2014 | Psota et al. |
| 2018/0005186 | A1 | 1/2018 | Hunn |
| 2018/0018723 | A1 | 1/2018 | Nagla et al. |
| 2018/0089758 | A1 | 3/2018 | Stradling et al. |
| 2018/0130050 | A1 | 5/2018 | Taylor et al. |
| 2018/0276777 | A1 | 9/2018 | Brillinger |
| 2018/0322587 | A1 | 11/2018 | Linne |
| 2019/0012637 | A1 | 1/2019 | Gillen |
| 2020/0311670 | A1* | 10/2020 | Sankaran ............... H04W 4/024 |

FOREIGN PATENT DOCUMENTS

| | | |
|---|---|---|
| JP | 4005619 B2 | 11/2007 |
| TW | 201040857 A | 11/2010 |
| TW | 201812674 A | 4/2018 |
| TW | 201814511 A | 4/2018 |
| WO | WO-01/84271 A2 | 11/2001 |
| WO | WO-2017/090041 A1 | 6/2017 |

OTHER PUBLICATIONS

Guifen Zhao et al.: "Scheme For Digital Documents Management In Networked Environment" Proceedings of IC-NIDC2009; Nov. 2009; 4 pages; Beijing, China.

International Preliminary Report on PCT/US2020/019661, dated Aug. 25, 2021 (9 pages).

International Search Report and Written Opinion for PCT Appl. No. PCT/US2020/019661 dated Jun. 22, 2020.

U.S. Notice of Allowance on U.S. Appl. No. 17/397,315 dated Feb. 11, 2022.

Vivek N. Waghmare et al.: "Structured Signature Scheme for Efficient Dissemination of Tree Structured Data" 2014 Sixth International Conference on Computational Intelligence and Communication Networks; Mar. 2015; 8 pages; Nanded, India.

Extended European Search Report for EP Appl. No. 20762399.2, dated Oct. 11, 2022.

* cited by examiner

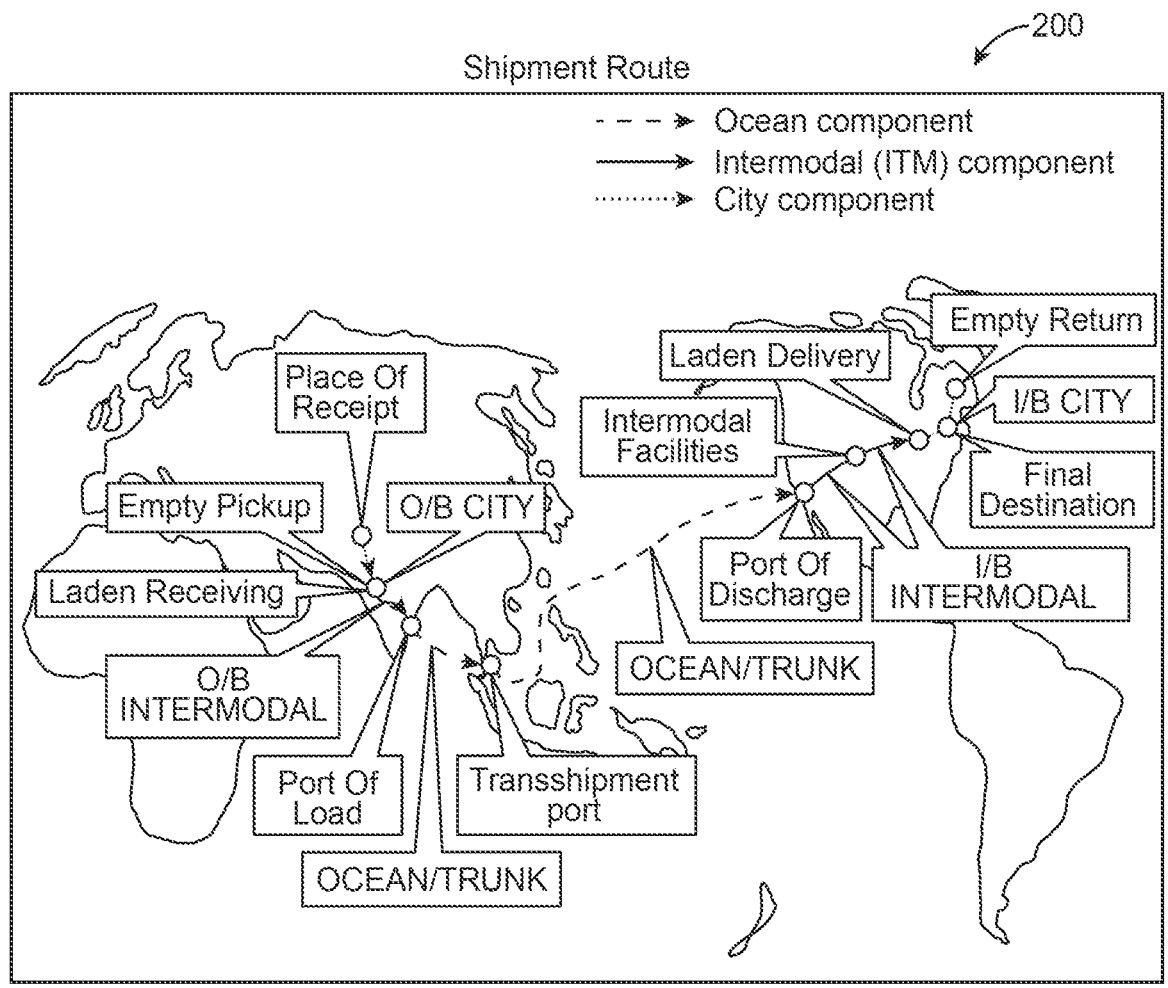
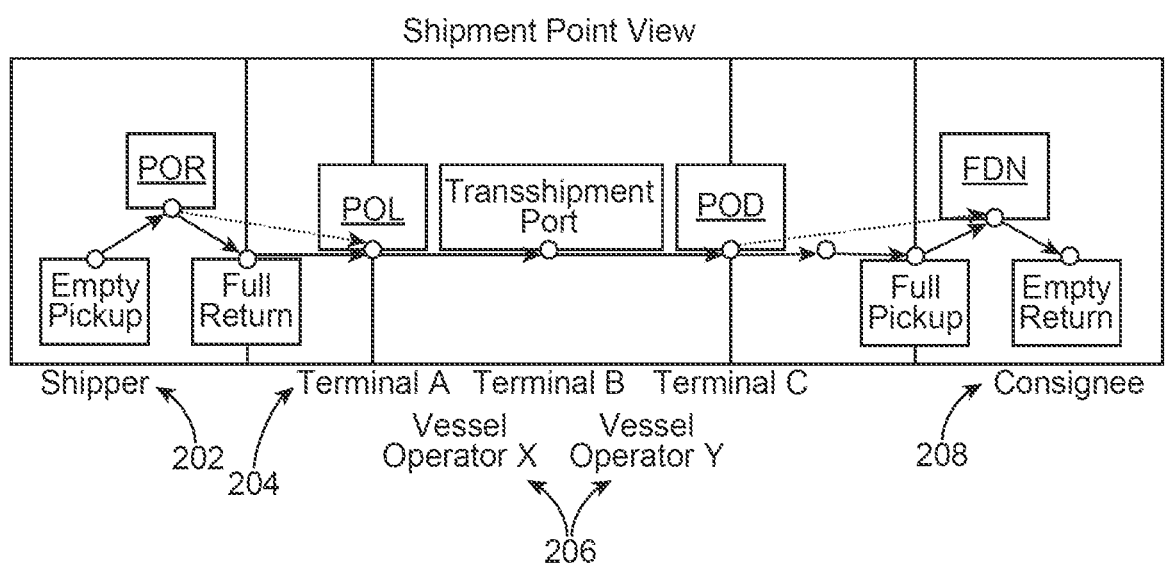
FIG. 2 ms [37]   No Pending Action Items (4)

| DATA PROVIDER BOOKING # | PENDING ACTION | ACTION BOOKING VERSION | ACTION DUE DATE | BOOKING STATUS | SHIPPER | FORWARDER |
|---|---|---|---|---|---|---|
| 19030726781243 | Review DG Application | 1 | 3d 18h 52m ago<br>Mar 8 2019 3:22am | New | Company A | Forward Inc |
| 19030726781243 | Upload DG Certificate | 1 | 23h 59m left<br>Mar 12 2019 11:15pm | New | Company A | Forward Inc |
| 19030726781236 | Submit DG Application | 1 | 3d 9h 48m ago<br>Mar 8 2019 12:26pm | New | Company B | Forward Inc |
| 19030726781236 | Upload DG Certificate | 1 | 23h 59m left<br>Mar 12 2019 11:15pm | New | Shipper 99 | Forward Inc |
| 19030726781233 | Submit DG Application | 1 | 4d 4h 4m ago<br>Mar 7 2019 6:11pm | New | Shipper 99 | Forward Inc |
| 19030726781233 | Upload DG Certificate | 1 | 23h 59m left<br>Mar 12 2019 11:15pm | New | Company B | Forward Inc |
| 19030626781311 | Submit DG Application | 1 | 4d 8h 22m ago<br>Mar 7 2019 1:52pm | New | Company A | Forward Inc |
| 19030534581375 | Review DG Application | 3 | 5d 18h 36m ago<br>Mar 6 2019 3:38pm | Confirmed | | |
| 19030526781911 | Review DG Application | 1 | 6d 2h 59m ago<br>Mar 5 2019 7:25pm | New | Shipper 23 | A Fore Ltd |
| 19030526781911 | Upload DG Certificate | 1 | 23h 59m left<br>Mar 12 2019 11:15pm | New | Shipper 99 | A Fore Ltd |
| 19022266781889 | Upload DG Certificate | 1 | 23h 59m left<br>Mar 12 2019 11:15pm | New | Company B | B Fore Ltd |
| 19022266781887 | Upload DG Certificate | 1 | 23h 59m left<br>Mar 12 2019 11:15pm | New | Company A | B Fore Ltd |
| 19022266781878 | Upload DG Certificate | 1 | 23h 59m left<br>Mar 12 2019 11:15pm | New | Company A | Forward Inc |

FIG. 10

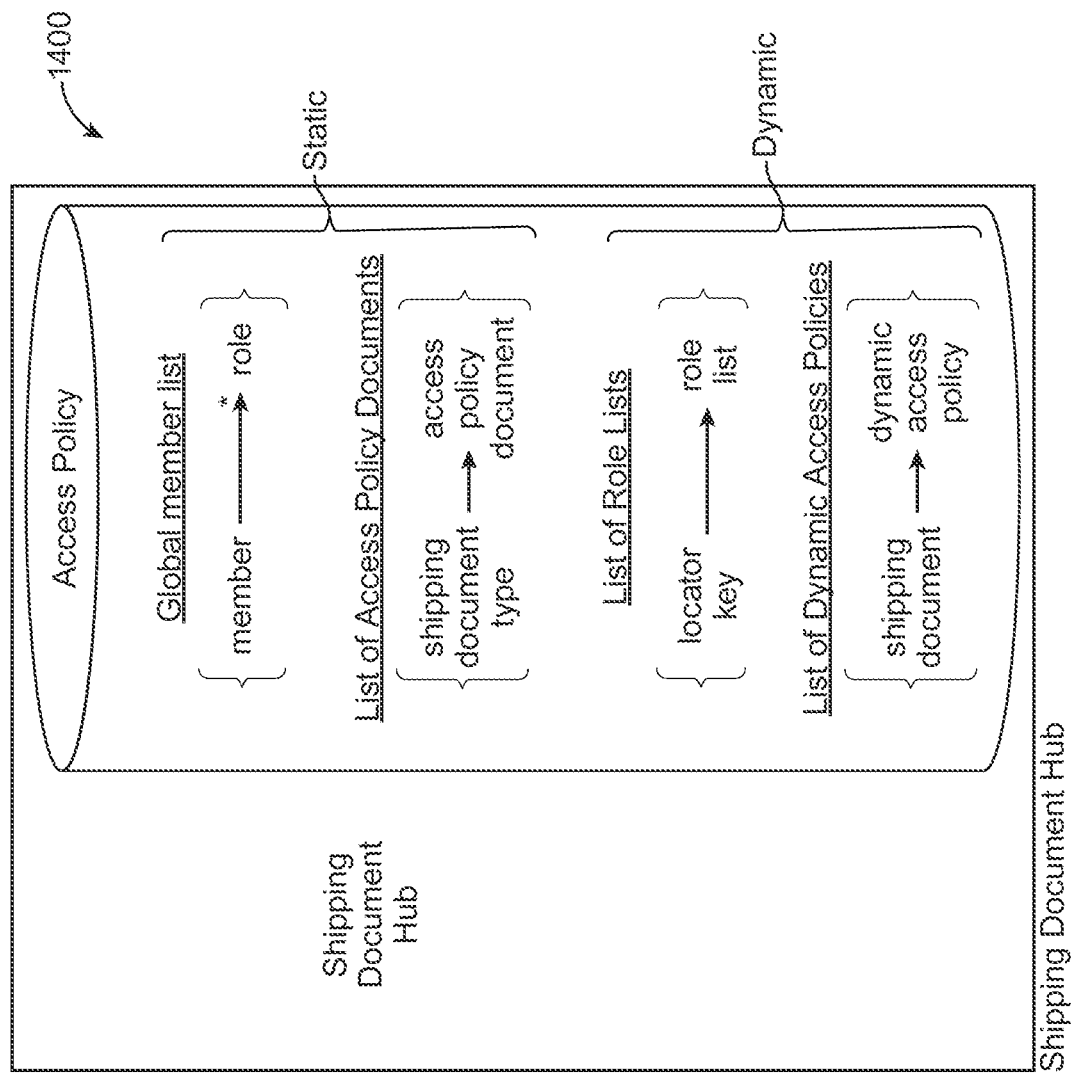
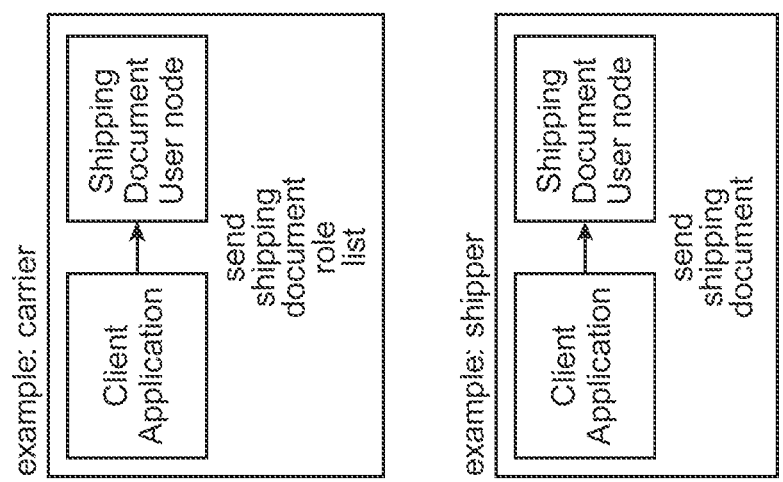
FIG. 14

Shipping Document Access Policy Role List Locator key for Gate out event — 1900

| Shipping Document Type | Role List Type | Locator Key Fields |
|---|---|---|
| Gate Out Event | Shipment Role List | Carrier, Booking Number |

1904 Static

Shipping Document Access Policy for gate out event Document — 1906

| Shipping Document Type | Shipper | Consignee | Carrier | Terminal Operator | Vessel Operator |
|---|---|---|---|---|---|
| Gate Out Event | R | R | R | CRUD | R |

Create (C) – create the digital asset
Read (R) – read the digital asset
Update (U) – update the digital asset
Delete (D) – logical delete the digital asset Shipping Document Access Policy for gate out event-Field Level — 1910

| Shipping Document Type | Field | Shipper | Consignee | Carrier | Terminal Operator | Vessel Operator |
|---|---|---|---|---|---|---|
| Gate Out Event | Container Number | R | R | RU | CRU | R |
| Gate Out Event | Container Size Type | R | R | RU | CRU | R |
| Gate Out Event | Equipment ISO Code | R | R | RU | CRU | R |
| Gate Out Event | UNLocode | R | R | RU | CRU | R |
| Gate Out Event | Event Date Time | R | R | RU | CRU | R |
| Gate Out Event | EventTimezone | R | R | RU | CRU | R |
| Gate Out Event | Seal Type | R | R | RU | CRU | R |
| Gate Out Event | Seal Number | R | R | RU | CRU | R |
| Gate Out Event | Reference Document Type | R | R | RU | CRU | R |
| Gate Out Event | Reference Document Number | R | R | RU | CRU | R |

Create (C) – create the value of the field
Read (R) – read the value of the field
Update (U) – update the value of the field Shipping Document — Shipping Document Container Gate Out Event from Terminal — 1902

| Header Field | Data Field |
|---|---|
| Event ID | 2348DI32328KU |
| Carrier | XYZ |
| Booking Number | 12345 |
| Container Number | OXLX6421234 |
| Container Size Type | 40RQ |
| Equipment ISO Code | 45R1 |
| UNLocode | USLGB |
| Event Date Time | 09/20/2015 21:58 GMT |
| Event Timezone | America/Los Angeles |

Role List Locator: Carrier, Booking Number

Unique key — Shipping Document Schema — 1908

| Header Field | Data Field Type |
|---|---|
| Event ID | String(40) |
| Carrier | String(4) |
| Booking Number | String(20) |
| Container Number | String(20) |
| Container Size Type | String(4) |
| Equipment ISO Code | String(4) |
| UNLocode | String(5) |
| Event Date Time | Date |

Role List Locator: Event ID

FIG. 19

«Return To Action Items　⬆Export DG Application　⬆Upload Document　☐Blockchain History　☐Action Log ▸ Booking 190226267889

DG Booking
Version 1 - Blockchain Txn ID 3f4f36298505f9298c4b85d16af2f9be58b2b64e900b29c8287624ef10337 ☐

⊙ Booking Information
| | |
|---|---|
| BOOKING#: | 190226267889 |
| BOOKING STATUS: | New |
| CARRIER: | XYZ |
| CARGO NATURE: | DG |
| OB TRAFFIC MODE: | FCL |
| IB TRAFFIC MODE: | FCL |
| BXG ONTER CITY: | 1 |
| OTHER REF# TYPE: | |

| | |
|---|---|
| BOOKING PARTY: | XYZ |
| SHIPPER: | Factory A |
| FORWARDER: | IM Co |
| COSIGNEE: | S-Mart |
| CARGO CUTOFF DATE: | Mar 3, 9:17AM PST |
| SI CUTOFF DATE: | Mar 4, 9:17am PST |
| VGM CUTOFF DATE: | Mar 5, 9:17am PST |

| | | |
|---|---|---|
| FINAL DESTINATION: | | Rotterdam, Netherlands |
| on ABC MONTREAL | | Operated by ACME Corp |
| on ABC MONTREAL | | Operated by ACME Corp |

⊙ Route Information
| | |
|---|---|
| PLACE OF RECEIPT: | Chicago, United States |
| FIRST PORT OF LOAD: | Montreal, Canada |
| FINAL PORT OF DISCHARGE: | Antwerpen, Belgium |

⊙ Container/Cargo Information
CONTAINER#: COSU527376   show more

⊙ Other
SPECIAL HANDLING INSTRUCTIONS:
APPROVAL REFERENCE:
NOTES:

FIG. 27

« Return To Action Items    ⬆ Export DG Application    ⬆ Upload Document    ☐ Blockchain History    ⇄ Action Log Booking 190226267889

DG Booking
Version 1 - Blockchain Txn ID 3f41362985051929c4b85d16af2f9be58b64e900b29c8287624e7f033717 ☐

⊙ Booking Information
| | | | |
|---|---|---|---|
| BOOKING#: | 190226267889 | BOOKING PARTY: | |
| BOOKING STATUS: | New | SHIPPER: | |
| CARRIER: | XYZ | FORWARDER: | |
| CARGO NATURE: | DG | COSIGNEE: | |
| OB TRAFFIC MODE: | FCL | | |
| IB TRAFFIC MODE: | FCL | CARGO CUTOFF DATE: | Mar 3, 9:17AM PST |
| BXG ONTER CITY: | 1 | SI CUTOFF DATE: | Mar 4, 9:17am PST |
| OTHER REF# TYPE: | / | VGM CUTOFF DATE: | Mar 5, 9:17am PST |

⊙ Route Information
PLACE OF RECEIPT:                                       FINAL DESTINATION:

FIRST PORT OF LOAD:    Montreal, Canada        on ABC MONTREAL      Operated by ACME Corp
FINAL PORT OF DISCHARGE:    Antwerpen, Belgium     on ABC MONTREAL      Operated by ACME Corp

⊙ Container/Cargo Information
CONTAINER#:    COSU527376    show more

⊙ Other
SPECIAL HANDLING INSTRUCTIONS:
APPROVAL REFERENCE:
NOTES:

Company A China

25%

Total Invoice  60
Outstanding Invoice  60

Invoice No  ▼
From  [📅]    To  [📅]    Search

| | Invoice Amount | Invoice Due Date | Carrier |
|---|---|---|---|
| 📅 Feb 11, 2019 | $7,876.00 | Feb 18, 2019 | ACME |
| 4158241228 | | | |
| 📅 Feb 8, 2019 | $1,866.00 | Feb 15, 2019 | ACME |
| 4158244885 | | | ⓘ |
| 📅 Jan 22, 2019 | $1,852.00 | Jan 29, 2019 | ACME |
| 4156684885 | | | ⓘ |
| 📅 Feb 8, 2019 | $5,866.00 | Jan 13, 2019 | ACME |
| 4152544885 | | | |
| 📅 Dec 15, 2019 | $5,194.00 | Dec 22, 2019 | ACME |
| 4152258485 | | | |

---

4158241149 - ACME

| Invoice Amount | Outstanding Amount | Status |
|---|---|---|
| $7,876.00 | $7,876.00 | Validation |

| Currency | Invoice Date | Invoice Due Date |
|---|---|---|
| USD | Jan 22, 2019 | Jan 29, 2019 |

[ Direct Pay ]   [ Apply Financing ]

Master Bill of Lading

| 6258240388 ⓘ | | |
|---|---|---|
| Charged Amount | Place of receipt | 📅 Mar 8, 2019 Final destination |
| $2,876.00 | Hong Kong | Rotterdam |

| 6258240322 ⓘ | | |
|---|---|---|
| Charged Amount | Place of receipt | 📅 Mar 8, 2019 Final destination |
| $4,876.00 | Hong Kong | Rotterdam |

| 6258240334 ⓘ | | |
|---|---|---|
| Charged Amount | Place of receipt | 📅 Mar 8, 2019 Final destination |
| $1,236.00 | Hong Kong | Rotterdam |

FIG. 35

ZERO TRUST COMMUNICATION SYSTEM FOR FREIGHT SHIPPING ORGANIZATIONS, AND METHODS OF USE

CROSS-REFERENCE TO RELATED APPLICATIONS

The present application claims the benefit of priority under 35 U.S.C. § 120 as a continuation of U.S. application Ser. No. 17/397,315, filed Aug. 9, 2021, which claims the benefit of priority under 35 U.S.C. § 120 as a continuation of PCT Patent Application No. PCT/US2020/019661, filed on Feb. 25, 2020, which is a continuation-in-part of U.S. application Ser. No. 16/501,399 entitled "Zero Trust Communication System for Freight Shipping Organizations, and Methods of Use" filed on Apr. 6, 2019, and claims priority from U.S. Provisional Application No. 62/919,097 entitled "Encrypted Distributed Ledger for Use with Freight Shipping Organizations, and methods of use" filed on Feb. 25, 2019, the contents of each of which is incorporated herein by reference in its entirety for all purposes.

FIELD OF THE DISCLOSURE

The present disclosure relates to systems and methods for exchanging encrypted data, including but not limited to systems and methods for exchanging encrypted data in zero trust communication environments.

BACKGROUND

The transport of goods over long distances using containers is a standard form of shipping. Intermodal containers are used to transport goods by automobile, train and ships. The units are stackable and designed to be moved from one form of transport to another without opening the container. A shipment, which may involve the transportation of one or more containers, is the commitment of a shipping carrier to deliver the goods, either using intermodal containers or as project cargo (collectively "cargo" or "freight"). In order to have the successful fulfillment of a shipment, the sharing of relevant data among different parties involved in the shipment is required. These parties include, but are not limited to the shipping carrier, the vessel operators in the shipping process, ports/terminals, government agencies as well as shipping parties in the shipment including the shipper, the consignee and sometimes the forwarder and notify parties. Other parties may also be involved in a freight shipment.

BRIEF SUMMARY

Described herein are systems and methods for using a communication system where zero trust is involved. The communication system may be designed to work with users that may be direct competitors with each other, or ancillary competitors, but sometimes desire, or may be required to work in the same space in order to achieve their business objectives.

Businesses involved in the loading, unloading, and movement of shipping containers (sometimes referred to as intermodal containers), communicate to each other using business to business (B2B) communication, Electronic Data Interchange (EDI) and application programming interface (API) calls. These communication channels are point to point with a requirement that one party communicate with one other party. The individual to individual nature of this communication does not generally allow for multiple parties to be "kept in the loop" simultaneously. There are also variations in the protocol different parties adopt in how they handle communications, so communications may be delayed or subject to business policy timing that reduces the timeliness of such communications. The geographic distribution of the parties in moving freight contributes to the delay in communications. Freight may originate in Asia and be destined for locations in the Americas, Europe or Africa. The convenient time to attempt communication for one party may be after business hours of another, causing further delay.

Organizations that compete directly with each other, may sometimes share resources to complete their business obligations. Such as two or more shipping companies sharing their vessels in which to transport goods such that better service coverage as well as economies of scale can be achieved. Another example is where multiple shippers using the same forwarder may share a single intermodal container to avoid each having to pay for and ship separate, partially full intermodal containers. Other economies and better service fulfillment are realized when the companies can coordinate their activities. However, coordination often requires disclosing confidential data, which companies are not prone to do. There are also regulatory requirements prohibiting the sharing of certain kinds of data with certain parties. More generally, each party has confidential information. The need to protect confidential information, such as business contacts, customer lists, pricing information, and so on, is critical to maintaining a competitive advantage, and regulatory compliance, in the market place. Thus parties who compete with one another, or are required to use each other's services, will not share their confidential information.

Approaches dealing with intermodal containers and tracking their location tend to focus on the contents of the containers, or tracking in small locations, rather than in a global sense. Thus there remains a need for a communication and data control system that allows parties who work together toward a common task to share confidential information in a format that allows the various parties to see only the information they need to see to do their portion of the task, while keeping any other information confidential to the source (of the information). There is further a need for a system that can reduce the time required for the tracking of freight anywhere in the path of the shipping process, and provide timely updates of location for both intermodal containers and project cargo.

There is further a need to provide various parties associated with the transportation, delivery loading and unloading of intermodal containers and project cargo with a timely status and shipment updates of these shipments while simultaneously protecting data privacy and business confidentiality. These and other objectives may be met by the following disclosure.

A system is described for generating a shipping document. The system may have a shipping document control hub, and one or more user nodes. The shipping document control hub may have a computer with a logic, a memory and a communication device. The hub also may have a message broker able to send and receive event messages. There may be an access policy repository storing global member list, list of access policy documents and list of role lists. There may also be a public key repository stored on the memory. There may also be an identify (ID) repository having a list of one or more users, one or more user login credentials, and one or more user parameters. There may also be a blockchain database that includes one or more blockchain nodes storing encrypted shipping documents, encrypted data encryption keys and the document originator's signature. The user nodes may have one or more of a computer, a message broker, a key store for decrypting shipping documents, an API interface with a cryptographic layer for encrypting shipping documents, and a portal for accessing the shipping document control hub. The API interface may be executed on the logic of the user computer and communicates with the shipping document control hub message broker.

There is also described a standalone user node for use in generating a single, shared shipping document transaction. The user node may have a computer with a logic for executing program instructions, a memory device, a user interface and a communication device for accessing a shipping document control hub. The user node may have a message broker able to send and receive event messages. An API interface may have a cryptographic access layer, the API may interface coordinating the shared shipping document transaction correspondence to the shipping document control hub. The user node may also have a blockchain database stored on the memory device. The memory device may be local, remote, cloud based, or removable. The blockchain database may have shipping documents relevant to the user role in the single, shared shipping document transaction.

There is also described a standalone shipping document control hub for use in coordinating communication between a first user node and second user node in the distribution of a shared shipping (electronic) document. The shared shipping document may have encrypted data attributes, encrypted data encryption keys and/or a document originator's digital signature. The shipping document control hub may use a computer with a logic for executing program instructions, a memory device and a communication device for communicating with the user nodes. There may be a communication routing controller, the controller may use a routing logic to route a shared shipping document received from the first user node to the second user node. The second user node may be one of the shipment parties of the shipping document provided by the first user node. There may be a distributed ledger stored on the memory. The distributed ledger may be a blockchain database for storing encrypted shared shipping documents (or select data attributes of a shared shipping document). There may also be stored encrypted data encryption keys and a hash of the encrypted shared shipping document, and a document originator's digital signature for the shared shipping document.

There is also a method of generating a shared shipping document. The method may involve; generating a shared shipping document and encrypting it by the cryptographic access layer in the API interface, submitting the encrypted shared shipping document, the encrypted data encryption keys and the document originator's digital signature to a shipping document control hub (hub), identifying one or more users, and each user may have at least one assigned role according to an access control policy; forwarding the encrypted shared shipping document, the encrypted data encryption keys and the document originator's digital signature to the one or more users, wherein the one or more users may fulfill a role of the encrypted shipping document based on the one or more user assigned roles as provided by the access control policy.

There may also be a method for identifying user access rights to the shared shipping document. The method may involve receiving a shipping document to be shared to at least one user, the document having an originator, a role list and an identification code. Then identifying the originator, determining the role of the originator based on a global user list (or global member list), verifying the role list of the shared shipping document, encrypting at least one data attribute of the shared shipping document by data encryption keys, encrypting the data encryption keys by public keys of related shipment parties according to the access policy, and distributing that at least one data attribute to at least one verified user.

Additional aspects are also described.

The freight tracking systems and methods described herein may help companies and individuals track the progress of freight containers, such as intermodal containers, through the shipping processes. This may be achieved by assigning each party a role as the various parties provide shipping documents to the system. The system may organize the shipping documents and encrypt the shipping documents according to a logical scheme. The shipping documents may go through a process where the encrypted shipping documents may be shared with other parties logically related to one another, e.g. as when they are all involved with a common carrier or agent. The data corresponding to the freight being shipped, may updated at various times and events during the transit of the freight from the point of origin to the point of destination. Each update generates new encrypted shipping documents, which may be shared with all parties sharing a logical, business or financial relationship.

The shipping document representing the freight may contain information about the freight shipment, such as what kind of product may be shipped, how much it weighs, and whether it requires any special handling, to name only a few. The shipping document may also include information about the parties involved (e.g. the shipper, the consignee, the shipping carrier), and routing information of the shipment. In addition, the shipping document may include one or more event records which store things that happen to the shipment that may be of significance to its status. Overall, the shipping document may cover a variety of other details that may be relevant to any shipment. The access policy of the shipping document may also contain information about who may take a shipping role. A shipping document may be added, edited or read in the system. In some embodiments, the shipping document may contain information about a user. In some embodiments, the shipping document may be a virtual document of a freight shipment. In some embodiments the shipping document may contain information about a subscriber.

In some embodiments, the parties accessing the system may be users of the system. These users may have various levels of access to, and privileges over, the system. In some embodiments the users may be able to read data presented in the system. In some embodiments users may be able to create data in the system. In still some embodiments, users may be able to update existing information in the system. In some embodiments, users may be able to do one or more of: create, read and update the data in the system.

In some embodiments, there may be one or more level of membership in the system. These differing levels of membership may come with different access rights or authorities. In some embodiments, the different access rights may come with different fees.

In some embodiments, there may be a system that receives user information, and stores information related to the shipment and tracking of containers in real time. The system may include a computer having a processor, a memory device and a communication interface for accessing the internet. The computer system may receive, via the communication interface, data from one or more users. The data may be processed and collected and sorted into an organized data structure in the memory device. The computer may have a logic enabling the computer to transform the data from one or more users into an encrypted record. The computer may use a variety of encryption methodologies to encrypt the data to produce the encrypted shipping document. A series of data encryption keys may also be produced, with one data encryption key being provided to each attribute in the shipping document. The relevant individual data encryption keys based on the role of the users of the related shipment parties may be encrypted by the public key of the user. The public key of the user is called the key encryption key. These encrypted data encryption keys and the encrypted data package may be provided to the users through blockchain nodes made available by the system to each user. Nodes may be shared or dedicated to a shipment party. A user may decrypt encrypted data encryption keys using a private key, and then use the decrypted encryption keys to decrypt the relevant data in the node.

In some embodiments, there may be a method of securing data privacy for a shipping document shared in a distributed user group. The method comprises receiving, via a communication network, the shipping document from a user, the user may have an assigned role, wherein the shipping document comprises a plurality of data attributes. There may also be encrypting, via a first encryption logic, the plurality of data attributes into a like number of encrypted data attributes, the first encryption logic generating a data encryption key corresponding to each encrypted data attribute. The method may also involve organizing, via a programming logic, the plurality of encrypted data attributes into a distributed data ledger, the distributed data ledger containing at least one encrypted shipping document from a user. The method further involves encrypting, via a second encryption logic, the encryption keys corresponding to the plurality of data attributes, the second encryption logic may use a look up table providing permissions for one or more users of the distributed data ledger based on the user's assigned role. The method may also have distributing, via the communication network, the encrypted data attributes, the encrypted data encryption key to the blockchain nodes in a more efficient manner so that the entire solution may be scalable. Each user may have access to a node, the node may provide access to one of the distributed data ledgers. Each user may only decrypt data related to their assigned role.

The first and second encryption may utilize a variety of encryption technologies. The user assigned role may associated with a user access control policy.

The use of the system and/or methods may provide a combination of context sensitive data segregation, encryption and access control policy to achieve data privacy for a distributed ledger technology.

At least one aspect of the present disclosure is directed to a method of securely sharing data from multiple sources with different client terminals. At least one server having one or more processors may establish an electronic document for defining a single transaction. The electronic document may have a plurality of data fields. Each of the plurality of data fields may be associated with one of a plurality of client terminals. The at least one server may identify a plurality of encryption keys to encrypt the corresponding plurality of data fields included in the electronic document. The at least one server may distribute the plurality of encryption keys across the plurality of client terminals in accordance with an access control policy. The access control policy may specify access permissions for a corresponding client terminal of the plurality of client terminals to each of the plurality of data fields based on a role of the corresponding client terminal in the single transaction. The at least one server may provide, to each of the plurality of client terminals with access to at least one of the plurality of data fields in the electronic document via the plurality of encryption keys distributed in accordance with the access control policy.

In some embodiments, establishing the electronic document may include receiving, from a first client terminal of the plurality of client terminals, a request to update an attribute of a first data field of the plurality of the data fields in the electronic document. In some embodiments, establishing the electronic document may include determining, in accordance with the access control policy based on a role of the first client terminal in the single transaction, that the first client terminal has permission to modify the first data field. In some embodiments, establishing the electronic document may include permitting, responsive to determining that the first client terminal has the permission, the client terminal to update the attribute of the first data field in the electronic document.

In some embodiments, the at least one server may identify, responsive to receiving a request from a first client terminal of the plurality of client terminals to update an attribute in a first data field of the plurality of the data fields in the electronic document, a role of the first client terminal from a list of roles in the single transaction. In some embodiments, the at least one server may determine, in accordance with the access control policy based on the identified role of the first client terminal, that the first client terminal lacks permission to modify the first data field. In some embodiments, the at least one server may prevent, responsive to determining that the first client terminal lacks the permission, updating of the attribute of the data field in the electronic document by the first client terminal.

In some embodiments, identifying the plurality of encryption keys may include identifying, for the corresponding plurality of client terminals, a plurality of private encryption keys and a plurality of public encryption keys. In some embodiments, distributing the plurality of encryption keys may include providing a private encryption key of the plurality of private encryption keys to a corresponding client terminal of the plurality of client terminals. In some embodiments, distributing the plurality of encryption keys may include providing a public encryption key of the plurality of public encryption keys to at least one of the plurality of client terminals in accordance with the access control policy. At least one of the plurality of data fields in the electronic document may be accessible by at least two of the plurality of client terminals using at least one of the private encryption key and the public encryption key.

In some embodiments, the at least one server may identify, from the plurality of client terminals, a first client terminal and a second client terminal based on a first role of the first client terminal and a second role of the second client terminal in accordance with the access control policy. In some embodiments, the at least one server may encrypt, responsive to identifying the first client terminal and the second client terminal, a first encryption key of the first client terminal using a public encryption key of the second client terminal. In some embodiments, distributing the plurality of encryption keys may include providing, to the second client terminal the first encryption key of the first client terminal encrypted with the public encryption key of the second client terminal.

In some embodiments, the at least one server may identify a plurality of hash values derived from a corresponding plurality of attributes in the plurality of data fields of the electronic document. Each hash value of the plurality of hash values may ensure data integrity of one of the plurality of attributes. In some embodiments, the at least one server may generate, for a first client terminal of the plurality of client terminals, a first signature using a first hash value of the plurality of hash values and a first encryption key of the plurality of encryption keys. The first hash value may be derived from a first attribute of the plurality of attributes. The first encryption key may be for a first data field of the plurality of data fields corresponding to the first attribute. The first signature may ensure data integrity of the first attribute and the first data field.

In some embodiments, the at least one server may identify, from the plurality of client terminals in accordance with the access control policy, a first client terminal and a second client terminal based on a first role of the first client terminal and a second role of the second client terminal. In some embodiments, providing access may include providing, to the second client terminal, access to a data field of the plurality of data fields of the first client terminal via a hash value derived from an attribute of the data field and a signature of the first client terminal. The second client terminal may obtain an encryption key of the plurality of encryption keys of the first client terminal using the hash value and the signature.

In some embodiments, the at least one server may determine whether a distribution of the plurality of encryption keys across the plurality of client terminals is successful. In some embodiments, the at least one server may provide, based on a determination of whether the distribution of the plurality of encryption keys is successful, an event notification to at least one of the plurality of client terminals.

In some embodiments, identifying the plurality of encryption keys may include aggregating, from each client terminal of the plurality of client terminals, a corresponding encryption key for the plurality of encryption keys. The corresponding encryption key may be generated by the client terminal to encrypt a data field of the plurality of data fields. In some embodiments, establishing the electronic document may include establishing the electronic document on a database of a shipping document control hub to coordinate communications among the plurality of client terminals, the plurality of data fields of the electronic document corresponding to a corresponding plurality of database entries on the database.

In some embodiments, the single transaction may involve a physical good and may include a series of sub-transactions of the physical good. Each of the plurality of data fields may be mapped to one of the sub-transactions. In some embodiments, each of the sub-transactions of the physical good may be handled by at least one service provider.

At least one aspect of the present disclosure is directed to a system for securely sharing data from multiple sources with different client terminals. The system may include at least one server having one or more processors. The at least one server may establish an electronic document for defining a single transaction. The electronic document may have a plurality of data fields. Each of the plurality of data fields may be associated with one of a plurality of client terminals. The at least one server may identify a plurality of encryption keys to encrypt the corresponding plurality of data fields included in the electronic document. The at least one server may distribute the plurality of encryption keys across the plurality of client terminals in accordance with an access control policy. The access control policy may specify access permissions for a corresponding client terminal of the plurality of client terminals to each of the plurality of data fields based on a role of the corresponding client terminal in the single transaction. The at least one server may provide, to each of the plurality of client terminals with access to at least one of the plurality of data fields in the electronic document via the plurality of encryption keys distributed in accordance with the access control policy.

In some embodiments, the at least one server may receive, from a first client terminal of the plurality of client terminals, a request to update an attribute of a first data field of the plurality of the data fields in the electronic document. In some embodiments, the at least one server may determine, in accordance with the access control policy based on a role of the first client terminal in the single transaction, that the first client terminal has permission to modify the first data field. In some embodiments, the at least one server may permit, responsive to determining that the first client terminal has the permission, the client terminal to update the attribute of the first data field in the electronic document.

In some embodiments, the at least one server may identify, responsive to receiving a request from a first client terminal of the plurality of client terminals to update an attribute in a first data field of the plurality of the data fields in the electronic document, a role of the first client terminal from a list of roles in the single transaction. In some embodiments, the at least one server may determine, in accordance with the access control policy based on the identified role of the first client terminal, that the first client terminal lacks permission to modify the first data field. In some embodiments, the at least one server may prevent, responsive to determining that the first client terminal lacks the permission, updating of the attribute of the data field in the electronic document by the first client terminal.

In some embodiments, the at least one server may identify, for the corresponding plurality of client terminals, a plurality of private encryption keys and a plurality of public encryption keys. In some embodiments, the at least one server may provide a private encryption key of the plurality of private encryption keys to a corresponding client terminal of the plurality of client terminals. In some embodiments, the at least one server may provide a public encryption key of the plurality of public encryption keys to at least one of the plurality of client terminals in accordance with the access control policy. At least one of the plurality of data fields in the electronic document may be accessible by at least two of the plurality of client terminals using at least one of the private encryption key and the public encryption key.

In some embodiments, the at least one server may identify, from the plurality of client terminals, a first client terminal and a second client terminal based on a first role of the first client terminal and a second role of the second client terminal in accordance with the access control policy. In some embodiments, the at least one server may encrypt, responsive to identifying the first client terminal and the second client terminal, a first encryption key of the first client terminal using a public encryption key of the second client terminal. In some embodiments, the at least one server may provide, to the second client terminal the first encryption key of the first client terminal encrypted with the public encryption key of the second client terminal.

In some embodiments, the at least one server may identify a plurality of hash values derived from a corresponding plurality of attributes in the plurality of data fields of the electronic document. Each hash value of the plurality of hash values may ensure data integrity of one of the plurality of attributes. In some embodiments, the at least one server may generate, for a first client terminal of the plurality of client terminals, a first signature using a first hash value of the plurality of hash values and a first encryption key of the plurality of encryption keys. The first hash value may be derived from a first attribute of the plurality of attributes. The first encryption key may be for a first data field of the plurality of data fields corresponding to the first attribute. The first signature may ensure data integrity of the first attribute and the first data field.

In some embodiments, the at least one server may identify, from the plurality of client terminals in accordance with the access control policy, a first client terminal and a second client terminal based on a first role of the first client terminal and a second role of the second client terminal. In some embodiments, the at least one server may provide access, to the second client terminal, access to a data field of the plurality of data fields of the first client terminal via a hash value derived from an attribute of the data field and a signature of the first client terminal. The second client terminal may obtain an encryption key of the plurality of encryption keys of the first client terminal using the hash value and the signature.

In some embodiments, the at least one server may determine whether a distribution of the plurality of encryption keys across the plurality of client terminals is successful. In some embodiments, the at least one server may provide, based on a determination of whether the distribution of the plurality of encryption keys is successful, an event notification to at least one of the plurality of client terminals.

In some embodiments, the at least one server may aggregate, from each client terminal of the plurality of client terminals, a corresponding encryption key for the plurality of encryption keys. The corresponding encryption key may be generated by the client terminal to encrypt a data field of the plurality of data fields. In some embodiments, the at least one server may establish the electronic document on a database of a shipping document control hub to coordinate communications among the plurality of client terminals, the plurality of data fields of the electronic document corresponding to a corresponding plurality of database entries on the database.

In some embodiments, the single transaction may involve a physical good and may include a series of sub-transactions of the physical good. Each of the plurality of data fields may be mapped to one of the sub-transactions. In some embodiments, each of the sub-transactions of the physical good may be handled by at least one service provider (e.g., shipper, carrier, vessel operator, terminal operator). A service provider may also be referred to as a facilitator or transaction member/user.

Alternative embodiments of the system and method may be apparent to those skilled in the art upon study of the present disclosure. These alternative embodiments are intended as equivalents for purposes of the claims appended herein.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

FIG. 2 illustrates an example shipment route 200 in accordance with an embodiment.
FIG. 10 illustrates a sample list of bookings 1000 in accordance with an embodiment.
FIG. 14 illustrates an example access policy 1400 in accordance with one embodiment.
FIG. 19 illustrates an example shipping document and access control policy 1900 in accordance with one embodiment.
FIG. 27 illustrates a booking arrangement 2700 in accordance with an embodiment.
FIG. 28 illustrates a partial booking view 2800 in accordance with an embodiment.
FIG. 34 illustrates an example invoice in accordance with an embodiment.

FIG. 35 illustrates an example payment option in accordance with an embodiment.

DETAILED DESCRIPTION

Figure 1:
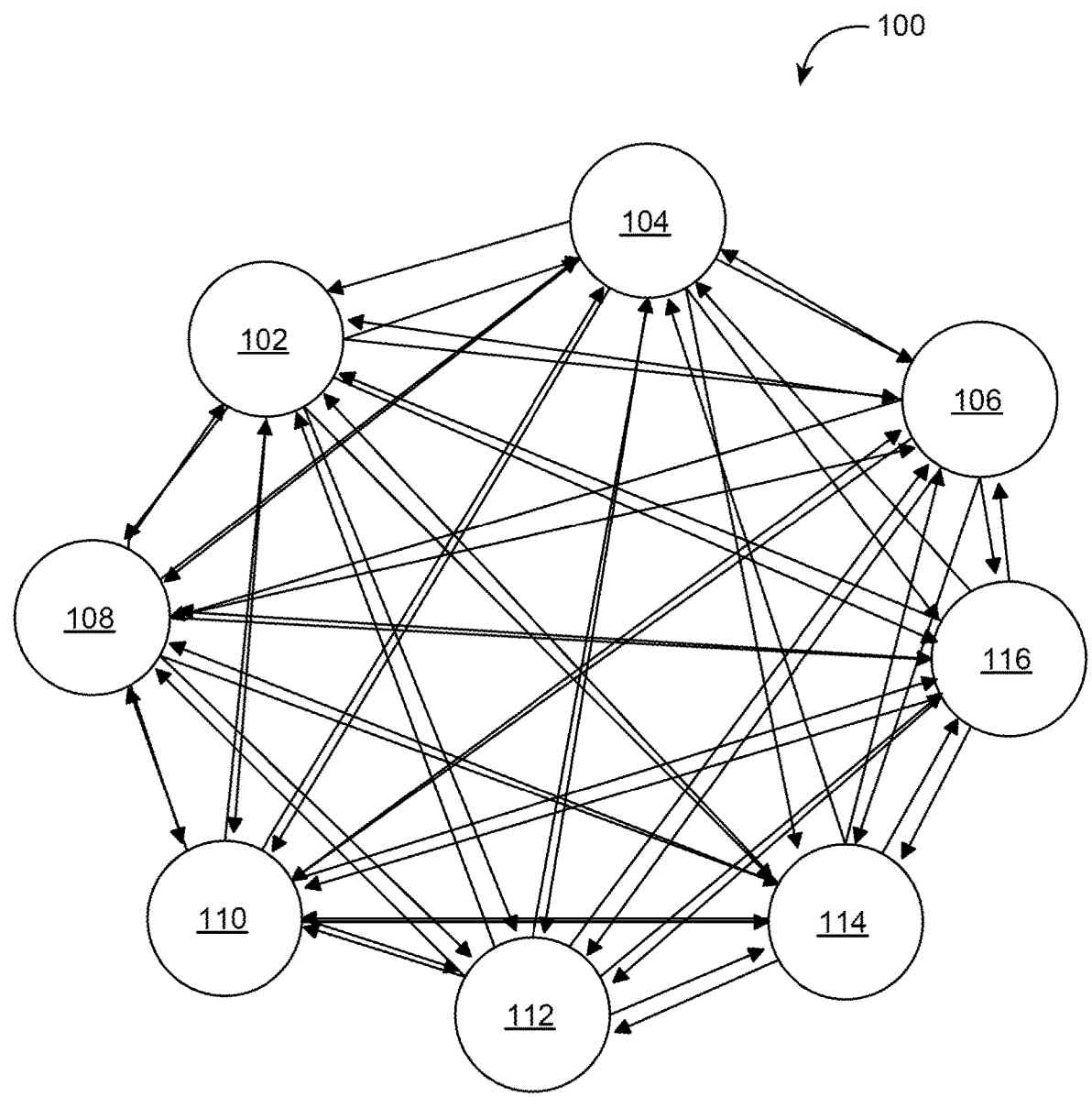
FIG. 1 illustrates a communication system.

The sharing of data to multiple parties may create synergy and efficiency. However, data sharing may be a problem when the data needed or utilized to conduct a single transaction (e.g., multi-stage transaction, multi-party transaction, a series/sequence of sub-transactions) could be confidential to one or more of the parties involved in the single transaction. This problem may be particularly acute in the area of shipping freight. Other businesses may also have this problem. A potential solution may be a system and process to utilize encryption technologies to protect data privacy while allowing the sharing of relevant data to the appropriate parties in a distributed ledger system, as described herein. The system and methods described may be useful in the shipping of cargo and freight. The system and methods described herein may also have applications in other industries.

The freight tracking systems and methods described herein may help companies and individuals track the progress of freight through the shipping processes. This may be achieved by having various users provide shipping documents to the system. The system may contain a look up table that provides a listing of the roles, and rights of each role. When a user submits a shipping document to the system, the shipping document may contain the user's identification, and a list of roles for individual shipment parties. The system may correlate the listed role(s) of the user from the shipping document, against the rights of the role(s) in a look up table. The system may process the shipping document so the user and the related shipment parties may be able to access the data after the data is encrypted. Each user in the system may have one or more defined roles. The access to each data attribute in a shipping document may be defined by the role of the user. A user may only access data relevant to them according to the role of the user in the access control policy.

The system may recognize a shipping document submitted by a user and may encrypt each data attribute of the shipping document. The first encryption process may create an individual encryption key for each data attribute.

As an example, a shipping document may have five headers and five data attributes. The first encryption process may encrypt the five data attributes, but not the five header fields. The distributed ledger may also have header fields corresponding to at least one of each encrypted data attribute. The header fields of the distributed ledger correspond to at least one of the header fields of the shipping document. In some embodiments, the header fields of the distributed ledger correspond on a one-to-one basis with the header fields of the shipping document. The distributed ledger header fields may not be encrypted, but the corresponding data attributes to each header field of the distributed ledger may be encrypted. A second level of encryption may be used to encrypt each of the encryption keys in the data attributes of the distributed ledger. The second level of encryption may be done by using public keys of one or more users with known roles in the shipping process. The second encryption process may identify the role of the user in the shipment by correlating the user role from the shipping document with the look up table. Then the public keys for the users may be used to encrypt the encryption keys corresponding to the data attributes relevant to the users based on the users assigned role and the access policy. The various attributes (encrypted data attributes, encrypted encryption keys based on the different roles, hash (generated by the encrypted data attributes) and the document originator's signature) may be placed into a permissioned based blockchain distributed ledger blockchain nodes. Some users may have their own blockchain nodes. To improve the scalability and performance when using the blockchain distributed ledger, the data may be placed into nodes that belong to the users involved in the shipment.

Each user in the system may have one or more assigned roles. Each shipping document role list may identify the role of the user who submitted the shipping document role list and the shipping document role list may identify the role of the users who may be involved in the shipment. In some embodiments, the role list may track who created it, a list of the users' roles and the corresponding users, and a locator key (the identity of the creator and the booking number for the shipping document).

The various embodiments described herein may be used with all types of shipping documents. A common shipping document is a "booking"—a precursor document to creating a bill of lading. Although many shipping documents may be used with the present system, many examples may use the term "booking" or "booking data." These terms should be considered the same as any shipping document, or shipping document data respectively.

In some embodiments, there may be a relation between various users that allow them to see each other's data attributes. In some embodiments there may be business relations built into the look up table that permits one user to see data that is not part of their own business. The look up table of access rights may be derived through each party identifying the rights they require, as well as rights they desire, with the system controller being the ultimate arbitrator of the rights each user has.

In some embodiments, the distributed ledger may represent a single shipping document. In some embodiments there may be multiple shipping documents incorporated into a single distributed ledger.

In some embodiments, asymmetric cryptography may be used as part or all the encryption methodologies described herein.

Overview Diagram of the Overall Process in Certain Approaches

The process for tracking the state of a shipment in freight channels is shown in FIG. 1. The shaded ovals show various parties in a single shipping transaction, and how they communicate with one another using EDI (Electronic Data Interchange). Examples of parties are shown as a shipper, forwarder, carrier, terminal, customs, port authority and consignee.

Brief Description of Parties

Shipper—the company or person who ships cargo to the consignee.

Consignee—the person or firm named in a freight contract to whom goods have been shipped or turned over for care.

Forwarder (or Freight forwarder)—a person or business engaged in the business of assembling, collection, consolidating, shipping and distributing less-than-carload or lessthan-truckload freight. Also a person acting as agent in the transshipping of freight through customs including full preparation of documents, arranging for shipping, warehousing, delivery and export clearance.

Carrier—an individual or legal entity that is in the business of transporting passengers or goods for hire.

Vessel Operator—any business unit which is responsible for the operating costs, repairs and earnings of vessels. The operator may or may not be the owner of the vessel. Costs include crew wages, port charges and hull insurance. Ocean carriers share the use of vessels through alliance or vessel sharing agreement and a vessel owner by a carrier (the vessel operator) may carry the shipments booked through other carriers.

Terminal Operator—marine terminal operators (MTOs) provide wharfage, dock, warehouse, or other marine terminal facilities to ocean common carriers moving cargo in the ocean-borne foreign commerce.

In addition to these parties of a freight shipment, there may be other parties interested in a freight shipment, such as government agencies (customs, inspections), financial institutions, insurance companies, and so on.

A shipper 102 may generate a shipment of product and provide information to other parties through direct communication. These are one way communications from the Shipper 102 to each of the Forwarder 104, Carrier 106, Terminal 108, Customs 110, Port Authority 112, Consignee 114, and if needed, a Financial Institution 116 such as a bank, lender, insurance company, bond holder, etc. As can be seen in FIG. 1, each communication with the other party is a one way communication with each party essentially sending the other party some information relevant to a shipment, and then the receiving party sending the original party a response. Each party in the process may have developed their own proprietary technology for this form of communication. The communication protocols are not integrated to work together, so each receiving party is to receive a message, and then respond in their own protocol and wait for the other party to respond. This process is inefficient and time consuming.

The various parties in a shipment contract may be assigned one or more roles in the shipment. Various roles are shown in FIG. 2. The position of each assigned role is marked by a different shade in the figure. FIG. 2 is merely illustrative. Many other role positions are possible and exist in actual transactions. The system of creating a booking and shipping freight around the world can be seen in the illustration 200 shown in FIG. 2. In some embodiments, a shipper 202 may start a shipment booking by determining that goods are to be picked up and sent to a particular destination. The shipper 202 can create a booking request (a preliminary step to forming a commercial contract to send freight), and designate a port authority 204 having terminals A, B and C as shown. The shipper may also select a ship or vessel to carry the cargo by a vessel operator 206. The shipper 202 may also designate a final consignee 208 for the shipment. The route a shipment may take is also illustrated in FIG. 2 by way of example. If the path is followed from the start (Place of Receipt) to the end (Final Destination), it can be seen that numerous parties are involved. The transportation of goods over this route may involve many parties, all with their own mode of communication, as previously described.

The above example does not show all the parties that may be involved in a shipment. Whenever freight enters a port, a port authority 204 may have several agencies working under their jurisdiction. There may be inspectors of various kinds (e.g., for food stuffs, live stock, fruits and vegetables), checks against unauthorized dangerous goods, ITC inspections to certify against any sanctioned materials, immigration inspectors and so on. Terminal operators may belong to a private company and have terminal facilities in several other ports under their authority. In some cases, a party may belong to a larger company, where the company has to communicate up or down the chain of subsidiaries of a parent organization.

Described herein are various embodiments of a system and method of creating a new type of booking contract (a type of shipping document) that allows the relevant parties of the agreement to follow the progress of the freight by checking with a single point of contact. The single point of contact provides up-to-date information that may be available to all relevant parties and bypasses the restrictive communications of having each party communicate to each other party, one at a time, or in a sequential fashion. The various users may be continually updated as cargo moves through the various stages of transport. These updates may include the status of the cargo, financial obligations, regulatory matters and other issues.

As used herein, the term "user" may refer to an individual or organization. A user may be any person, party, organization or program that may access the system and interact with the processes described herein. Any individual or entity that may access the system as described herein may be considered a user. The disclosure also makes use of lists that detail certain rights, privileges and responsibilities of various users. Generally, a user may represent a role in a transaction, though it is not necessary that each user be a party to the transaction. The terms "user" and "party" may be used herein interchangeably, unless context clearly indicates otherwise.

Figure 3:
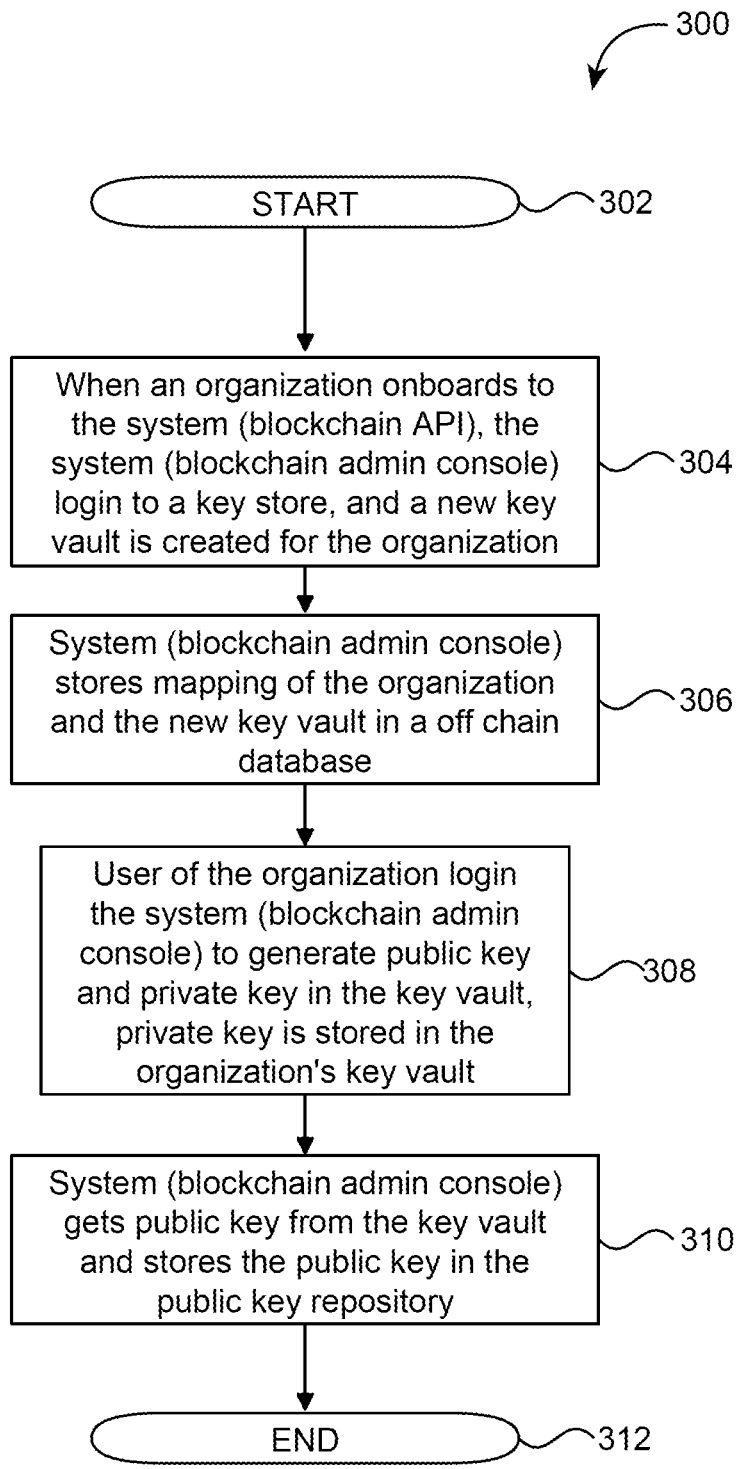
FIG. 3 illustrates a key vault process 300 in accordance with an embodiment.

In some embodiments, a user may get onboarded to the system and then may obtain key vault access and various assigned keys. The user may initiate a key vault process 300 (FIG. 3), an initial login or start 302 to the system. The user onboards to the system and the system may login to a key store, and have the key store generate a key vault 304 for the user. A global user list (or global member list) for the system may record the user's basic information. The basic information may include the user's name, user's role in any booking, contact information, and other information relevant to the role the user has. The system may store the mapping of the user key vault in a key vault mapping database 306. Then the user may login to the system to generate public and private keys. Private keys may be stored in the user's private key vault 308. The system may get the public key from the key vault, and store the public key in a public key repository 310. Once the two keys are secured in their respective databases, the process may end 312. In some embodiments, users may have pre-arranged access to a key vault and use a pre-existing key vault in conjunction with the system as described herein.

Figure 4:
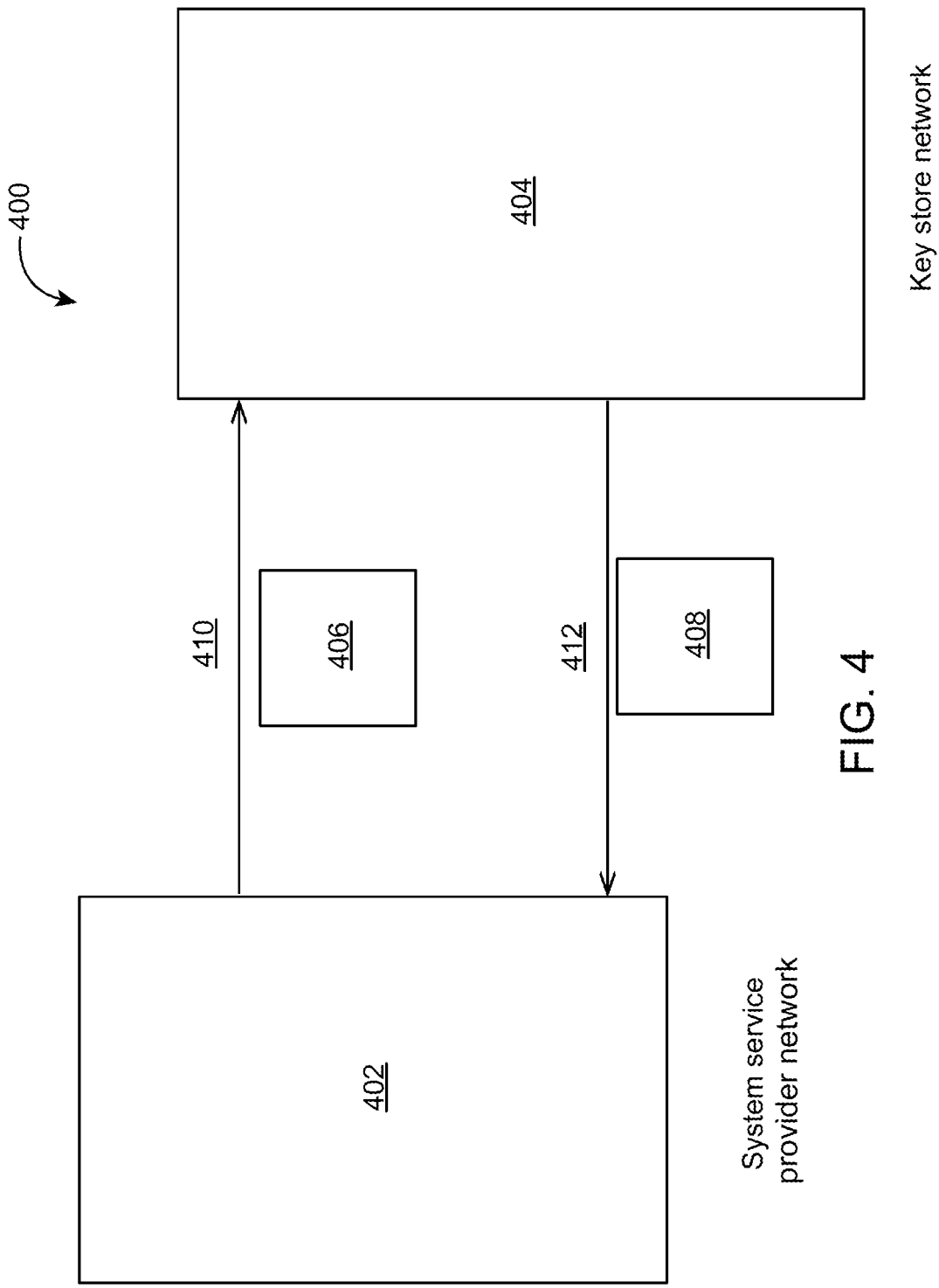
FIG. 4 illustrates an asymmetric key location 400 in accordance with an embodiment.

In some embodiments, a party may track one or more keys at a time. The key location 400 (FIG. 4) may be used so a party may have access to use its own private key 404 while the system may use the party's public key 402. Each user may have a key vault with a private key 404 and a public key 402. The public key may be stored in the system service provider network. The system may encrypt a data encryption key by using the public key of the user organization. This encryption may occur in the system service provider network. When the system decrypts the encrypted data encryption key (DEK), the system sends encrypted DEK to the key store network over a secure network connection 410. The key store may then use the user's private key 404 to decrypt the encrypted DEK 406 to produce a decrypted DEK in the key store network. The key store may then send the decrypted DEK 408 back to the system, again over a secure network connection 412. The user may use the DEK 408 to decrypt the encrypted data related to that particular key.

In some embodiments, each data attribute encryption key may be encrypted using a separate public key, or a separate encryption protocol, but using the same public key to encrypt the data encryption key. Where a particular user may have a role that permits that user to see multiple data attributes in each booking record, the above process may be repeated for each field the user has access too. The use of this encryption and decryption procedure occurs in the communication between the various systems, and may not visible to the persons accessing the database information.

Figure 5:
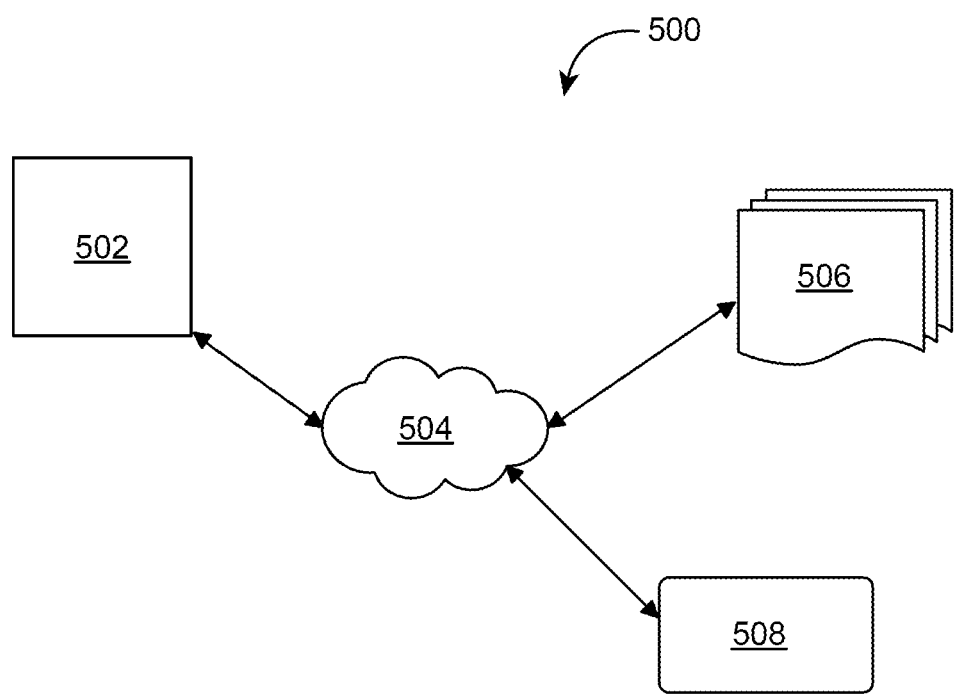
FIG. 5 illustrates an authentication process 500 in accordance with an embodiment.

In some embodiments, a user may gain access to the system through an authentication process 500 (FIG. 5). The user may access a client application 502 by providing its login name and password. The client application 502 may provide the authorized user with the organization credentials and may send the login request through a secure network connection 504 to an authorization token generator 506. The client application 502 may provide the authentication information (e.g. the user name and password as well as any other authentication information). For example, the authentication information may be an API subscription ID and secret (e.g., password). The authorization token generator may receive the API subscription ID and secret from the client application and verify the information against the API subscription database. Once these items may be authenticated, the token generator 506 may generate a token that may be returned to the user. The user's client application 502 may then use the token to communicate with the booking API 508 through the secure network connection 504. The user may gain access to the booking API 508 to input and/or access data.

In some embodiments, the client application 502 may be a web based portal and part of the authorization token generator 506 or the booking API 508. In some embodiments, the client application 502 may be the client's own software, and the authorization token generator 506 and booking API 508 may be adapted to communicate with the client software. In some embodiments the authorization token generator 506 and booking API 508 may be the same application (not shown). In some embodiments, the authorization token may have a predetermined time limit on how long the client application may access the booking API 508 or the client application 502 may have to authenticate itself to the authorization token generator 506 at every session. In some embodiments, a predetermined amount of time may be set as a "timed out" security protocol, to automatically log out a user after a set time of inactivity.

Figure 6:
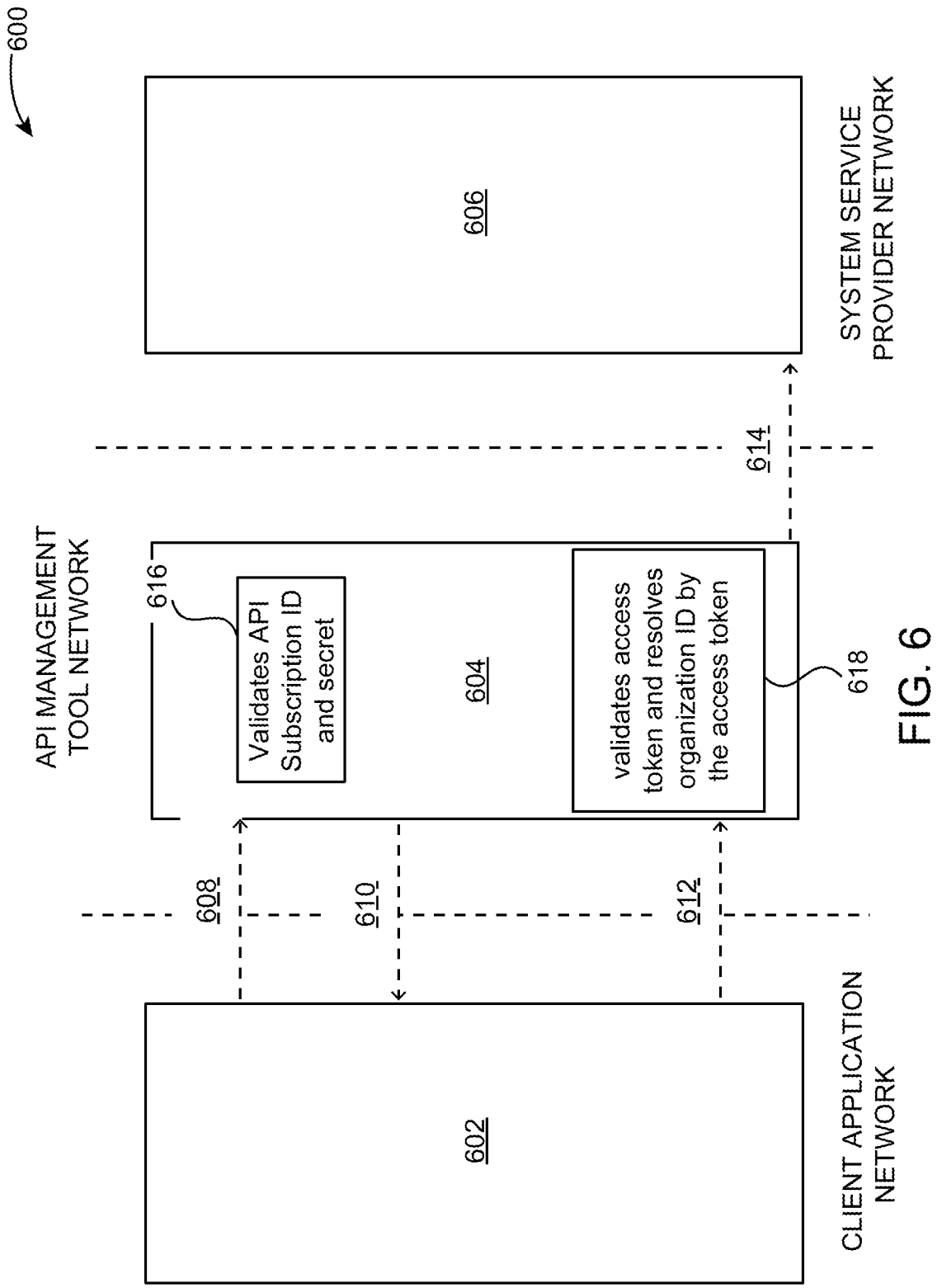
FIG. 6 illustrates an API interface 600 in accordance with an embodiment.

In some embodiments, there may be three domains of the API management process, as shown in FIG. 6. In some embodiments, the handshaking of the API interface 600 is shown. The API interface 600 may use the client application 602, the API management tool 604 and a blockchain API 606. A client application 602 may be an application created by the client (user) or an application created specifically for working with the API management tool 604. The user may login to the client application 602 and may submit a request (e.g., create a booking request), the client application 602 may send a verification request 608, which in some embodiments, may include API subscription ID and a secret, to the API management tool 604. The verification request 608 may produce either a subscriber authentication 616 result, or an error (not shown). If the subscriber authentication 616 is the result, the API management tool 604 may then produce an access token and return the token 610 to the client application 602. The client application 602 may then send the access token and booking request payload 612 to the API management tool 604. When the API management tool 604 receives the token and payload 612 request, the API management tool 604 may provide token authentication 618. Then the token may be authenticated, the token may be resolved to the organization ID based on mapping of the token and the organization. The organization ID and the payload request may then be sent 614 to the blockchain API 606 for writing to the blockchain nodes.

The example embodiment shown in FIG. 6, has three domains. The client application 602 may exist in the client application network. The API management tool 604 may reside in the API management tool network, and the blockchain API 606 may reside in the system service provider network. However, in some embodiments, the API Management tool network and the system service provider network may be merged into a single system network. In still other embodiments, more than 3 domains may be used.

Figure 7:
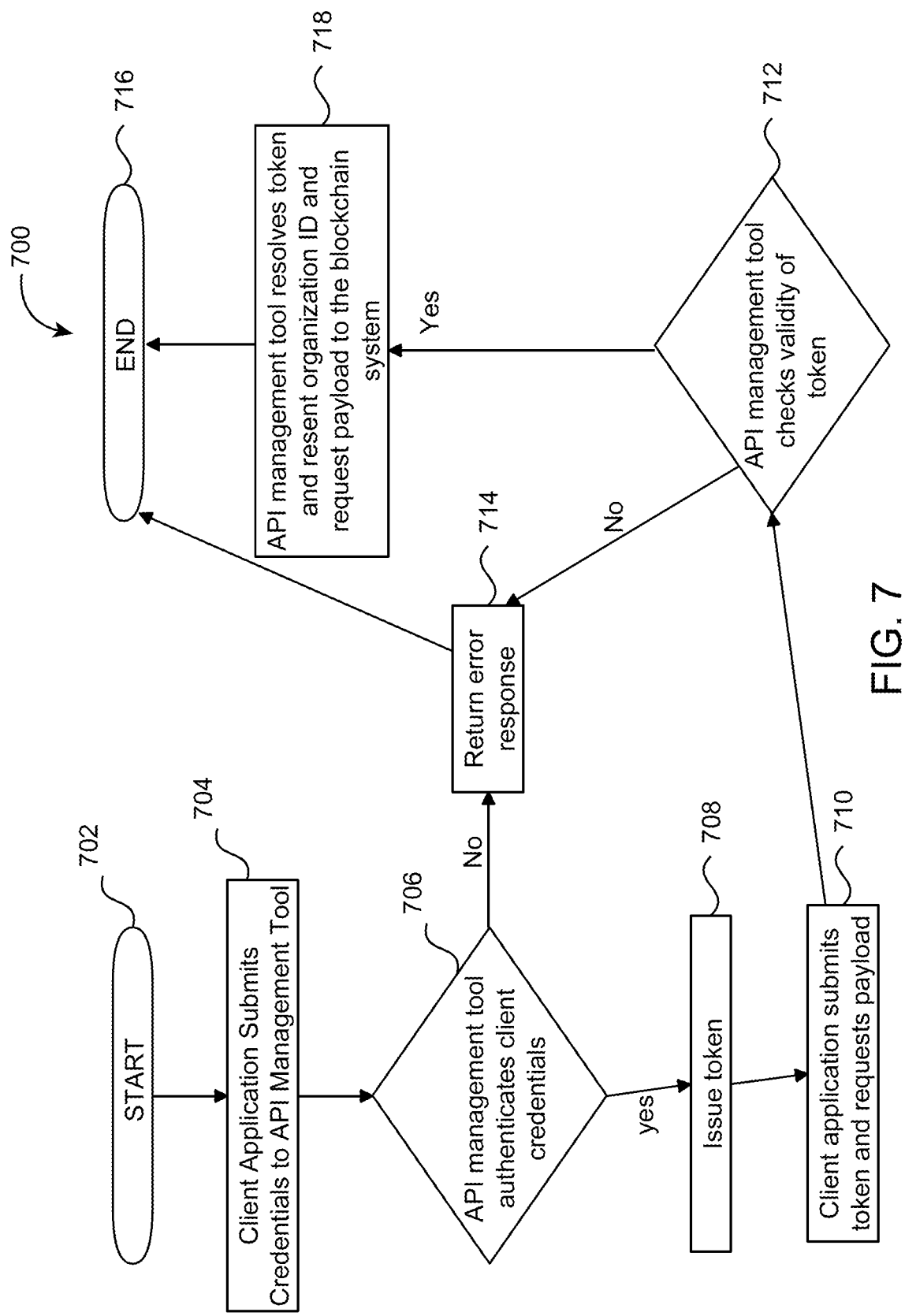
FIG. 7 illustrates an API management process 700 in accordance with an embodiment.

In some embodiments, there may be an API management process 700 as shown in FIG. 7. The API management process 700 may provide a user with access to the system of the present disclosure, and authenticate the user to the system on login. A user may begin at start block 702, where the user may access the system through an API management process 700 which authenticates a user as described herein. The subscription ID may be assigned to the user by the system, or the user may select a subscription ID (e.g., from a drop down menu, or a set of system options) and the system records it. The subscription ID may be based on a subscription fee based on a monetary payment, a bartered exchange, or it may be free. Subscription IDs may be issued to regulatory agencies, paying customers, system administrators or any other party requiring access to the systems described herein. Each user may also have a secret that may be issued to the system with the login request, or with each communication with the system. Once the user establishes the secret with the system, the secret may be stored in the API management process 700, or a database that the API management process 700 may access as needed to check the user secret. Additional steps may be taken, or alternative steps may be substituted for the subscription ID and secret challenge so that any form of acceptable security for authentication of a user may be used.

The system may check the authentication credentials against its own criteria to verify the authentication may be correct 706. If the authentication fails, an error may be reported 714 and the process ends 716. When the authentication is successful, a token may be issued 708 to the client application. The client application may then submit the token with a payload request 710 to the API management tool. The API management tool may check the token to see if it is valid 712. If the token is not valid, an error response may be returned 714. If the token is valid, the token may be resolved to the organization ID based on mapping of the token and the organization 718. The organization ID and the payload request may then be forwarded to the blockchain API and the process ends 716.

The payload request may be the booking request data for the booking request API (or other shipping document API). When the token and organization ID are confirmed by the system, the data may be stored to the same database as other booking reservation requests are made. The data may be encrypted and stored in a blockchain database. As described herein, the data for the booking request may contain header fields. Each data attribute may have a corresponding header field. The data attributes may be stored into the database with a corresponding header field, or without. In the case where data may be stored without a header field, each data attribute may contain a pointer to the header field where it came from, so when the data is read, the data may be properly shown in the proper field. Similarly, the header data may be useful when using the encrypted data to construct the relationship between the various parties, such as when making a Bill of Lading (B/L).

Figure 8:
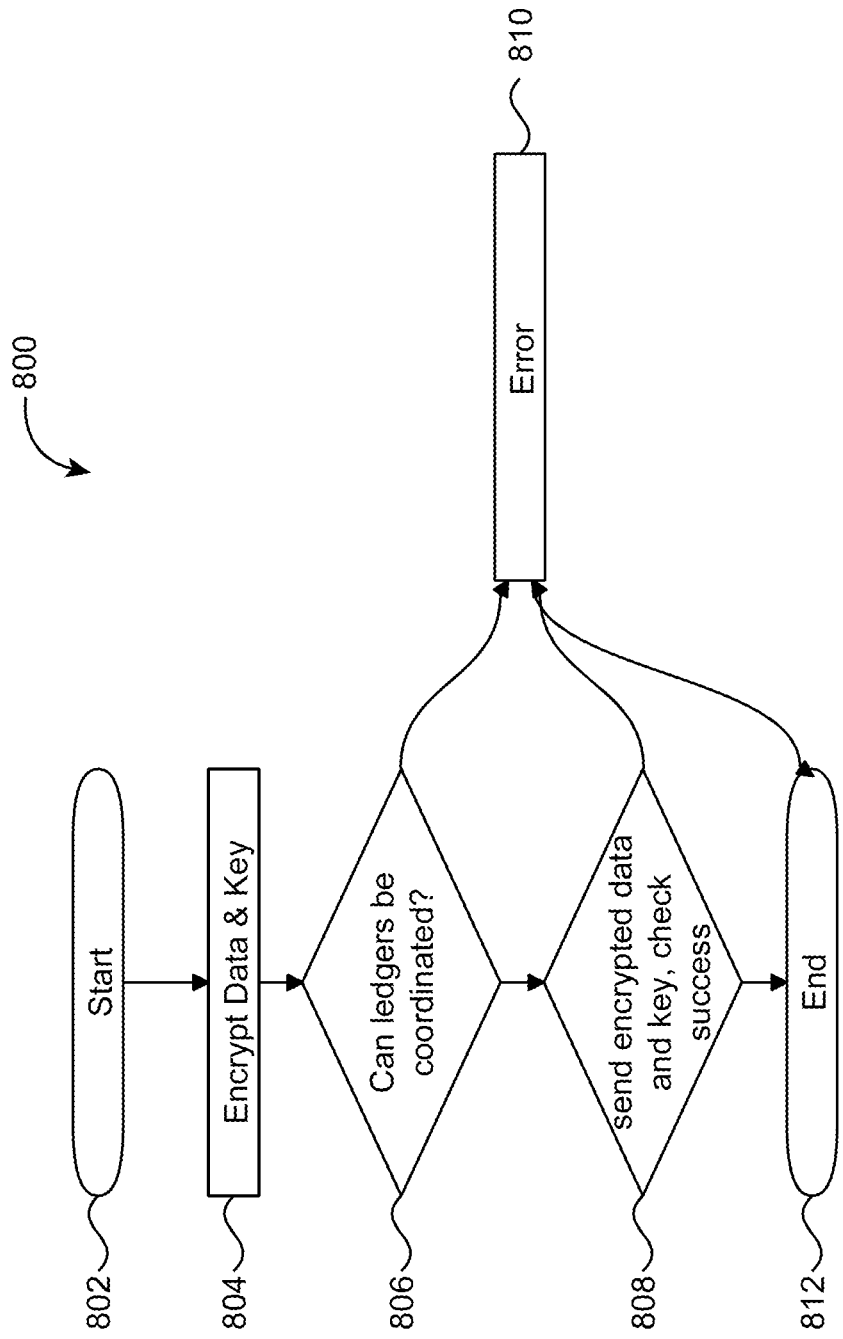
FIG. 8 illustrates a shipping document data distribution 800 in accordance with an embodiment.

In some embodiments, an overview of the process for distributing encrypted data and encrypted data encryption keys is shown in FIG. 8. The process may begin at the Start block 802, the system may encrypt data and data encryption keys 804 as described herein. The system may then find, access or locate the ledger 806 of the sender and the various shipment parties by using their organization IDs. The system may check to see if the ledgers of all the shipment parties may be found. If a ledger is not found, the system may return an error 810 response and the process ends. If the ledgers for all the shipment parties are found, the system may then proceed to send data and data encryption keys to the ledgers.

The system may then proceed to send the encrypted data and encrypted data keys and may check for send success 808 (receipt verification) to the various appropriate ledgers. If the send is successful, then the process may proceed to the end block 812.

Figure 9:
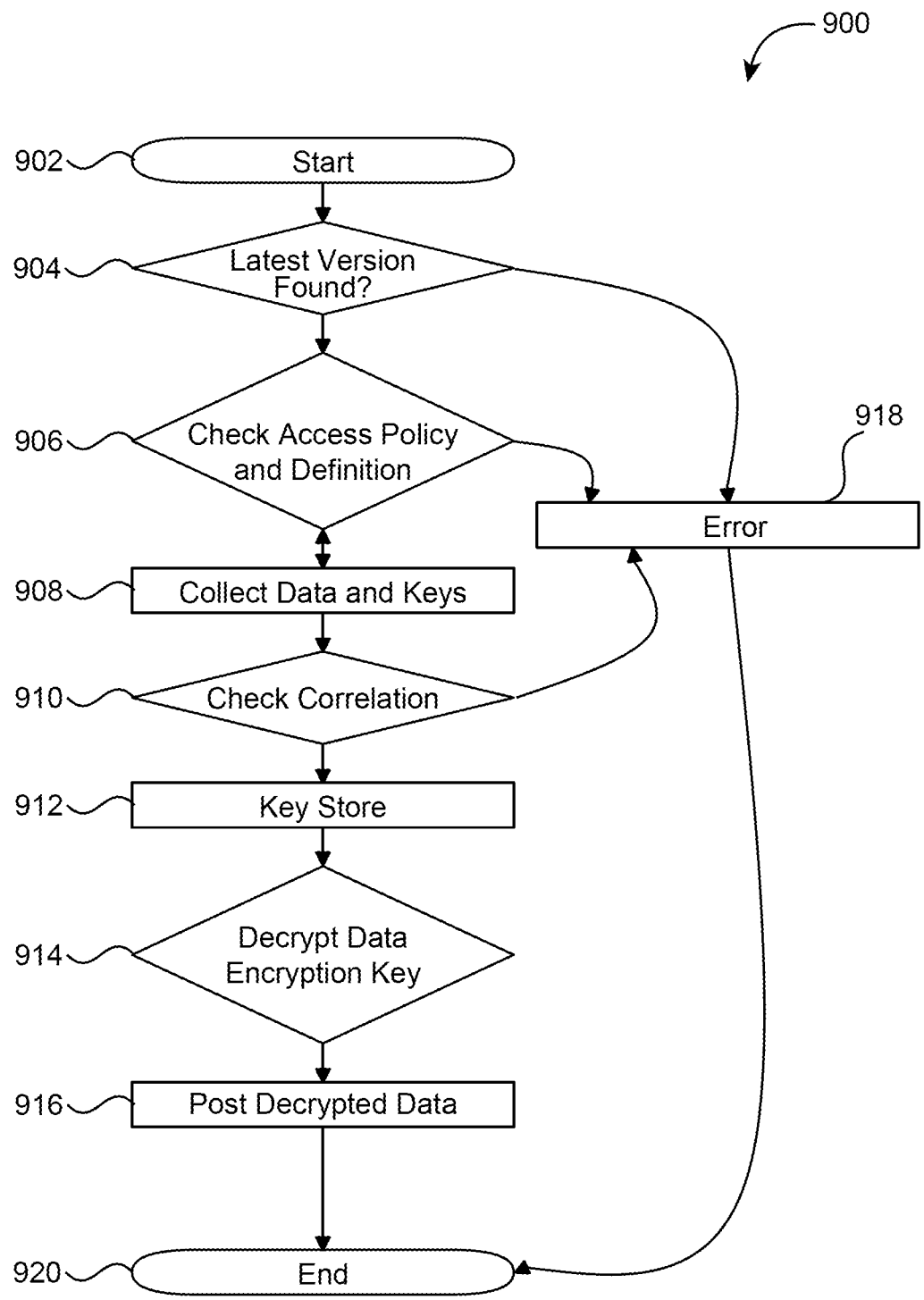
FIG. 9 illustrates a shipping document creation model 900 in accordance with an embodiment.

In some embodiments, a user may obtain booking information via a get booking process 900, as shown in FIG. 9. The process may start 902 with the system executing a find for the latest version 904 of the booking. The system may find the latest version 904 of a booking by a unique booking ID in the shipping document database. The record may contain the ledger name. The system may search for the latest version (of the booking) by the unique booking ID 904. In some embodiments, the system may not find the correct data record. When this happens, the system may produce and return an error 918. If the data record is found, the system may check the organization's access policy and check the access policy definition 906 to see what data the organization permissions may be. If the organization does not have an access policy assigned to its role, the system may return an error 918 and the process ends 920. If the access policy and definition are properly identified, the system may then collect the encrypted booking data and encrypted data encryption key from the ledgers of the booking 908. The ledgers of the booking may be located by their ledger names. The system may do a check correlation 910 step where the encrypted booking data and encrypted data encryption keys may be checked to see if they are the same in the distributed ledgers. If not, then an error 918 response may be returned and the process ends. If the data does correlate in different distributed ledgers, the process may login to the key store 912 and the key store decrypts the data encryption key using the private key of the sender organization. If the key store cannot decrypt the data, and error 918 response may be generated and the process ends. The system may then decrypt the data and key 914 and post the decrypted information 916 for the user. The process may then go to the End block 920.

A sample list of bookings 1000 is shown in FIG. 10. Here each booking created by a shipper using the booking API, may be listed and sorted based on a variety of different search criteria. The sample list of bookings 1000 may represent the database of booking records, which may be encrypted and stored in a database as described herein.

An example of databases may be seen here in Table I.

| Database Name | Description of data in database |
| --- | --- |
| ID repository | A list of users, user login credential and user parameter |
| Access policy repository | Global member list, list of access policy documents, list of role lists and list of dynamic access policies |
| Public key repository | A list of public keys of users |
| Key store | A list of private keys of users |
| Shipping document database | A list of shipping documents, e.g. booking request |
| Global user list | A list of all users and the roles of each member may take in various shipping documents |
| Role List policy | List of users and roles with access rights defined. |

Figure 11:
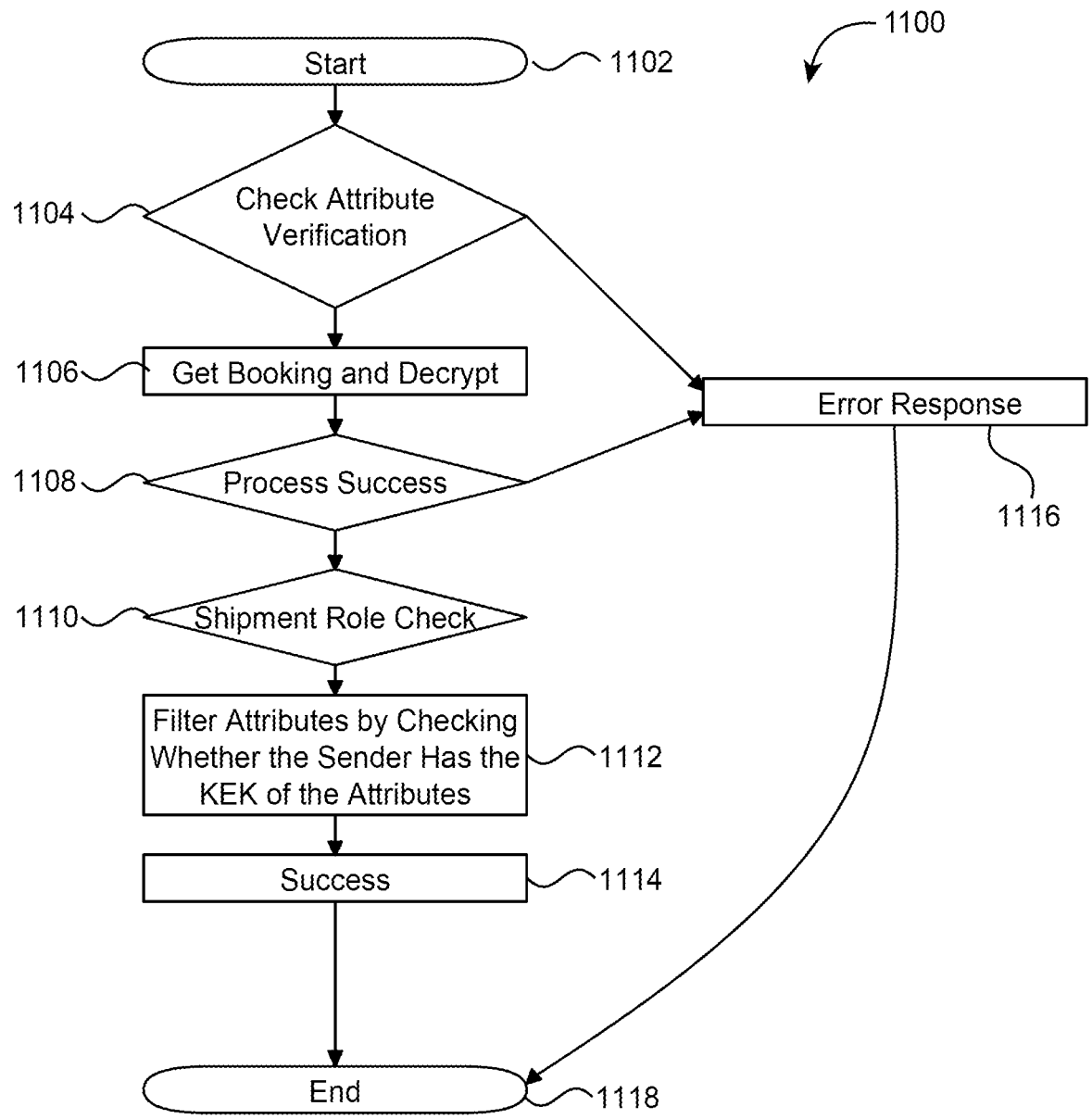
FIG. 11 illustrates a retrieve shipping document 1100 in accordance with an embodiment.

FIG. 11 illustrates a process to retrieve booking 1100 already placed in the system. The process begins at the start block 1102 and may proceed to do an attribute verification 1104 on whether the submitted request for the booking contains a unique booking ID and the sender's organization ID. In some embodiments, the system may use the booking number, version and booking provider's organization ID. The system may evaluate whether the request may have the attributes (attribute verification 1104) required. If the request does not have the required attributes, an error response 1116 may be generated and the process ends 1118. If the request has the required attributes, then the process may get the booking information from the shipping document database and decrypt the encrypted booking information 1106. In some embodiments, the database may be encrypted in a blockchain format and stored in a distributed ledger, or a hyper-ledger. The system may check to ensure the desired booking is properly retrieved and decrypted 1108. If not, the system may generate an error response 1116. If the booking is retrieved and decrypted, the system may now do a shipment role check 1110, and may determine for each shipment party whether the organization ID of its organization may be the same as the sender's organization ID. If yes, the system may collect the shipment role of the shipment party.

The system may perform a shipment role check 1110 to verify that at least one shipment role is collected, then for the collected shipment roles, the system may get the attributes that may be allowed to be read by those roles. In some embodiments, the system checks to see each shipment party role, and identifies the attributes the party may be allowed to see based on the shipment role check 1110. The attributes which the party may not be allowed to see are removed in a filter attributes 1112 check, in some embodiments. On success 1114, a success response code may be returned.

Any errors that may remain unresolved may terminate the process at the end 1116 step.

Figure 12:
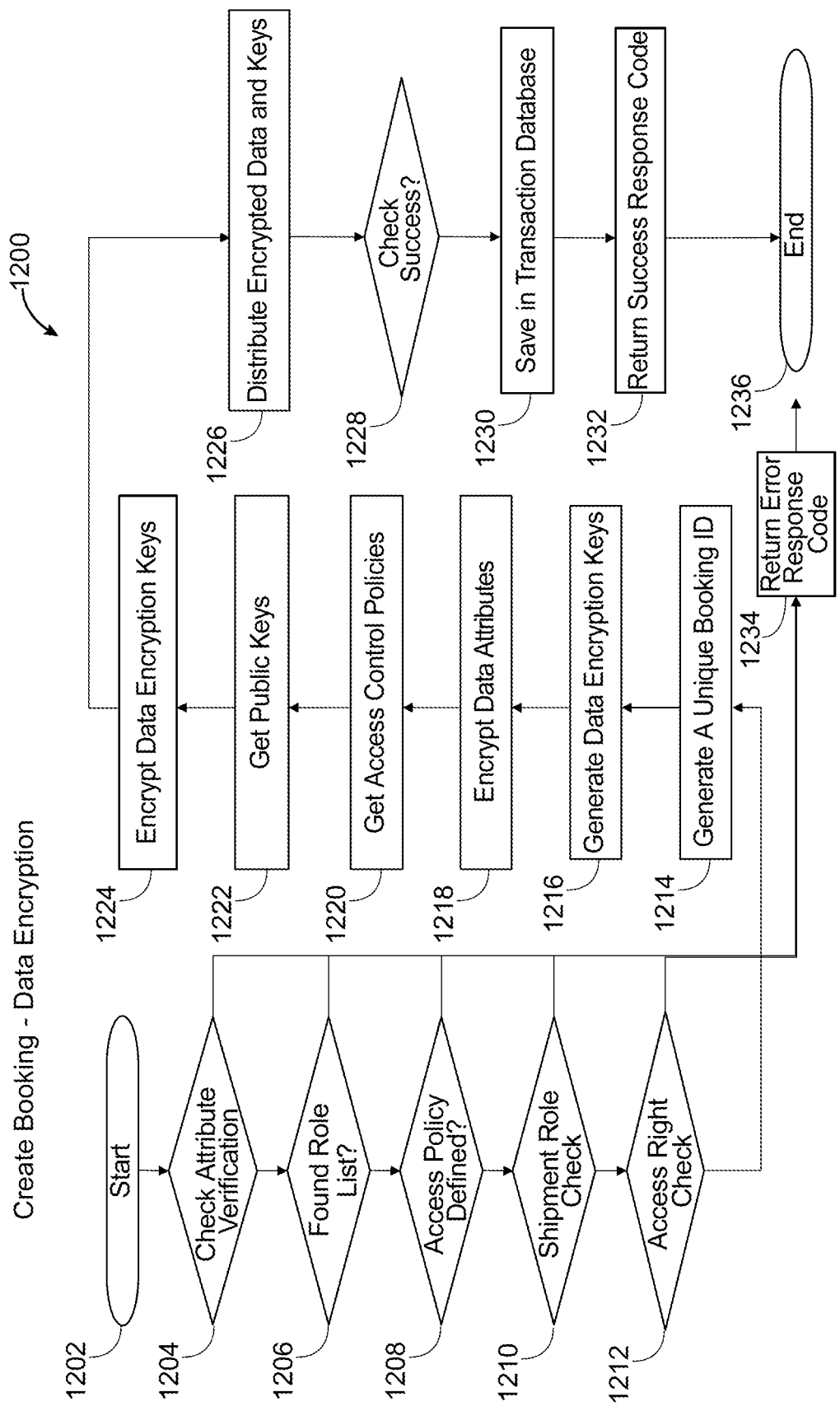
FIG. 12 illustrates a create shipping document 1200 in accordance with an embodiment.

The creation of a booking reservation is now shown in FIG. 12. Once the booking payload request is received from a user or organization, the process of making the booking begins (start block 1202). The system may first check to see if the submitted request contains a reference booking number and the user's organization ID 1204 (check attribute verification). If the user's organization ID and/or the booking number are not in the submitted request, then the system may report an error 1234 and the process may end 1236. If the organization ID and booking number are present, then the system may find a role list of the booking by locator key 1206. The locator key may be constructed by reference booking number and the user's organization ID. If the role list is not found, then the system may report an error 1234 and the process may end 1236. If the role list exists, then the system may check whether the access policy of the booking might be defined 1208. If the access policy is not defined, the system may return an error 1234 and the process may end 1236. If the access policy is defined, then the system may check for each shipment party, check whether the organization ID of the shipment party may be the same as the sender's organization ID. If one or more organization IDs may be the same, then the system may collect the shipment role of the shipment parties 1210.

The system may then check to see if at least one shipment role may be collected. If no role is collected, an error may be returned 1234 and the process may end 1236. If at least one role may be identified, then the system may check whether the collected shipment roles have access rights to create all submitted attributes of the booking data 1212. If the role does not have the access rights, an error may be returned 1234 and the process may end 1236. If the access rights are correct, then the system may generate a unique booking ID for the booking 1214. Once the booking ID is created, the system may generate individual data encryption keys for each data attribute 1216. The keys may be symmetric keys. After the encryption keys are generated, the system may encrypt each data attribute with its data encryption key 1218. In some embodiments, there may be one data encryption key for each data attribute encrypted (a 1:1 relationship). The system may then retrieve the shipment role information for each shipment party, and may also retrieve the access control policy for each shipment role 1220. If a shipment party has an access control policy, the system may retrieve the public key from the public key repository 1222. The system may retrieve the proper key for the particular organization ID associated with the party assigned to the role. For each shipment party, for the data attributes which can be read, the system encrypts the corresponding data encryption keys one by one with the public key of the shipment party 1224. The system may then distribute the encrypted data and encrypted data encryption key to the proper organization 1226. The system may verify that the data and keys are distributed to all ledgers of related shipment parties successfully 1228. In some embodiments, the ledger may return a response to indicate whether the encrypted data and encrypted data keys were successfully distributed or not. If the system cannot verify proper distribution, the system may generate an error code 1234 and the process may stop 1236. If the system does verify the distribution of the encrypted data and encrypted data encryption keys, then the system may save the ledgers' name, the unique booking ID and the booking version number in the shipping document database 1230. The system may then generate a successful response code 1232 and the process may end 1236.

Figure 13:
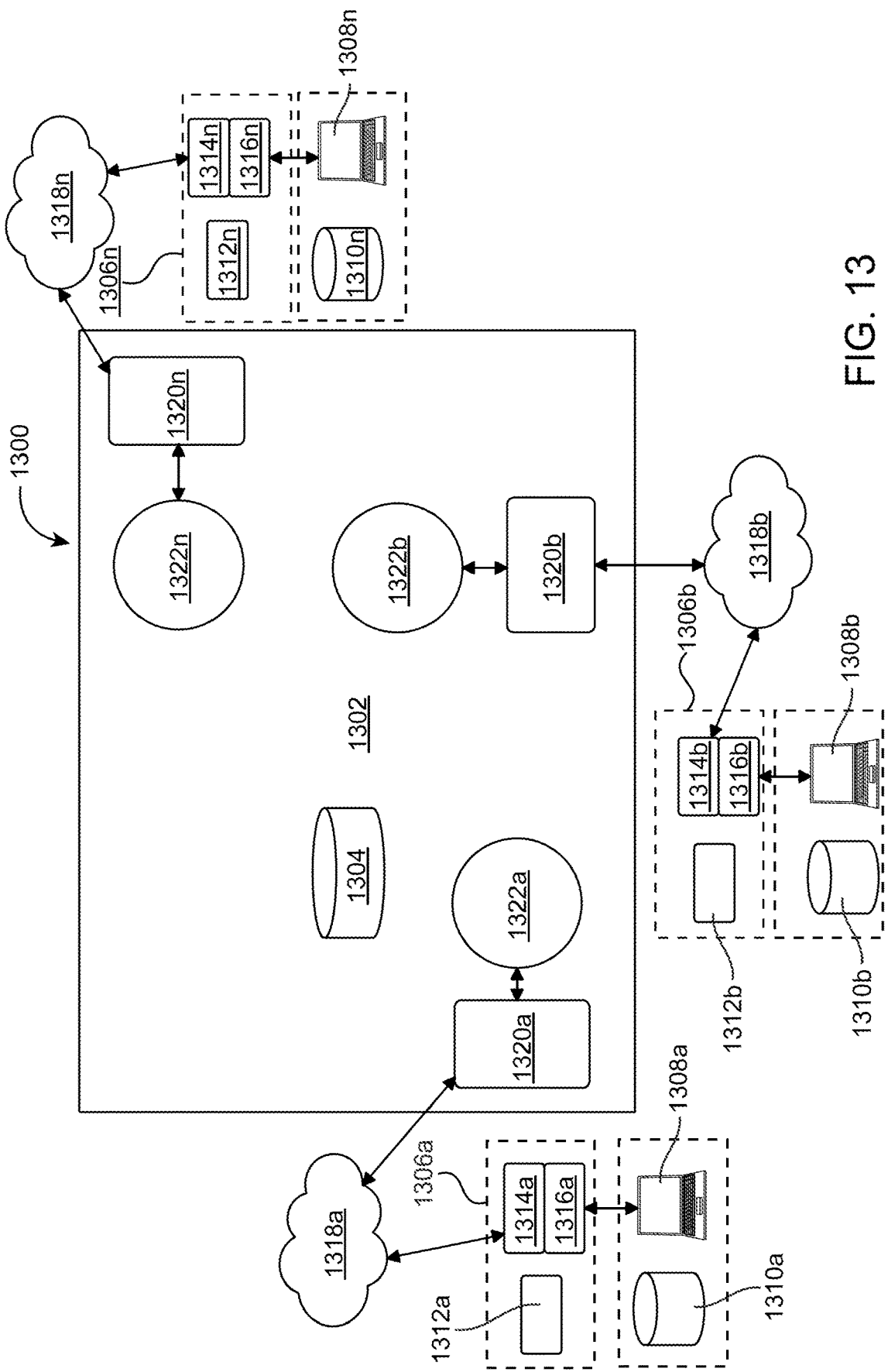
FIG. 13 illustrates an example system 1300 in accordance with one embodiment.

In some embodiments, a shipping document control hub 1302 of the system 1300 may be seen in FIG. 13. In some embodiments, the shipping document control hub 1302 may have a series of user nodes (for illustrations purposes and presented as an example, user node 1 1306, user node 2 1324 and user node N 1342). Each user node may connect to a corresponding blockchain logic (1 through N) and own a blockchain node (1 through N). The blockchain logic 1 1320 and blockchain node 1 1322 may be part of the shipping document control hub 1302. The shipping document control hub 1302 may also have an offchain database 1304.

Each user node may be assigned to one or more users. For example, a first user node 1306a may be assigned to a carrier organization, and a second user node 1306b may be assigned to another carrier organization. Each user, such as a vessel operator, a terminal operator, a consignee, a shipper, and so on may have a user node 1306a-n assigned to them. Although three nodes are presented in the present figure, it should be understood that this figure is merely illustrative, and not meant to be limited in any way. The number of nodes the system may have is unlimited, as designated by the "n" notation. Each blockchain logic in each node may also communicate with an offchain database 1304. In some embodiments, the user nodes 1306a-n may access the blockchain logic 1320a-n to write encrypted data and an encrypted data encryption key (DEK) to one or more blockchain nodes 1322a-n. The cryptographic access layer 1314a-n may communicate with the blockchain logic 1320a-n through a network communication 1318a-n. Any data sent between the cryptographic access layer 1314a-n and the blockchain logic 1320a-n may be encrypted. The cryptographic access layer 1314a-n may do various decryption and encryption functions based on an access policy. The cryptographic access layer 1314a-n may generate symmetric data encryption keys (DEK), encrypt data by the DEKs, encrypt DEKs by public key of shipment parties and access a key store 1312a-n to decrypt DEKs. The API interface 1316a-n, cryptographic access layer 1314a-n and the key store 1312a-n may exist in an isolated network or user node 1306a-n that may not be accessible without permission. The client application 1308a-n may connect to an API interface 1316a-n to write to, or get data from, a blockchain node 1322a-n. The client application 1308a-n may be a computer, a server, or any computing device having a processor, with access to a memory device and access to a network connection to communicate with the blockchain API 1316a-n. In some embodiments, the network connection may be secure. The blockchain API 1316a-n may pass a request from the client application 1308a-n to the cryptographic access layer 1314 a-n. The client application 1308a-n may also have a client application database 1310a-n. The data in the client application database 1310a-n may be in plain text. The client application 1308a-n may search directly in the client application database 1310a-n. Users may access the client application 1308a-n and then the user node 1306a-n and then the blockchain logic 1320a-n through their own network connection 1318a-n.

The description provided for user node 1306 may operate in a similar or identical manner to that for user node 1324. In some embodiments, the blockchain node components described may be distributed ledgers. In some embodiments the blockchain node components may be hyper ledgers.

In some embodiments, an access control policy may be used to determine the distribution of shipping documents as shown in FIG. 14. In some embodiments, various parties may provide a shipping document from a user node to a shipping document control hub. For example, an example carrier and an example shipper, both having client nodes, may communicate a shipping document to a shipping document control hub. Each user node may have, or may have access to, an API interface, a cryptographic access layer and a key store. In the example shown, the carrier may send the shipping document role list to the shipping document control hub, while the shipper may send the shipping document to the shipping document control hub. The shipping document role list and shipment document may be encrypted.

The shipping document hub may have an access control policy (access policy) with a static portion and/or a dynamic portion, as shown in FIG. 14. The static portion may include a global member list and a list of access policy documents. The global member list may be used to determine an assigned role of a member. In some embodiments, a member may have multiple assigned roles. The access policy may also have a list of access policy documents. These generally refer to the types of documents that may be used between roles in a freight shipment. Some examples include, but are not limited to; a bill of lading, a terminal load or unload manifest, a booking contract, a pre-booking contract, and so on. The access policy may have an access policy document corresponding to each shipping document type. The relationship between the access policy document and the shipping document type may be 1:1, or it may be 2+:1 or it may be 1:2+. These various relations and look up features may be generally static. In some embodiments, the relationship between the access policy document and the shipping document type may be updated and/or revised.

In some embodiments, each of the lists, data structures, databases and policies may have a dynamic version and a static version. The static version may be the last saved version, while archives of each saved version may exist in the blockchain. A dynamic version may exist as users or the systems updates or makes changes to any of the items to be stored in memory, or stored in the blockchain. In some embodiments, the dynamic version may exist only in temporary memory. In some embodiments, the dynamic version may be written to persistent memory or the blockchain.

In some embodiments, there may be a dynamic portion of the access policy. The access policy may have a list of dynamic role lists. In some embodiments, the dynamic role list may have a locator key which may locate a corresponding role list in the access policy. In some embodiments, a locator key may locate a role list or a shipment document. The shipping document may or may not be part of the access policy. The role lists may be constructed using the dynamic shipment parties from one or more shipment documents. The list of dynamic access policies may provide each shipping document with a correlation to a specific access policy. In some embodiments, the role lists in the dynamic operation may be generated and submitted with the shipping document, the role list may be copied to a dynamic version of the static access policy document (creating a dynamic and static access policy document), and the dynamic access policy may be assigned to that shipping document. In some embodiments, the dynamic access policy may exist as long as the shipping document does, and the dynamic access policy controls the distribution of the shipping document, and all related documents to that particular shipping number.

In some embodiments, a carrier sends a booking request to the shipping document control hub. The shipper example may be similar to the carrier example, but the role list for the distribution of shipper's shipping document may be an existing role list in the shipping document control hub. The existing role list in the shipping document control hub may be created by the carrier previously, when the carrier submitted the shipment document and role list. The request may be sent to various members based on the role list. The document control hub may notify each user of the booking request (or other document). For example, the vessel operator may be notified that its vessel is to transport the specified containers, a terminal operator may be notified that it is to receive the vessel transporting the containers, and a consignee may be notified to pick up the containers on an estimated delivery date. In some embodiments, they system may log that the various users have been notified of their respective responsibilities in the booking request and log that notification. In some embodiments, the various users may provide an acknowledgement to the booking request receipt (manually or automatically). The response documents come back to the shipping document control hub and are routed to the carrier. The role list may be part of the dynamic access policy, and the dynamic access policy may be used to control the distribution and sharing of documents for this transaction until the transaction is complete. In some embodiments, the system may simply verify the data delivery and not need any acknowledgment from the receiving parties.

In some embodiments, the access policy may have a global member (user) list. The global member (user) list may be a listing of all users of the system, and the role each user may take in various shipping transaction and documents. The roles may correspond to those used in the shared shipping document (e.g., shipper, carrier, vessel operator, terminal operator, and so on). The access policy may also have a list of access policy documents, each applies to a shipping document type (e.g. Dangerous Goods (DG) certificate, Bill of Lading, Container Gate-in Event, Container Gate-out Event, and so on). The access policy may also have a list of role lists, each pertaining to any shipping document with the same locator key (e.g., Carrier+booking (BKG) Number). The access policy may also have a list of dynamic access policies, each pertaining to any shipping document with the same locator key and shipping document type. The dynamic access policy may define which specific party can create, update, read, and/or receive the shared shipping document and may create, update, and/or read at the attribute level. This dynamic access policy may be derived from a role list of a given locator key and/or an access policy document of a given shared shipping document type.

When a user logs in to the user node to access the shipping document control hub, the user may be identified by their login credentials. The user's client application may send a shipping document role list to the shipping document control hub. The shipping document user node may identify, from the shipping document role list, the role list type. The shipping document client may get from the shipping document control hub, any one or more of the following information from the access policy:

The user's role(s) from the global user list (or global member list).
    The role list type's access policy document
    a shared access policy document for each shared shipping document type, and
    a list of dynamic access policies, where the dynamic access policies are particular to a shipping document, the dynamic access policy defining the access rights of each role to a shipping document.
    any other information linked to either the access policy, the user ID or the user role.

The shipping document user node may verify if the user's role(s) may be allowed to create (update) the shipping document role list against the access policy document. The shipping document user node may identify from the shipping document role list the roles with newly assigned values and further verify if the user's role(s) may assign those roles.

The verified shipping document role list may be encrypted and submitted to the shipping document control hub and may have it added to the access policy of a particular locator key.

In some embodiments, the client application may send a shipping document to shipping document user node. The user node may identify, from the shipping document, the document type and the locator key. The shipping document user node may get from the shipping document control hub the following information from the access policy:—
    The shipping document's dynamic access policy (at the document hub, upon shipping document user node request to derive the dynamic access control policy from role list of the given locator key and access policy document of the given shipping document type)

The shipping document type's access policy document

Any other information the user may have access or permissions to.

The shipping document user node may also identify the role(s) the user plays from the dynamic access policy. The user node may verify if those role(s) may create (update) the shipping document against the access policy document. The user node may identify from the shipping document the data attributes with newly assigned values and further verify if those role(s) may create (update) those data attributes.

In some embodiments, the verified shipping document may be encrypted and submitted to the shipping document control hub.

For example, a carrier may submit an encrypted role list and an encrypted shared shipping document to the shipping document control hub. The carrier (or other user) may send the role list first, identified with a booking number or other document ID that ties the role list to the shipping document. Alternatively, the shipping document may be sent with (or after) the role list, and the shipping document may correlate to the role list with the locator key. The role list may be read, and the role list may include a listing of the roles the carrier is to notify. The role list may also have a digital signature of the originator (sender), allowing the role list to be correlated to the originator. The shipping document may contain data representing the terms of the proposed contract (quantity, delivery, schedule, and so on). These terms may be individually encrypted as data attributes. The list of roles may have specific shipment parties' names associated with them.

The role list may be copied from the shipping document and added to an access policy unique to the shipping document. The access policy may contain the information on each shipment party that may be involved in the shipping document. The role list of the access policy may provide the identity of members that may receive data originally provided in the shipping document. Each shipment party on the role list may get data appropriate to their particular role (function) from the shipping document.

The data attributes of the shipping document may be encrypted one by one by separated symmetric keys. The symmetric keys may be encrypted one by one, with the public key corresponding to each shipment party that may have a role in the shipping document. The role of each shipment party may be defined by the role list. The symmetric keys of the data attributes may then be partitioned to each user (shipment party) who needs or requests the data attributes, and symmetric key of each data attribute going to the proper shipment party may be encrypted using the party's public key. The encrypted data attributes, the encrypted data encryption key, the hash of the encrypted data attributes and document originator's digital signature may then be sent to the shipment parties.

In some embodiments, the shipping document client may send the encrypted shared shipment document, encrypted data encryption keys (DEK), the hash of the encrypted data attributes and document originator's digital signature role list to the shipping document control hub. The shipping document control hub may use the locator key of the shipment document to find the role list in the access policy. Based on the role list, the shipping document control hub may look up the list of recipients. In some embodiments, the shipping document control hub may have access right to decrypt the role list to get the list of recipients. In some embodiments, the user node may provide public keys of shipment parties in the role list and the shipping document control hub may look up the list of recipients based on the public keys. In some embodiments, the user node may provide plain text of list of recipients to the shipping document control hub together with the shipment document. The list of recipients may be the parties (users) in the role list. The shipping document control hub may then distribute the encrypted shipment document data attributes, encrypted data encryption keys, hash of the encrypted data attributes and document originator's digital signature to write to the corresponding blockchain nodes according to the list of recipients. The shipping document control hub may check whether the document, keys, hash and signature write to the blockchain nodes successfully. If the document, keys, hash and signature write successfully, the shipping document control hub may publish an event to the originator's message broker hub to notify the originator the transaction was successful. The shipping document control hub may also publish events with the encrypted shipment document, the encrypted data encryption keys and document originator's digital signature to the list of recipients.

The access policy contains the information on each shipment party (user) that may be involved in the particular shipping document. The role list of the access policy may provide the identity of users that are to receive data originally provided in the shipping document. Each user who is on the role list may get data appropriate to their role (function) from the shipping document.

The data attributes of the shipping document may be encrypted one by one, with runtime generated symmetric keys called data encryption keys (DEK). The DEKs may be encrypted one by one, with the public key corresponding to each user that may have a role in the shipping document and may have access rights to the corresponding attributes. The role of each user may be defined by the role list. The access right of each role to each attribute may be defined by the access policy. The encrypted data attributes, the encrypted DEKs, hash of the encrypted data attributes and document originator's digital signature may then be sent to the appropriate member.

In some embodiments, a user may submit a status update to the shipping document control hub. The status update provides data, such as the container of shipping document identification number 12345 was received and unloaded, and someone may have to pick them up. The terminal status update for shipping document 12345 may not find any role list. So other than sending the update to the shipping document control hub, the status update may be buffered in the user node. Another party may subsequently send the role list to the user node, this role list may have the same shipping document ID (12345). The user node may continue to process the terminal status update.

The user node may get from the shipping document control hub the following information from the access policy:

The terminal status update's dynamic access policy (the dynamic access control policy may be derived from role list of the given locator key and access policy document of the given shipping status update type)

The shipping status update type's access policy document

The user node may identify the role(s) the user plays from the dynamic access policy. The user node may verify if those role(s) are allowed to create the shipping update status against the access policy document. The user node may also verify if those role(s) can create those data attributes of the shipping update status.

This verified shipping status update may be encrypted and submitted to the shipping document control hub.

In some embodiments, the user node may receive various documents from the shipping document control hub, based on the user's access policy: The terminal status update's dynamic access policy (the dynamic access control policy may be derived from role list of the given locator key and access policy document of the given shipping status update type), and the shipping status update type's access policy document. The shipping document user node may also identify the role(s) the user plays from the dynamic access policy. The shipping document user node may verify if those role(s) are allowed to create the shipping update status against the access policy document. The shipping document user node may also verify if those role(s) may create those data attributes of the shipping update status. After the verification, this verified shipping status update may be encrypted. The encrypted shipping status update, the encrypted data encryption keys, hash of the encrypted data and user's digital signature may be submitted to the shipping document control hub with a list of recipients.

An example of the method of operation is now described.

In an example of a shipping operation of the present disclosure, the following parties are involved:
Shipper: Factory A
Consignee: S-Mart
Carrier: XYZ
Route: China to USA
Cargo: Toys
No. of Containers: 5

In this example the shipping line is XYZ, and the shipping line is organizing the transport of 5 containers of toys from factory A (located in China) to a port in the USA. The carrier generates a shipping document for the shipment.

TABLE II

| Header Field | Data attribute |
| --- | --- |
| Shipper | Factory A |
| Consignee | S-Mart |
| Last Terminal Operator | Long Beach, CA |
| ... | ... |
| Vessel Operator | SS Freighter |
| Carrier | XYZ |

The carrier is the party that organizes that shipment of the toys from China to the USA. The carrier then provides the above shipment order to the user node in plain text through a secured transmission. The user node then encrypts the data attributes while leaving the header fields alone. Each data attribute is encrypted and has a separate data encryption key.

TABLE III

| Header Field | Data attribute |
| --- | --- |
| Shipper | Encrypt ("Factory A", k1 Key)* |
| Consignee | Encrypt ("S-Mart", k2 Key)* |
| Last terminal | Encrypt ("Long Beach, CA", k3 Key)* |
| Vessel Operator | Encrypt ("SS Freighter", k4 Key)* |
| Carrier | Encrypt ("XYZ", k5 Key)* |

*Data provided in encrypted fields do not represent actual encryption information. The text string is merely illustrative. "Encrypt ("Factory A", k1 Key)" means the text value "Factory A" is encrypted by "k1 Key"

The encrypted data may be recorded in the blockchain nodes, each data encryption key (k1-k5 in this example) may be encrypted according to the public key of the user matching the assigned role and access policy. In this example, Shipper Factory A may have access rights to all data attributes. The public key for Factory A may then be used to encrypt all keys (k1, k2, k3, k4 and k5). All shipping documents may be encrypted separately. The keys may also be encrypted individually (either serially or in parallel). The keys may be encrypted in a batch format so long as the individuality of each key can be protected (each encrypted key can be independently decrypted, and used to access the particular shipping document the key corresponds to without the key being able to decrypt any other shipping document).

The rights of each shipment role to read, create or update the data attribute of the shipping document may depend on the access rights defined by the system. In this example case, there may be a look up table that provides the rules established by the system as follows:

TABLE IV

| Shipment Role | D1 | D2 | D3 | D4 | D5 |
| --- | --- | --- | --- | --- | --- |
| Shipper | R | R | R | R | R |
| Consignee | R | | | | R |
| Last terminal operator | | R | R | | |
| Vessel operator | | R | | R | |
| Carrier | CRU | CRU | CRU | CRU | CRU |

Table IV illustrates the access policy of different shipment roles (e.g. shipper, consignee, last terminal, vessel operator, carrier, etc.). D1-D5 are data attributes, which are encrypted by (k1-k5). R is "Read", "U" is "Update" and "C" is "Create". If consignee has access right ("Read", "Update" or "Create") on D1 and D5, the k1 and k5 will be encrypted by public key of the consignee.

[PC1] The public key of shipper Factory A may be used to encrypt all keys (k1, k2, k3, k4 and k5). The public key for last terminal operator Long Beach Terminal of the port in USA may be used to encrypt k2 and k3. The public key for the vessel operator SS Freighter of the shipment may be used to encrypt k2 and k4, and finally, the public key for carrier XYZ may be used to encrypt all keys (k1, k2, k3, k4 and k5). The vessel operator does not need to know any information about the shipper. The information regarding the shipper may be invisible to the vessel operator and the set of data attribute keys available for the vessel operator may not include the key for the shipper's data attribute.

Once the encryption of keys is completed and/or stored, the individual users may be notified the data is available. Each user, using their own private key, may decrypt their respective key and access the system to see the data in the distributed ledger, while the information of the other users remains safely encrypted.

Figure 15:
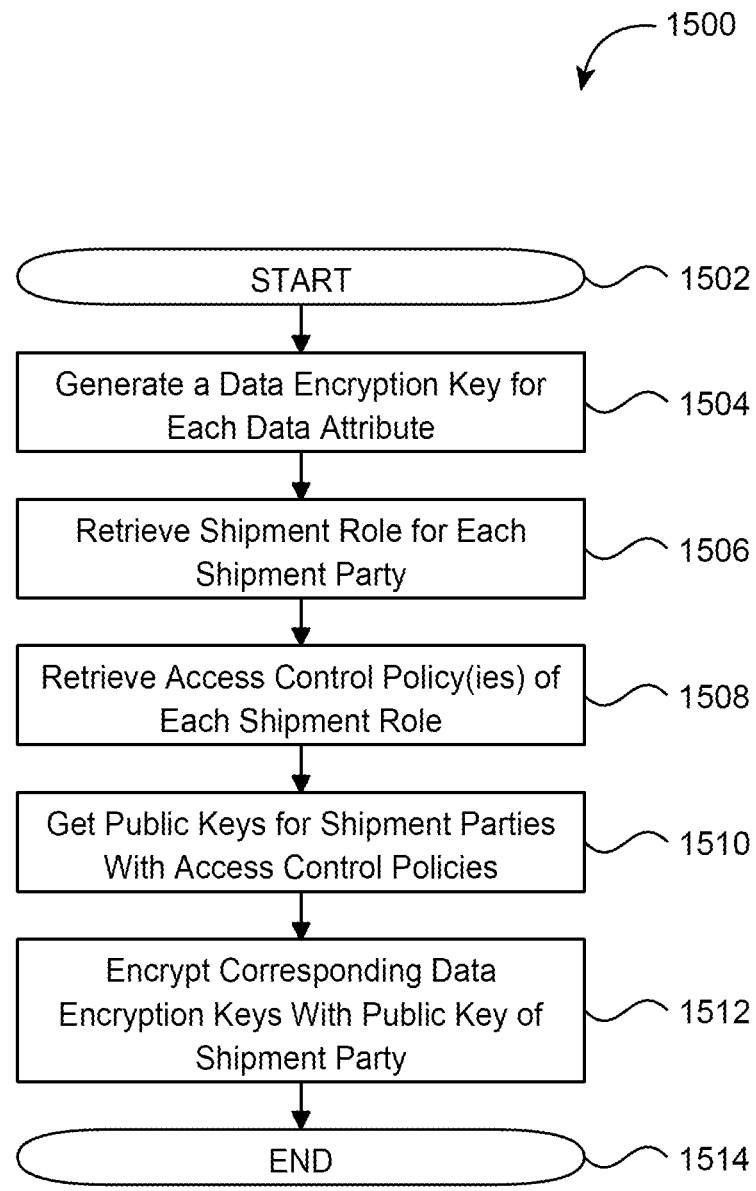
FIG. 15 illustrates a generating keys and matching those keys to a user's assigned role and access policy 1500 in accordance with one embodiment.

In a more general form, the process for generating the proper keys for accessing various data attributes having different owners may involve a process of generating keys and matching those keys to a user's assigned role and access policy 1500 as shown in FIG. 15. After the start block 1502, the process may generate a data encryption key for each data attribute 1504. In some embodiments, the keys may be symmetrical keys. Encryption keys may be made for each data attribute. The system may retrieve the shipment role for each shipment party 1506. As described herein, each party may have a shipment role in the booking. The role may be any defined role in the system. Additional roles may be added to the system to accommodate additional parties (each user may be a party to the single, shipping transaction, but a user does not have to be a party to the single shipping transaction) as often as desired. In some embodiments, a single user may have one shipment role. In some embodiments a single user may have two or more shipment roles. In some embodiments, a user may access the system without a formal shipment role, as described herein. The process may retrieve the access control policy of each shipment role 1508. The access control policy may provide the information to inform the process what data attributes each shipment party may have access to. The process may then provide public keys for the shipment parties with access control policies 1510. Here each shipment party that may have access to control policies may also have a public key stored in a public key repository. The process correlates the shipment party's role with the access control policy to see which data attributes the shipment party may have access to. The process may then retrieve the appropriate public key of the shipment party. The process may then encrypt corresponding data encryption keys with the public key of the shipment party 1512. The encryption of the data encryption keys may be done one by one, in serial fashion. In some embodiments, the encryption of the data encryption keys may be done in parallel. In still other embodiments, the encryption of the data encryption keys may be done in a batch. Each data encryption key may be encrypted such that each key encryption key corresponds to one or more data encryption keys, and each one-to-many relationship of the key encryption key and the encrypted data key corresponds to a single data attribute. It may be thought of as a one-to-many, or one-to-one relationship (1:m and 1:1). Once the process is completed, the process may end 1514.

In some embodiments, a party may be added to the role list or access policy, but that party may not have an actual role in the shipment. In some embodiments, a non-shipment role party may be a financial institution. In some embodiments the non-shipment role party may be a regulatory or government body. In some embodiments, the non-shipment role party may be an insurance company, a bondsman, a judicial body, a trade regulator, a labor organization, or any other entity that may access or review the data for at least one data field of a document, access policy or other library of the system described herein.

Figure 16:
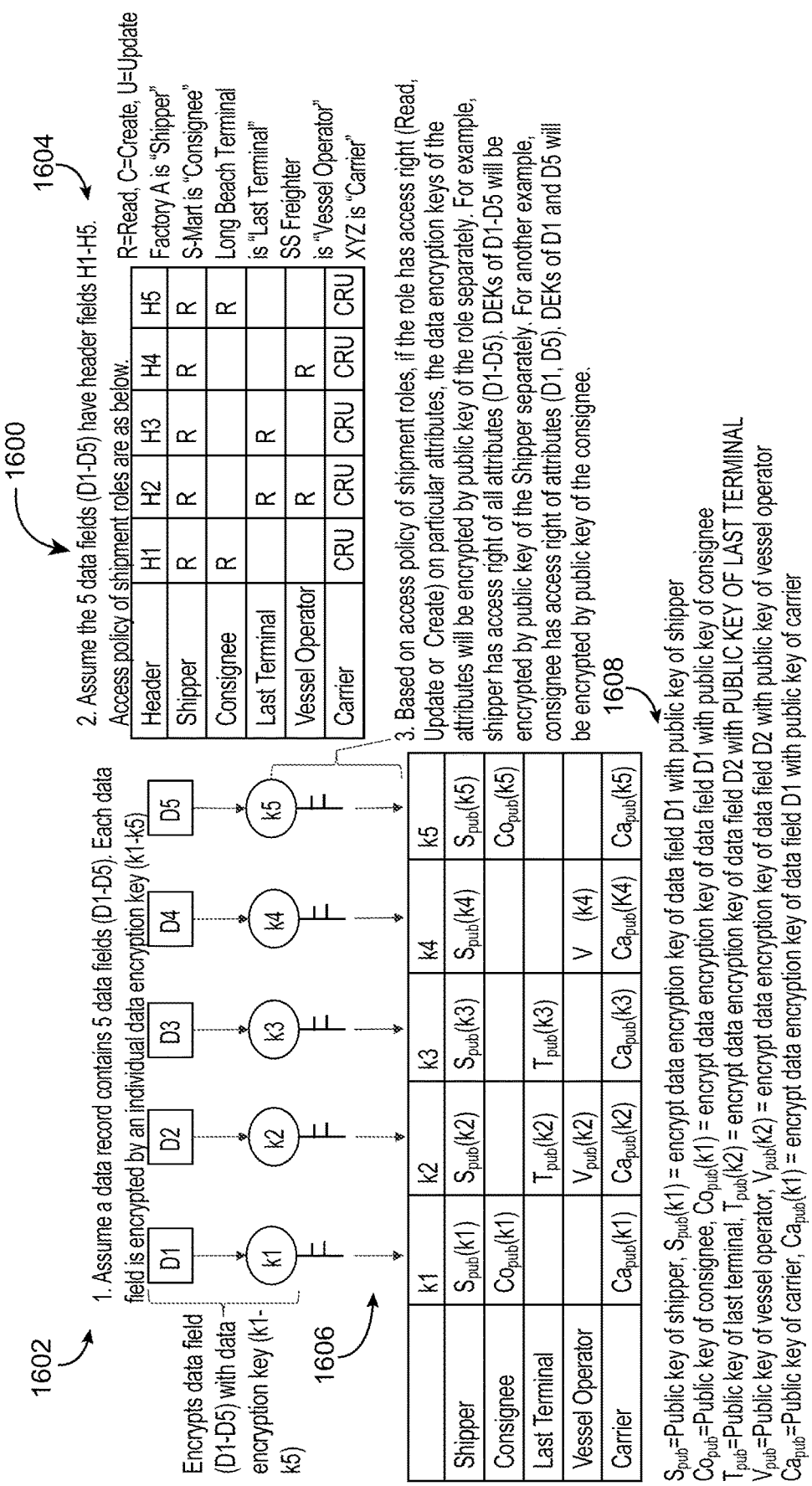
FIG. 16 illustrates a process for encrypting data attributes based on roles and access control policies 1600 in accordance with one embodiment.

FIG. 16 provides another example of the process for encrypting data attributes based on roles and access control policies. In this example 1600, five roles are presented in the form of a shipper, consignee, last terminal, vessel operator and a carrier. In some embodiments, there may be one party per role. In some embodiments, there may be one party having more than one role. In still other embodiments, two or more parties may share a single role. For the example depicted in FIG. 16, there are five roles, and one party per role.

In some embodiments, a data and key structure 1602 may contain five data attributes (D1-D5) as shown. Each data attribute may be individually encrypted with a data encryption key 1606 (k1-k5). Each data attribute may also have a header and data attribute field. As shown in the sample access control policy 1604, each role (shipper, consignee, etc....) has access control defined for headers and a header (top row) corresponding to each data attribute (H1→D1, H2→D2, H3→D3, H4→D4 and H5→D5). The intersection between the row (role) and column (header) provides the access policy for the role (the party of the left hand column for the matching row). For example, the shipper has the "R" access according to the access control policy. The shipper can "read" data attributes corresponding to D1-D5. However, the shipper may not update or modify the data, nor may the shipper create any data. The carrier, on the other hand may have create (C), read (R) and update (U) authority according to the sample access control policy of FIG. 16. The other parties, such as the consignee, may only read the data for H1 and H5, corresponding to D1 and D5. The last terminal may only read the data for H2 and H3, corresponding to D2 and D3. The vessel operator may only read the data for H2 and H4, corresponding to D2 and D4.

The data encryption keys may then be encrypted by the public key for each party having a role matching in the access control policy. In this example, the shipper has a public key ($S_{pub}$) that can be used to encrypt each data encryption key k1-k5 individually, as shown in the public key encryption of data encryption keys 1608 table. The row of the shipper in 1604 table means the shipper will have access to read the data attributes D1-D5, but will not be able to create, delete or update those fields. The consignee has a public key ($Co_{pub}$) that is used to encrypt the data encryption keys (DEK) corresponding to H1 and H5, which are the two data attributes the consignee has access to according to the consignee's access control policy 1604. The consignee's public key is used to encrypt k1 and k5. The encrypted k1 and k5 may be referred to as a DEK, and the consignee may have a DEKs for D1 and D5, which we abbreviate as k1 and k5. The consignee may receive k1 and k5 through their user node in the system. The consignee may then use k1 and k5 to access the data attributes corresponding to D1 and D5. The process may be the same for the last terminal, vessel operator and the carrier. Each party with a role may access their appropriate DEKs through their user nodes in the system, and may then access the data attribute corresponding to the DEK.

Figure 17:
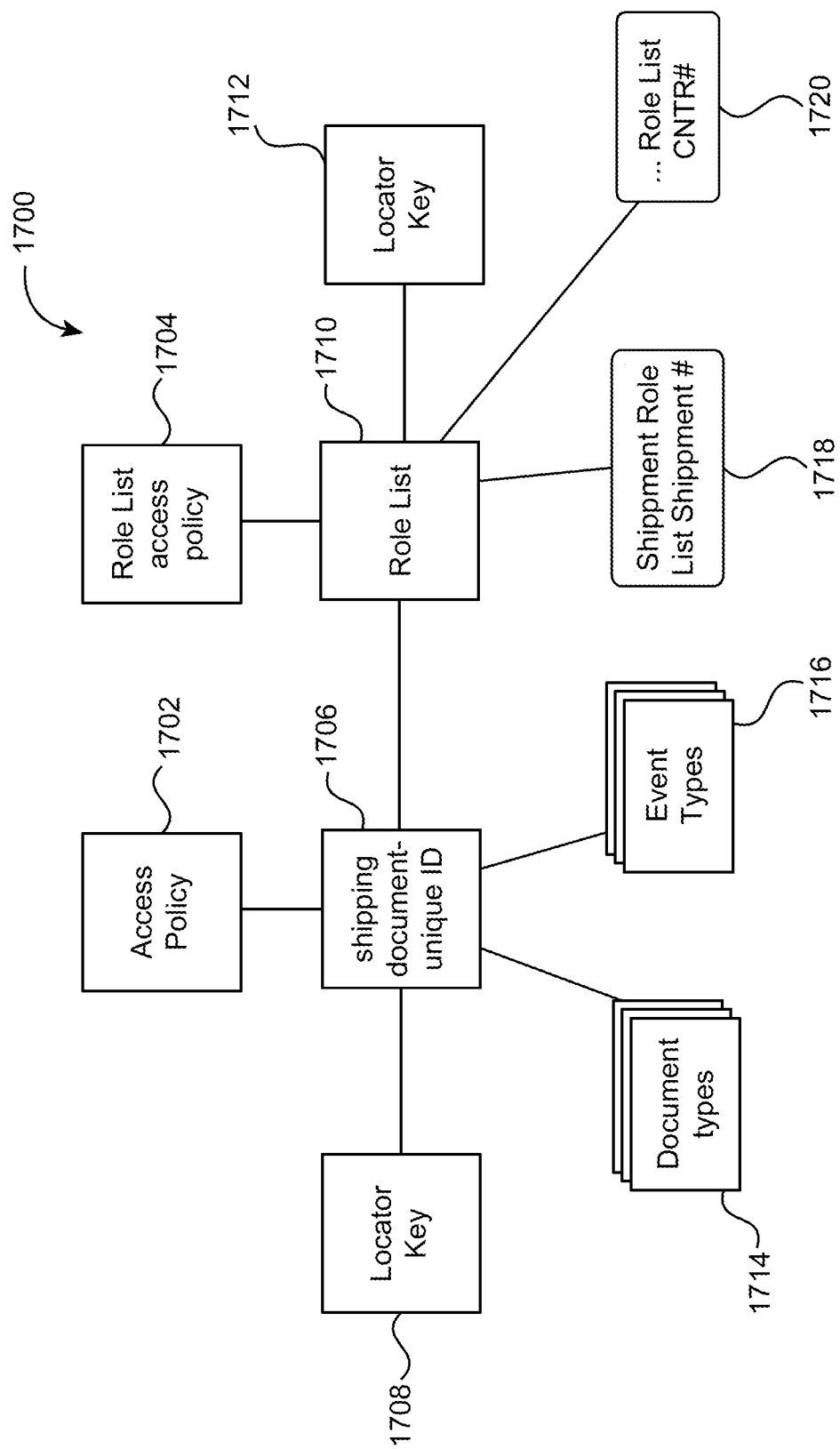
FIG. 17 illustrates a component relations example 1700 in accordance with one embodiment.

FIG. 17 illustrates an embodiment 1700 with a shipping document with a unique ID 1706 and a role list 1710. The access policy 1702 may be role based. It may have two levels. One level may be a document object level for the creation, update, logical delete, and reading of the shipping document 1706 per role. It may also provide an attribute level that permits the creation, update and reading attributes of the shipping document 1706. The role list access policy 1704 may be role based. It also may have two levels. One level may be a role list object level for the creation, update, logical delete, reading per role of a role list 1710. It may also have a role attribute level that permits the creation, updating and reading of the role list 1710. In some embodiments, a shipping document 1706 may be assigned a role list. The role list 1710 plus the shipping document access policy 1702 may provide the privileges of each user that is party to the shipping document. In some embodiments, each shipping document may have its own role list, and its own access policy. Each user may have a defined role on the roll list, and a defined access in the access policy. The intersection of the role for each user and the access of each user may define the privileges of that user. A role list may apply to many different shipping documents. e.g. a shipment role list may apply to a DG certificate, a bill of lading, terminal load or discharge events, or any other forms of shipping document 1706. These different forms of shipping documents may also be referred to as document types 1714 and event types 1716. Document types 1714 and event types 1716 may define a group of supported types of shipping documents 1706. In some embodiments, the shipping document 1706 of document type 1714 has versioning. In some embodiments, the version number of a document may increase incrementally each time the document is edited or modified. It may be used to support multiple versions of the same original shipping document. Each shipping document 1706 may have a unique ID. There may also be many kinds of role lists 1710. Shipment role list 1718, role list for container 1720 are some of the possible type of role list 1710. The shipping document 1706 and the role list 1710 may use locator key 1708 and locator key 1712 respectively. In some embodiments, the locator key 1708, locator key 1712 may not be encrypted. The locator key 1708, locator key 1712 may be visible to the shipping document control hub and may be used to support its (the hub) function. The locator keys may allow for a key based lookup, e.g. shipment number to identify related role list(s) 1710 and related shipping document(s) 1706. The shipping document 1706, by its type, may identify the access policy 1702.

Figure 18:
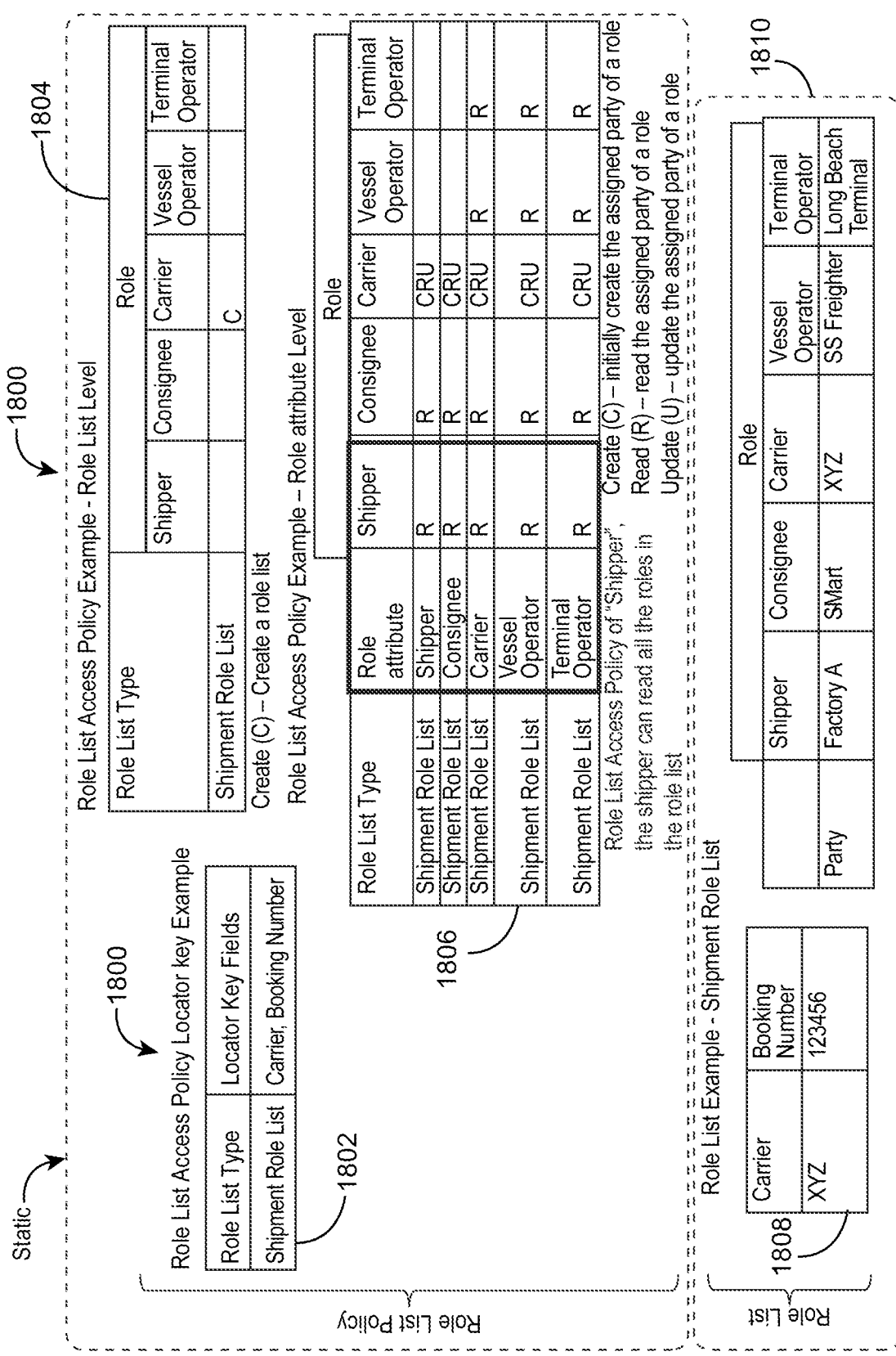
FIG. 18 illustrates an example role list and access control policy 1800 in accordance with one embodiment.

FIG. 18 illustrates some example role lists and role list policies. In some embodiments, a role list access policy locator key 1802 may provide example headers of "role list type" and "locator key fields." Beneath the "role list type is the "shipment role list" and under the Locator Key Fields are the carrier and booking number. This illustrates that the locator key fields of the shipment role list are the carrier and the booking number. A role list access policy example 1804 may show the categories of the role list types, where a shipment role list is provided. The roles are shown as: shipper, consignee, carrier, vessel operator and terminal operator. In this example table, the shipment role list indicates the carrier has the authority and system privileges to create a role list. None of the other roles in this example may create a role list. The next table shows a role attribute level example 1806. Here the "Role List Type" shows the "shipment role list" in the first column, and the "role attribute" in the second column. The individual roles from the role list access policy example 1804 are now listed in the role attribute column. The remainder of the table shows the "role" vs "role attribute" access privileges to either create, read or update (modify) a role attribute of a role list shipping document. The box in bold lines shows the second and third columns, and indicates the shipper may read all the roles of the shipment role list, however the shipper may not create or update any role attributes in the shipment role list. The role list example has role list locator key 1808 and role list content 1810. Role list locator key 1808 illustrates a carrier XYZ and a booking number 123456. The shipment role list may include role list content 1810, which may illustrate the identity of various users in their roles (for purposes of illustration only, these identities are fictitious).

Several example shipping documents 1900 are now shown, the documents may illustrate commercially relevant headers, but use fictitious data for illustration purposes only, as shown in FIG. 19. In some embodiments, there may be a shipping document of a container gate out event 1902 (from a terminal operator). The example table shows the event ID (the unique identifier of the shipping document), the carrier and booking number, (the carrier and booking number may allow the locating of the role list), and information about the intermodal container at the terminal. This information may be sent to the shipping document control hub and redistributed to other users identified on the role list, so each user may be notified simultaneously of this particular gate out event. The shipping document access policy may have 3 portions—"Role List Locator" key 1904, "shipping document access policy" 1906 and "shipping document access policy for gate out event field level" 1910. Role list locator key 1904 (an example of FIG. 17 1708) indicates that for a gate out event, the shipment role list may apply and the carrier and booking number may be used to locate the role list, which may be retrieved from the gate out example 1902 as Carrier XYZ and booking number 12345. The shipping document level policy example 1906 Indicates that for a gate out event, the five roles shown may read this shipping document type "Gate Out event" shipping document, but only the terminal operator (the originator of this event) role may create or update shipping document. In some embodiments, a role, such as the terminal operator, may also perform a logical deletion of the shipping document.

In some embodiments, the shipping document schema example 1908 may illustrate a field name in the left column (the "header field"), along with data attribute types in the column to the right. The sample data attributes may be any length, and the string lengths shown are merely illustrative. As illustrated in this example 1908, Event ID, is the unique ID for this shipment document type; and the carrier and booking number fields are the role lists locator key for this shipment document type. The shipping document policy field level example 1910 provides an illustration of the shipping document type (a gate out event in this example) and a field column, showing the various header fields from the schema example 1908, and the gate out event example 1902. The field list in the $3^{rd}$-$7^{th}$ (third through seventh) column of the field level example 1910 shows which role has what rights for each field. All the roles to the single transaction may read the data, while the carrier and terminal operator may update (modify) the data. Since the shipping document gate out event is an asset originating from the terminal operator, only the terminal operator may create this kind of shipping document.

Figure 20:
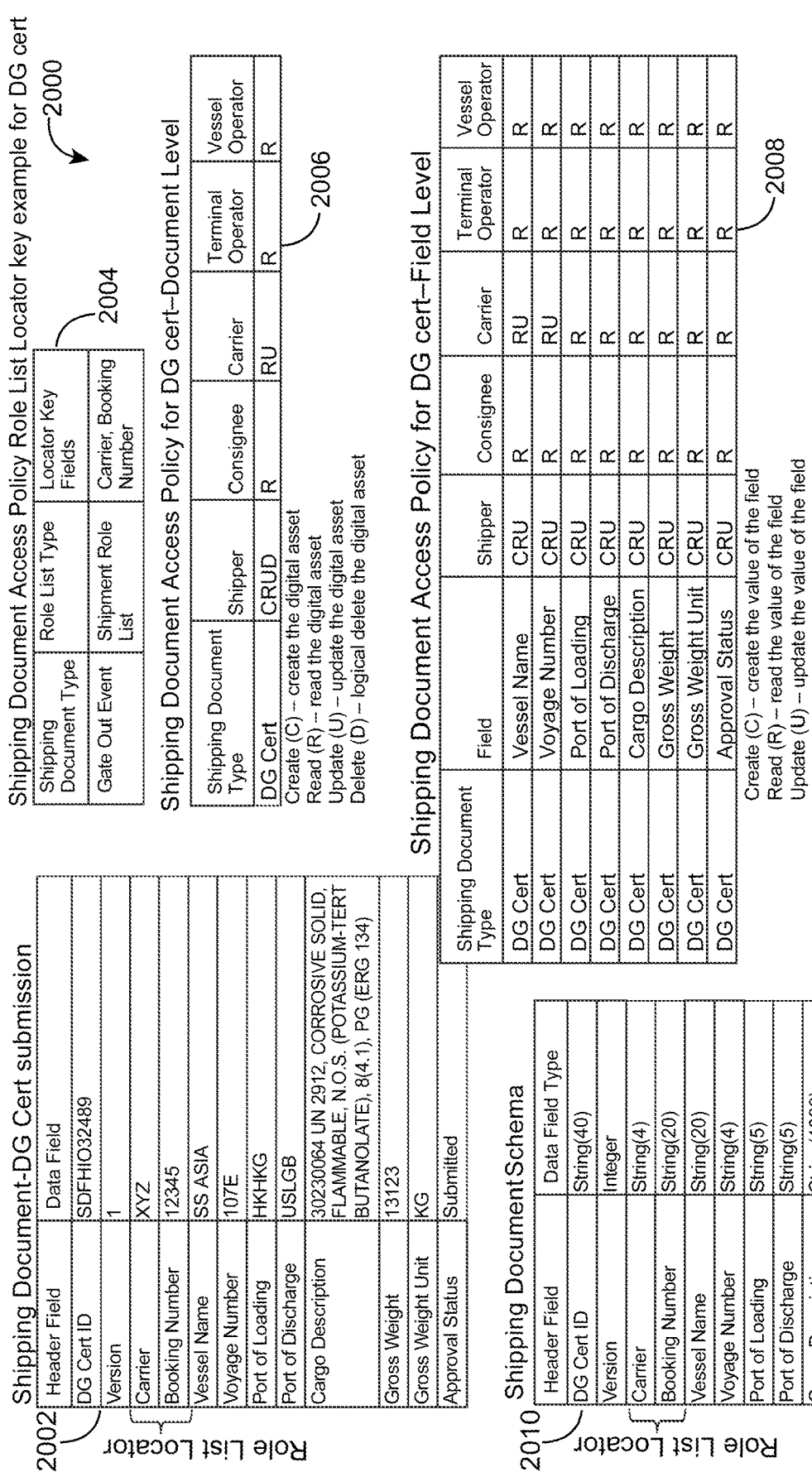
FIG. 20 illustrates an example shipping document policy 2000 in accordance with one embodiment.

In some embodiments, the system and methods described herein may be used with dangerous goods (DG), as seen in FIG. 20. Dangerous goods may require a special certificate to ship, referred to herein as a dangerous good certificate (DG Cert). Dangerous goods in shipping freight occur when the material being shipped may be hazardous, or has qualities that could lead to danger for those involved in the shipping process. Examples of dangerous goods may include fuel, radioactive materials, corrosive chemicals and liquids, explosives, and so on. In some embodiments 2000 of an example, a shipping document for a DG cert example 2002 table is shown. The header field represents the left hand column and provides the categories of information. The data attribute in the right hand column shows the corresponding data for each category. The role list locator information may represent the carrier and booking number. The cargo description may also be listed. The role list locator information may be used to access the DG cert role list example, which may be composed of Shipping document Access policy Role list Locator key 2004, the document level access policy 2006 and the field level access policy 2008. The role list locator key 2004 indicates that for each gate out event, there may be a shipment role list (for the "Role List Type" and a carrier and booking number are used to as the "Locator Key Fields." The document level access policy 2006 illustrates a table showing the access policy of the shipping document type "DG Cert" at the document level. The example parties associated with the shipping of the dangerous good are shown, along with their respective read (R), create (C), update (U) and delete (D) authority. The DG cert schema example 2010 provides the header and data attribute type for the DG certificate (shipping document) for the present example. The "shipping document access policy Example for DG Cert-Field level (Field may refer to the data entry field in a document)" 2008 provides the correlated information for the shipping document type (DG Cert), the fields drawn from the DG cert example 2002 and the DG cert schema example 2010, and shows each party's (user's) respective rights.

Figure 21:
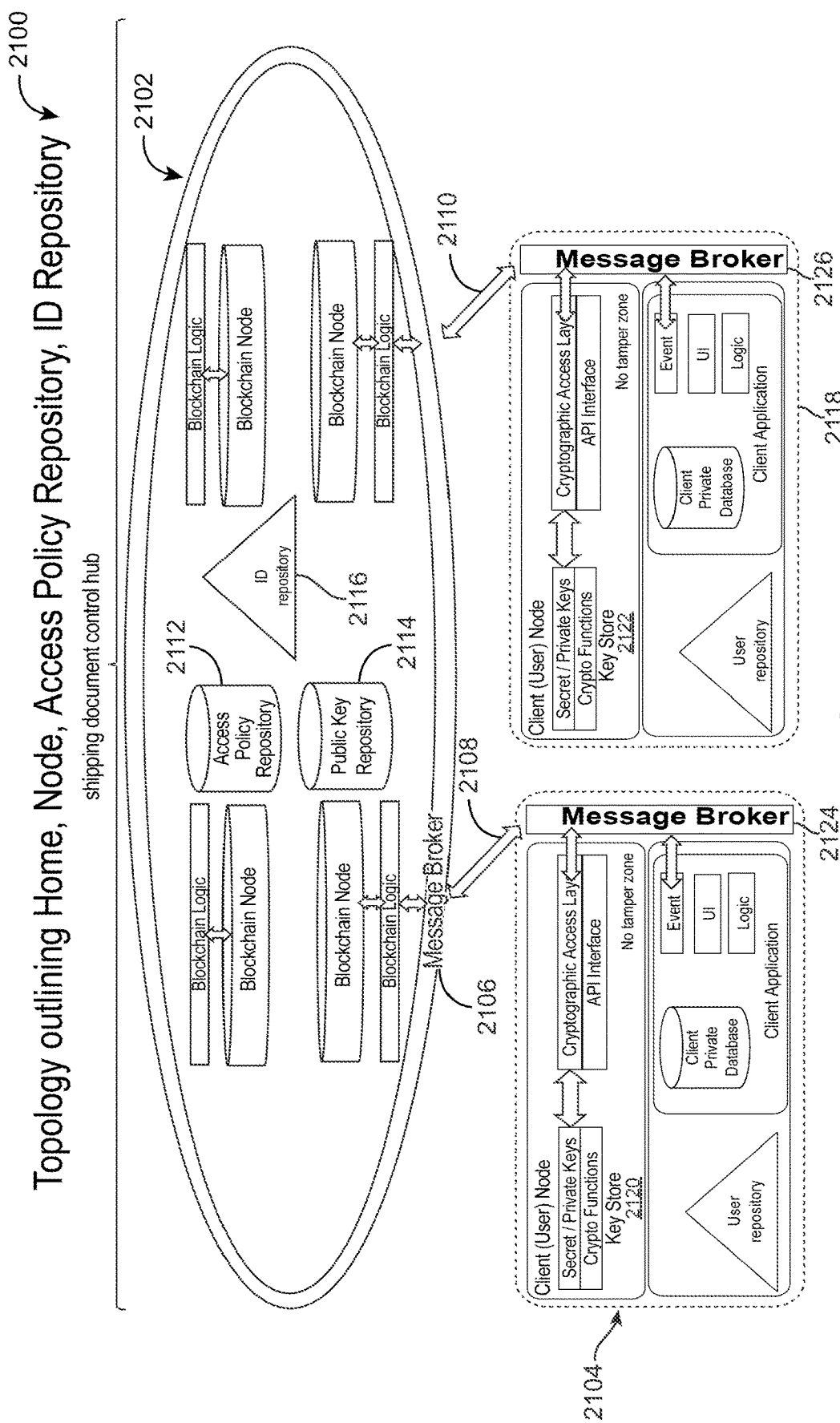
FIG. 21 illustrates a system layout (logical) 2100 in accordance with one embodiment.

In an example, an illustration of the logical system layout 2100 may be seen in FIG. 21. In some embodiments, there may be a system for generating a shipping document. The system may have a shipping document control hub 2102 and a first user node 2104. The shipping document control hub may have a computer comprising a logic, a memory and a communication device. A document control hub side message broker 2106 may operate through the computer logic. The message broker 2106 may send and receive one or more event messages 2108, 2110. There may be an access policy repository 2112 that may be stored on the memory. There may also be a public key repository 2114 and an ID repository 2116 on the memory. The memory may be one or more physical devices and they need not be physically contained within the computer. So long as the computer may access the various databases described, the physical memory may be distributed in a physical sense. The ID repository 2116 may have a listing of one or more users, one or more user login credentials and one or more user parameters. The memory may be a blockchain node for storing one or more of access policies for the encrypted shipping documents. The first user node 2104 may have a computer with a logic, a memory, and a communication device. Similar to the shipping document control hub, the client (user) nodes 2104, 2118 may have the memory of the computer and may be more than one memory device which may be internal or external to the computer, so long as the computer may access the memory device(s). A key store 2120, 2122 may be part of the user node, the key store may hold a login ID secret, and a private key for the user. The key store may be accessible by the computer. The user node 2104, 2118 may also have an API interface with a cryptographic access layer for electronic communication with the key store and a user message broker 2124, 2126. The user node may have a portal for a user to access the shipping document control hub, wherein the API interface may execute on the logic, and communicate with the shipping document control hub message broker.

In some embodiments, communication between the user node and the shipping document control hub may be handled by message brokers. The system may use a secure network communication between each node and the shipping document control hub (hub). The message brokers may provide the secure network communication for the nodes and the hub to pass information to each other. The application programming interface (API) of the user node may be a computer implemented program providing an access layer for cryptographic exchange between the key store and the message broker. The access layer may be implemented on a computer logic or processor. The client application may be any interface for a user to access the API interface and the message broker. The client application may be proprietary software or may be off-the-shelf software. The message broker of each node may access the blockchain logic in the hub, and encrypted shipping documents may be stored in a blockchain format, with one or more encrypted field assigned to each node. Each memory element may have any number of blockchain databases, as there may be one blockchain database for each shipment document type.

Figure 22:
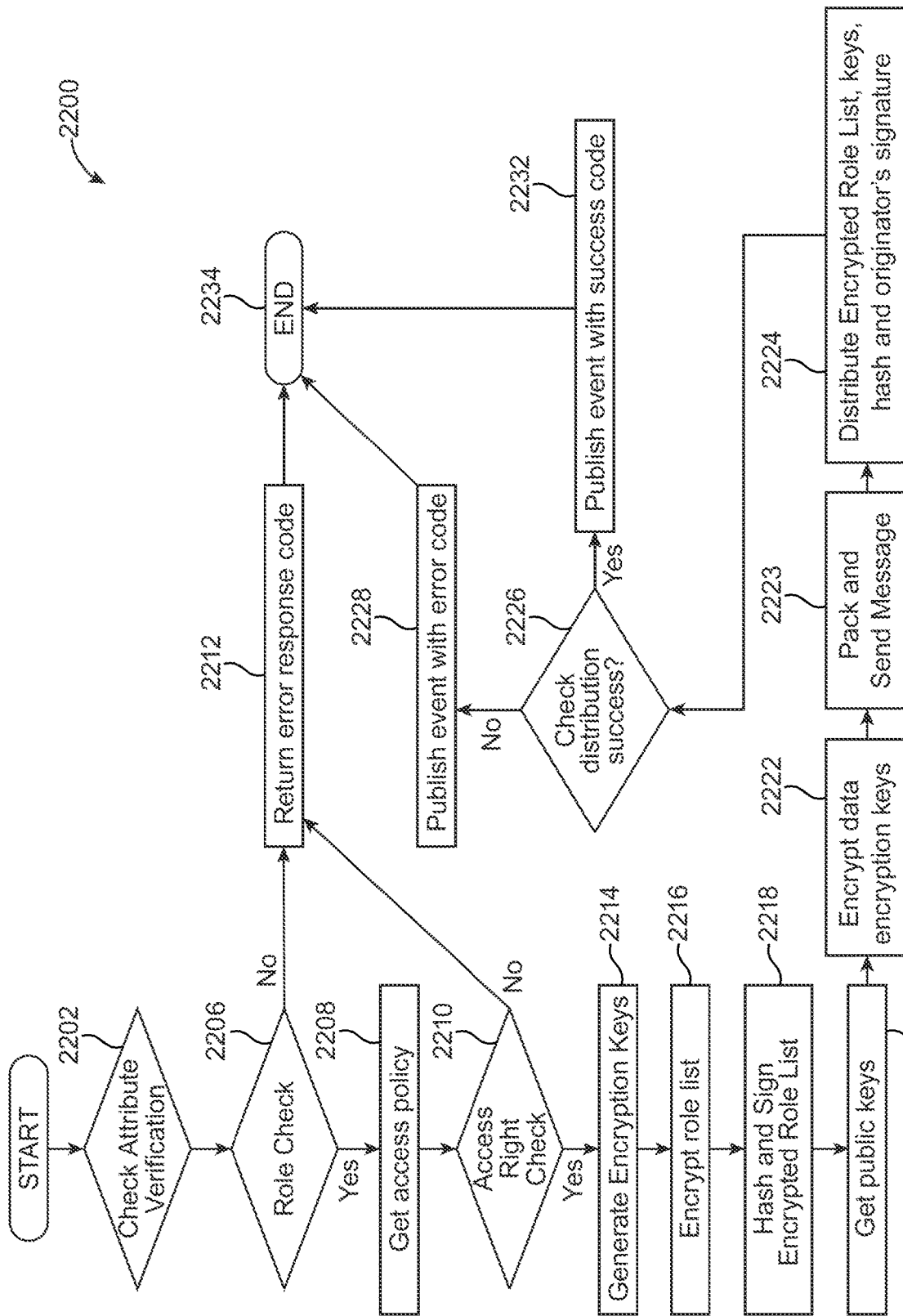
FIG. 22 illustrates a Detail Flow of role list submission 2200 in accordance with one embodiment.

In some embodiments, a sample flow chart 2200 of a role list submission may be seen in FIG. 22. In some embodiments, when a role list is submitted, the role list may have an initial check attribute verification 2202. In this step the process checks whether the locator key (e.g. the booking number and the sender's organization ID (SCAC code)) and the role list (role list also includes role list type) may be in the request. If they are, then the process may perform a role check 2206 to see if the sender's organization ID may be one of the parties in the role list. If yes, the process checks to see if the role list access policy is defined 2208. This step involves checking the role list access policy of that role list type. The process may then check for an access right check 2210 to lookup the role of the sender's organization by the ID repository and check whether the sender's role has the access right (role list level and a data field in a role list, sometimes referred to herein as a "role list field level") to create a role list and create roles in the role list. If at any point the process fails to produce a usable result, the process may end and may return an error response code 2212 and then terminated (end 2234). If all steps are successful, the process may generate encryption keys 2214 for all roles in the role list. Using the encryption keys, the process may encrypt the role list 2216. The process may generate a hash by the encrypted role list and access the key store to sign the hash by the sender's private key to generate sender's signature 2218. The process may get public keys 2220 for each party on the role list, and encrypt data encryption keys 2222 according to the access control policy of each party using the party's public key. The process may pack the message by using the encrypted Role list, encrypted data encryption key (associated with party's public keys), hash and sender's signature. The process may digitally sign the message with the user's private key to generate the user's signature. The message may be sent to the shipment document control hub 2223. The process may then distribute data and encryption keys 2224 by finding the blockchain nodes of the parties and distributing the encrypted role list and encrypted data encryption keys to the respective blockchain nodes. The process may then check distribution success 2226 by checking whether the encrypted data, encrypted data encryption keys, hash and sender's signature are distributed successfully. The process may then publish the event with success code 2232 to the message broker, or publish the event with an error code 2228 to the message broker.

In some embodiments, the client application may create a role list and communicate to the shipping document control hub via the client side message broker and user node. The cryptographic access layer in the user node may get the public keys and the access control policy from the hub. The access layer may then validate and enforce the access control policy, encrypt a payload (role list) and put the message to the message broker. The message broker (client side) may communicate with the message broker of the shipping document control hub, and the message broker on the shipping document control hub side gets the message to the process to distribute encrypted data and encrypted data keys, and then may publish the event with a success code 2232 that may go to the client side message broker. The client side may acknowledge the success message and confirmation receipt, and may create a transaction complete acknowledgement.

Figure 23:
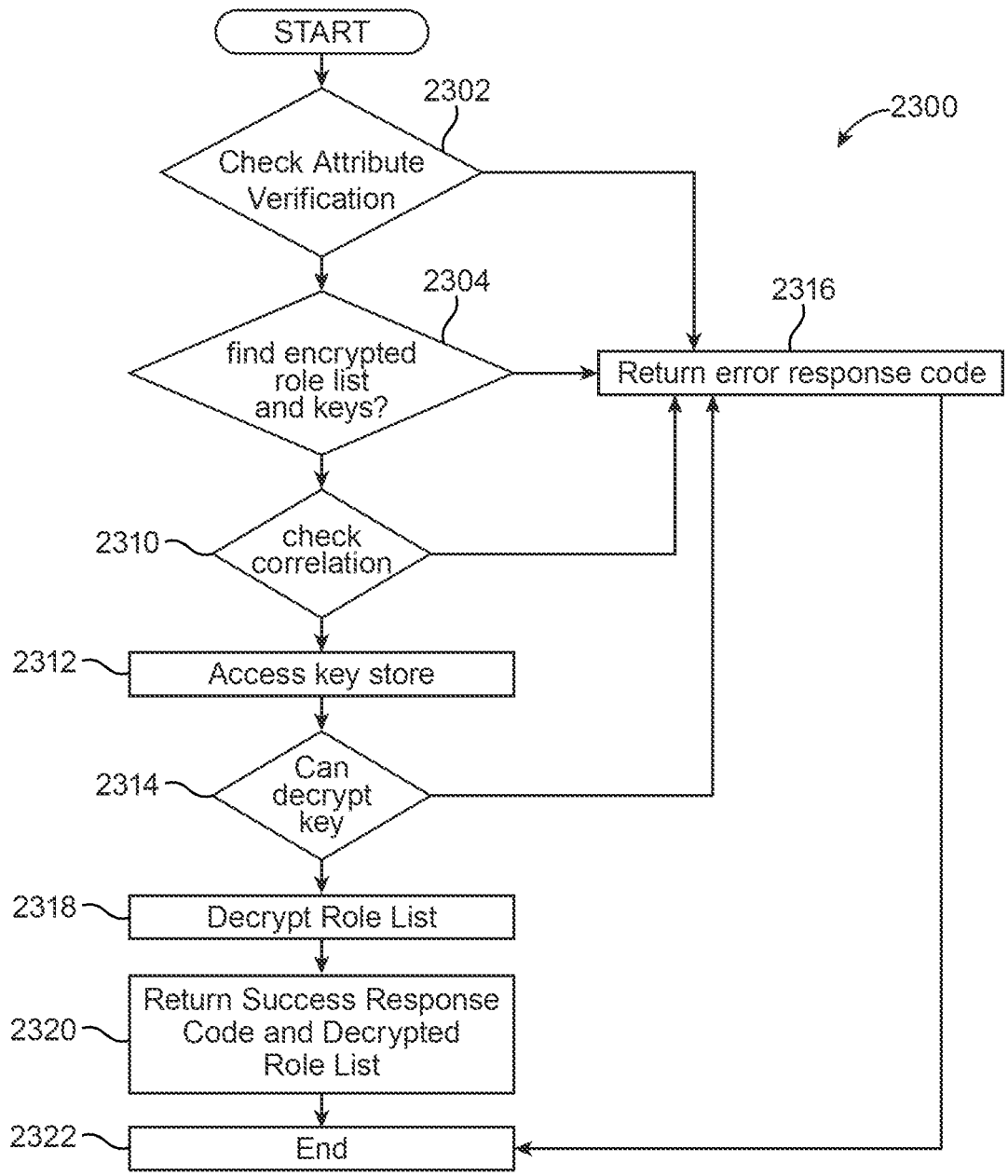
FIG. 23 illustrates a Detail flow on role list read 2300 in accordance with one embodiment.

In some embodiments, there may be a process for reading a shipping document 2300 as shown in FIG. 23. The process may begin at start block with a given document ID (e.g. DG Cert ID) (In some embodiments, a version number may be given), shipment number, sender's organization ID (e.g. SCAC (standard carrier alpha code)) and a particular role list type. It proceeds to check attribute verification 2302. In this step the process may check whether the locator key (shipment number, sender's organization ID), document id and role list type are valid. If so, the process gets the encrypted role list, and encrypted data encryption keys 2304 from the sender's node using the role list's locator key and role list type (not shown). If role list cannot be found, the process may return an error response code 2316 and may then go to the end block 2322. If role list can be found, the process may check the correlation of the role list 2310. The process may check to see if the role list data in all the blockchain nodes matches against each other. If role list data in any blockchain node does not match with other blockchain nodes, the process may return an error response code 2316 and may then go to the end block 2322. If role list data are the same in all blockchain nodes, the process may access the key store 2312 to decrypt the data encryption keys 2314. If the data encryption keys cannot be decrypted, the process may return an error response code 2316 and may then go to the end block 2322. If the data encryption keys can be decrypted, the process may use the data encryption keys to decrypt role list 2318. The process may then return a success response code 2320, or alternatively if the process fails, the process may return an error response code 2316. The process may then go to the end block 2322.

Figure 24:
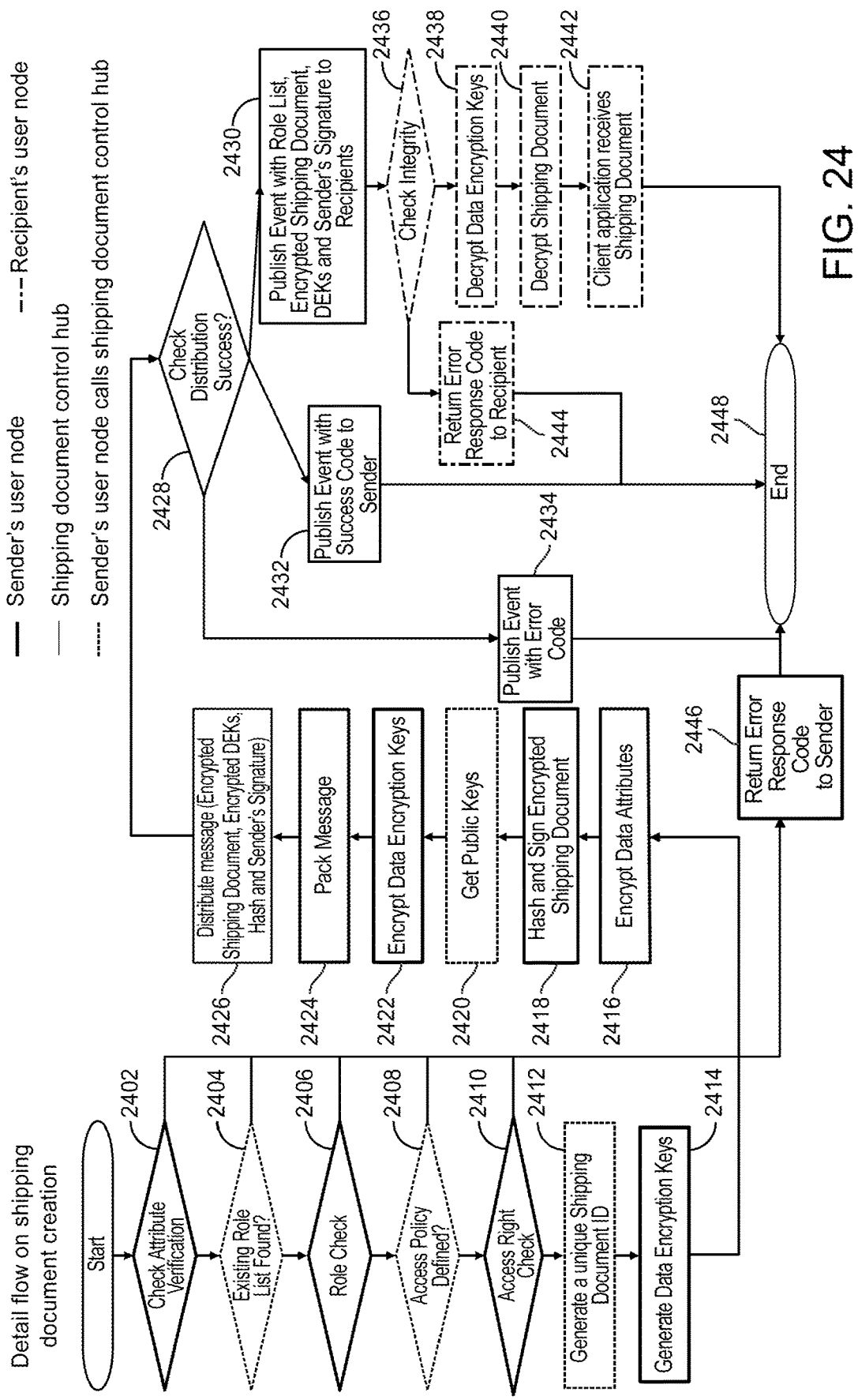
FIG. 24 illustrates a shipping document creation 2400 in accordance with one embodiment.

A flow chart showing a shipping document creation 2400 is now shown in FIG. 24. In some embodiments, the process may check the attribute verification 2402 by checking whether the locator key (e.g. booking number and sender's organization ID) and the shipping document content (e.g. DG cert) and the shipping document type may be in the request. The process may check if there may be an existing role list 2404 from the access policy repository. This step may involve checking the access policy repository for the applicable role list type, then checking for an existing role list of that role list type. A shipment role check 2406 (or simply a role check) may determine whether the sender's organization ID is one of the parties on the role list. The process may check to see if the access policy may be defined 2408 at the shipping document level and shipping document field level. The process may do an access right check 2410 to lookup the role of the sender's organization in the ID repository and may check whether the sender's role has the correct access right (shipment document level and field level) to create a shipping document of that type (e.g. DG cert) and create data in it. The process may then generate a unique shipping document ID 2412 (e.g. DG cert ID), which may be unique throughout the entire system. The process may generate data encryption keys 2414 for all the data attributes in the shipping document. The data attributes may then be encrypted 2416 in the shipping document (e.g. DG cert) using the data encryption keys. The process may generate a hash on the encrypted data attributes and access the key store to sign the hash by the sender's private key to generate the sender's signature 2418. Then the public keys may be obtained 2420 for each party identified in the roles in the shipping document. The data encryption keys may be encrypted 2422 using the appropriate public key for each party identified with a role in shipping document. The process may pack 2424 the message with the encrypted data attributes, encrypted data encryption keys, hash and sender's signature. The process may send 2426 the message to the shipping document control hub. The shipping document control hub may distribute the encrypted data, keys, hash and sender's signature by finding the blockchain nodes of the proper parties and distributing the encrypted shipping document, encrypted data encryption keys (DEKs), hash and sender's signature to the blockchain nodes. The process may check to see if the distribution was successful 2428 by having each user node respond with a notification of success. Alternatively, the process may distribute the message and log the distribution as successful unless an error message is received from one or more recipients. A successful event notification may be published to the sender 2432. The role list recipients may receive a publish event with the encrypted shipping document, encrypted DEK, hash and sender's signature 2430. The publication of events to any recipient may depend on whether the recipient subscribed to the update event of a particular shipping document type (e.g. "DG cert created."). The recipient user node may check the integrity 2436 by computing the hash from the encrypted shipping document and decrypting sender's signature by using the sender's public key to get the decrypted hash. The process may compare the decrypted hash with the hash from the encrypted shipping document. The recipient nodes may then access the key store to decrypt the encrypted data encryption keys 2438 and decrypt the shipping document 2440 by the data decryption keys. The client application may receive the shipping document 2442 in plain text. The process may then go to the end block 2448.

Figure 25:
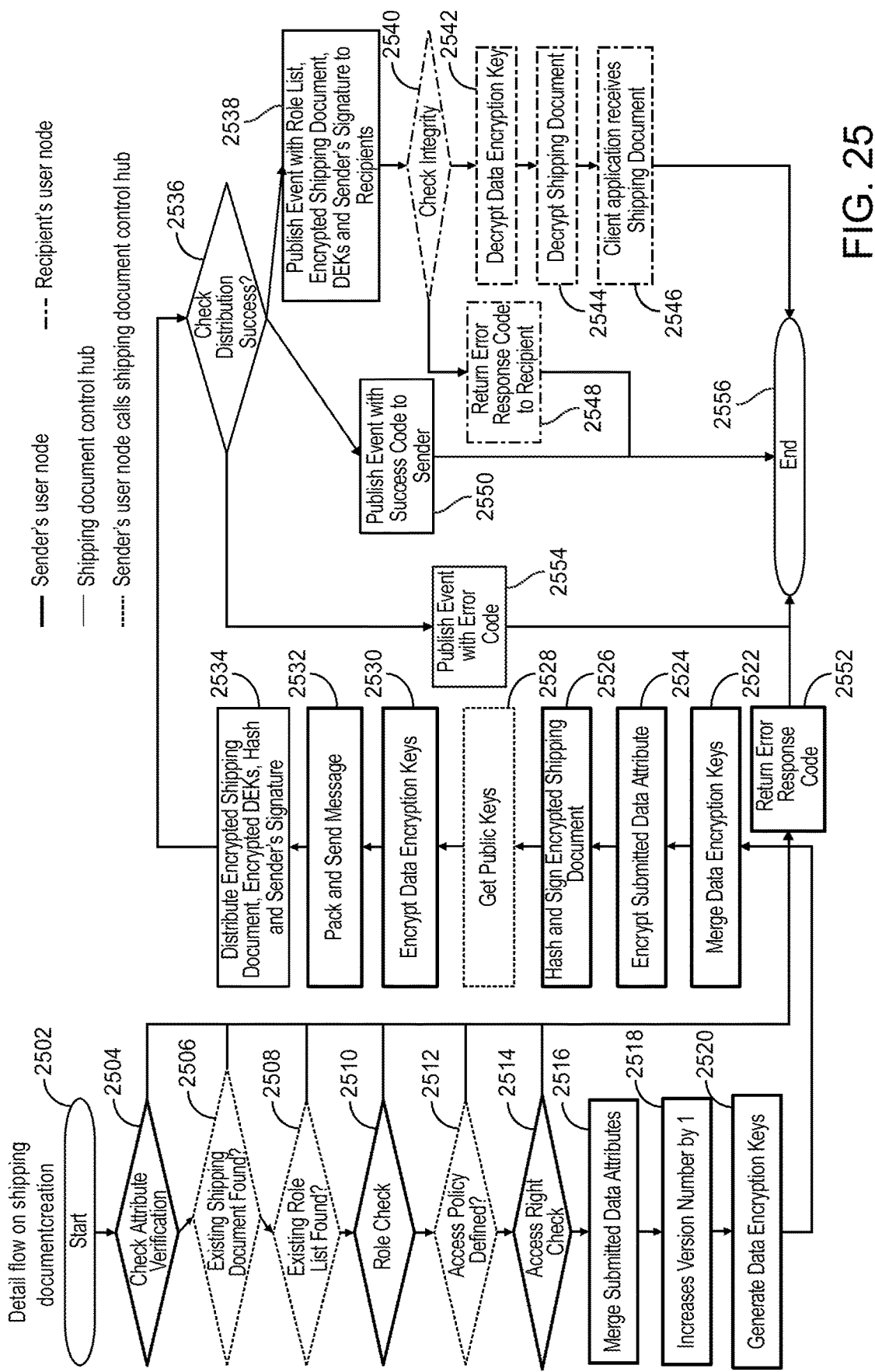
FIG. 25 illustrates a shipping document update 2500 in accordance with one embodiment.

A flow diagram of a shipping document update 2500 is now shown in FIG. 25. The process may proceed from the start block 2502 to check attributes 2504 by verifying whether Shipping document ID/locator key (e.g. booking number and carrier's organization ID (SCAC Code)) and the updated Shipping document (e.g. DG Cert) may be in request. The process may check for an existing shipping document 2506. This may be determined from the blockchain ledgers by searching shipping document ID and/or locator key and shipping document type. A check may be done to see if the existing role list 2508 may be found. The process may find the role list from the access policy repository by searching with one or more locator(s) key and/or one or more role list type(s). A role check 2510 may be done to determine whether the sender organization ID may be one of the parties on the role list. The process may check to see if the access policy is defined 2512. The process may get the shipping document access policy from a portion or the whole document by supplying "shipping document type" (e.g. shipping document type="DG Cert"). An access right check 2514 may be performed to determine whether the sender's role may have the access right (field level) to update the data values in the shipping document. The process may merge existing shipping document attributes with the encrypted data of submitted data attributes if available 2516. The process may increase the version number of the shipping document by one 2518. The process may generate data encryption keys 2520 for new data attributes in the submitted shipping document 2522. For example, if there are 10 data fields, and 3 affect a user, only the three that affect the user are changed, so only 3 may need new encryption keys. The remaining 7 fields may not have new keys, and the old information that was already there simply remains. The process may encrypt the submitted data attributes 2524 in the shipping document by using the data encryption keys. The process may generate a hash on any newly encrypted data attributes (data fields) and access the key store to sign the hash by the sender's private key to generate sender's signature 2526. The process may get the public keys of the parties in the role list 2528. The process may encrypt the updated data encryption keys 2530 by using each party's public key using the access control policies of each party (user). The process may pack the message 2532 with the encrypted data attributes, encrypted data encryption key, hash and sender's signature. The process may send the message to the shipping document control hub 2532. The process may distribute the encrypted data and keys by finding the blockchain ledgers of the parties and distribute the encrypted shipping document, encrypted data encryption key, hash and sender's signature keys to the proper blockchain ledgers 2534. A check whether the encrypted shipping document, encrypted data encryption key, hash and sender's signature are distributed successfully 2536 may be performed. A publish event with success code to sender may be performed with a success code sent to the message broker of the sender 2550. If the save to the transaction reference database is not done, the process may publish an event with an error code to send to the sender's message broker instead 2554. The process may publish an event with an encrypted shipping document, encrypted data encryption key and sender's signature to the intended recipients 2538. The publish events to recipient depend on whether the organization subscribes to the shipping document update event (e.g. "DG Cert Updated"). The event payload may contain an encrypted shipping document, an encrypted DEKs and the sender's signature. The recipient user node may check the integrity 2540 by computing the hash from the encrypted shipping document and decrypting sender's signature by using the sender's public key to get the decrypted hash. The process may compare the decrypted hash with the hash from the encrypted shipping document. If the integrity checking 2540 fails, the process may return error response code to recipient 2548. If the integrity check succeeds, the recipient nodes may then access the key store to decrypt data encryption keys 2542, and decrypt the shipping document 2544 by the data decryption keys. The client application may receive the shipping document 2546 in plain text. The process may then go to the end block 2556.

Figure 26:
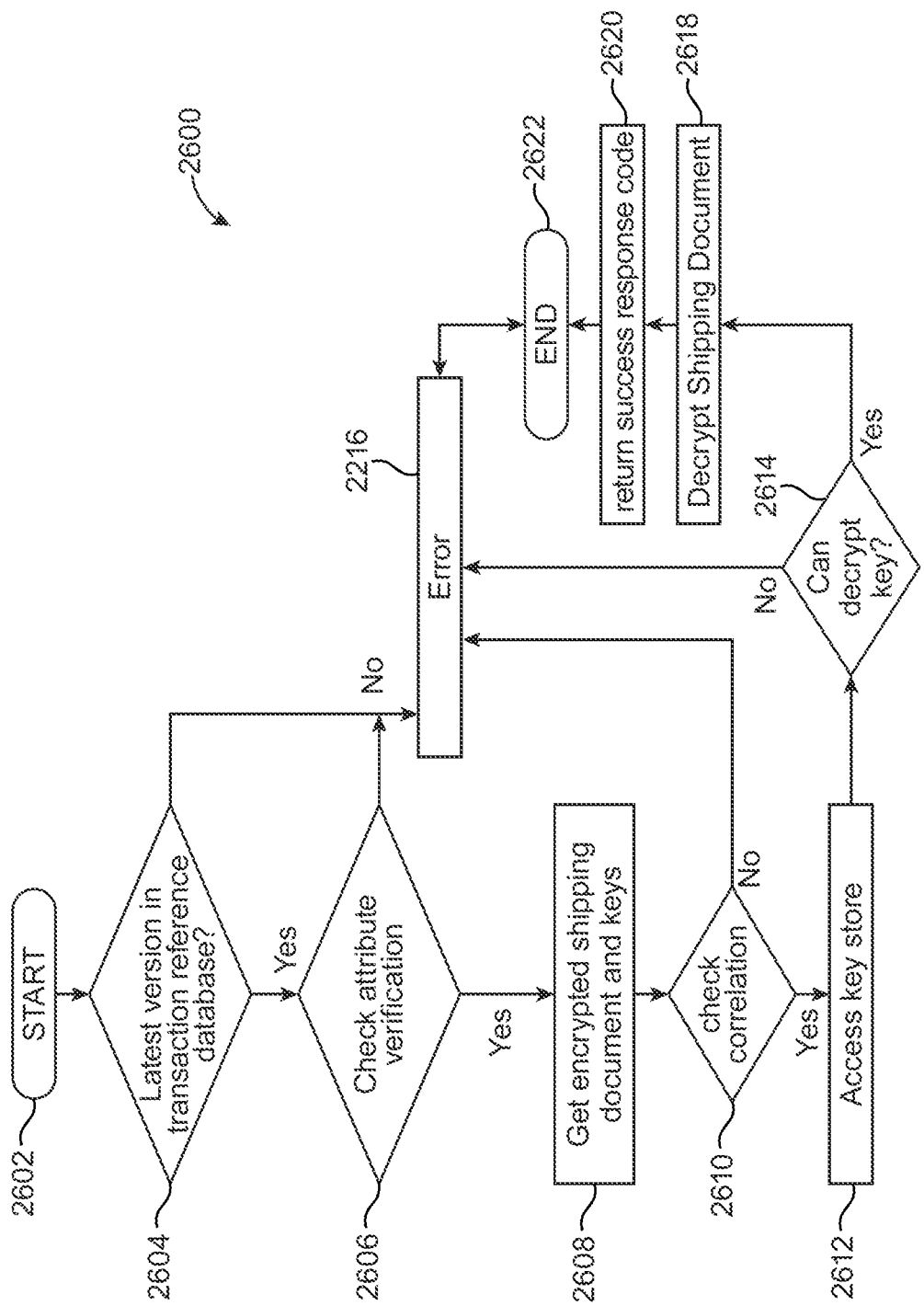
FIG. 26 illustrates a shipping document read 2600 in accordance with one embodiment.

An example process for reading a shipping document 2600 is now shown in FIG. 26. The process begins at a start block 2602 and may proceed to check if a shipping document version number may be supplied in the request, and checked against a transaction reference database 2604. The process may then do an attribute verification 2606 to check whether the shipping document ID and/or locator key (booking number and sender's organization ID (SCAC Code)) and the shipping document type is in request. The process may get the encrypted shipping document and encrypted data encryption keys 2608 from sender's blockchain nodes by shipping document ID. (In some embodiments, there may be a correlation check (check correlation 2610) to see whether the encrypted shipping document and encrypted data encryption keys from the blockchain nodes are the same in content level.)

The user node may access the key store 2612 to decrypt data encryption key (DEK) using the private key of the sender's organization and get back the data encryption keys (DEK) 2614. The user node may decrypt the encrypted shipping document 2618 by data encryption keys and may return a success response code 2620 to the client application. If the process fails at any point, the process may return an error 2616 code to the client application. The process may end 2622.

In some embodiments, the existing role list, and/or the existing shipping document may be checked by the user node or the shipping document hub for data integrity, in one or more of the steps when they are being accessed. The integrity check process starts by computing the hash from the encrypted shipping document (or role list) and comparing it with the existing hash in the existing shipping document (or role list). The sender's signature can be verified against its public key. If the existing hash matches with the computed hash and the sender's signature verification is successfully verified, it is a valid signature and the integrity of the documents is maintained.

Once a user is able to access the booking API, the user may populate a booking arrangement 2700 (example). The booking arrangement 2700 may have multiple fields for the input of data relevant to the freight shipment. Fields may include, but not be limited to, identity of the shipper, consignee, vessel operator, forwarder, carrier, and the booking party, which may be the user. The booking arrangement 2700 may also have route information, container/cargo information and other or miscellaneous information, as needed. The user creating the booking may see all the data attributes in the booking arrangement. Additional information that the booking user may enter into the booking arrangement 2700 may include information that may be confidential to the user. When the booking arrangement 2700 is entered into the system, each field may be treated separately. For example, the shipper in the booking arrangement 2700 may view the record once it is created, but the shipper may only see information relevant to them (e.g., actual price of the shipping handling). In another example, the consignee may see information relevant to them (e.g., the location to return empty intermodal containers). The booking version number 2702 represents the version the user is viewing. Generally, users may see the latest version. In some cases, a user may search for older records than the most recent.

A sample screen shot of a partial booking view 2800 as viewed by a vessel operator is now shown in FIG. 28. The screen shot includes the identity of the carrier, but may hide the identity of the booking party, the shipper, forwarder and consignee. In addition, there may be information in the route information, part of container/cargo information or other information fields that remain hidden from the view of the vessel operator. In this way the user who made the partial booking view 2800 (the booking party) may populate all the information relevant to every other party engaged in the shipping of the cargo. The shipping document may contain the information every party uses or relies on to do their part of the transaction, yet keeps hidden any information the booking party may not want to share. The booking party may define what fields they want others to see, who those other parties are, or the booking party may use a set of standardized protection fields. That being the system may decide which fields a user may see, based on the access control policy for each user's role.

In some embodiments, a party that may not be user of the system in the access role policy may still gain access to certain material and information in the system by having a permission from a user in the access role policy. Such a non-user party may be a bank or other financial institution, a government entity (such as a port inspector) or other third party with an ancillary interest in the shipping transaction (such as an insurance company, customs agent, repair facility or any other party).

In some embodiments, a user may request that a third party have access to certain data within the system. Alternatively, the user may request to have certain information in the system verified to a 3rd party non-user of the system. The user may make a request for verification to the system, and the non-user may gain access to certain information so as to verify statements made by the user. The process may be done with or without direct action from the system, and allow confidentiality between the user and the 3rd party non-user.

Figure 29:
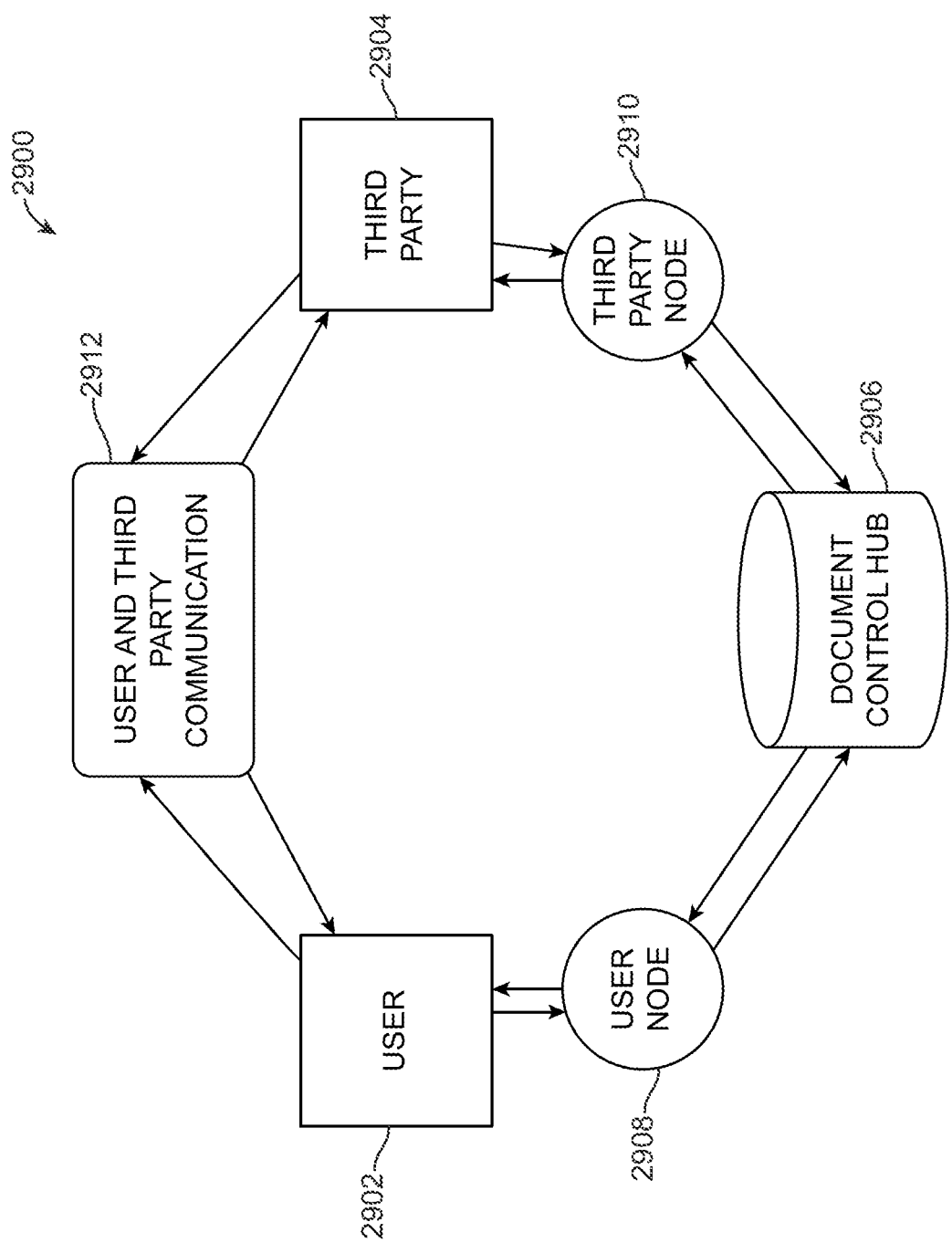
FIG. 29 illustrates a possible activity with a $3^{rd}$ party non-user 2900 in accordance with an embodiment.

An illustration of the logical relationship of the system, the user and the 3rd party non-user may be seen in FIG. 29. In some embodiments, a registered user 2902 with a user node 2908, may make requests to the document control hub 2906 through the user node 2908. In some embodiments, the user may communicate with a third party 2904 who may not have any access rights to the document control hub 2906, nor be a user of the system as described herein. For instance, a message broker may be configured to send a message to a third party 2904 (a third party non-user), wherein the message comprises encrypted data from the shipping document control hub. The encrypted data may be restricted to data that a user 2902 (or a corresponding user node 2908) is able to access according to an access control policy and a user role list. The third party 2904 may be an organization or individual with an interest in the shipping activities of the user 2902, but not be a party to the shipping agreement. The third party 2904 may be a bank or other lending institution, an insurance company, a broker, a repair facility, a government agency or government actor, or any other party that may have an interest in the shipping agreement, and have a need to access some data or documents on the document control hub 2906, or any of the controlled databases supported by the system as described herein.

The user 2902 may communicate documents or information to the third party 2904 party, specifically for the purpose of getting something from the third party 2904. This thing from the third party 2904 may be for the user to engage in the shipping agreement, or to conduct business with the other users of the system. Examples may be financing for the shipping agreement, underwriting for an aspect of the agreement, insurance for the goods or the carrier, inspection of data to verify contents of containers on arrival in a port, and so on.

To obtain the assistance of the third party 2904, the user 2902 may submit to the third party 2904 all documents the third party 2904 may request, using encrypted and secure user and third party communication 2912 protocols. The user and third party communication 2912 may include encrypted data and data encryption keys from the user 2902, delivered to the third party 2904 so the third party 2904 may properly view the data. In some embodiments, the third party 2904 may wish to verify the authenticity of the data provided by the user 2902. The third party 2904 may access a third party node 2910 to communicate with the document control hub 2906, and request verification of data received from the user 2902. The third party node 2910 may be in communication with a verification function in the document control hub 2906. In some embodiments, the third party 2904 may send encrypted data to the document control hub 2906 via the third party node 2910, and request verification of the encrypted data. In some embodiments, the third party 2904 may send encrypted data and encrypted data encryption keys for decryption. The third party 2904 may send any additional material provided by the user 2902 for verification by the document control hub 2906. The document control hub 2906 may send the information required for verification back to the third party 2904 via the third party node 2910.

In some embodiments, the third party 2904 may send encrypted data to the third party node 2910, the third party node 2910 may generate a hash of the encrypted data and may provide the hash of the encrypted data and compare it to the hash of shipping document recorded in the document control hub 2906. Matching hashes may reveal the data is authentic, though the document control hub 2906 may not actually release any data to the third party 2904. In some embodiments, the verification using key checking, and hashes of the encrypted keys, or any other mechanism now in existence or future derived may be allowed, that may suit the use of the document control hub 2906 and the user 2902 system. When the third party 2904 can confirm the authenticity of the data from the user, the third party 2904 may proceed with its internal operations to provide the user 2902 with whatever is needed for the user to proceed with its part in the shipping agreement.

Figure 30:
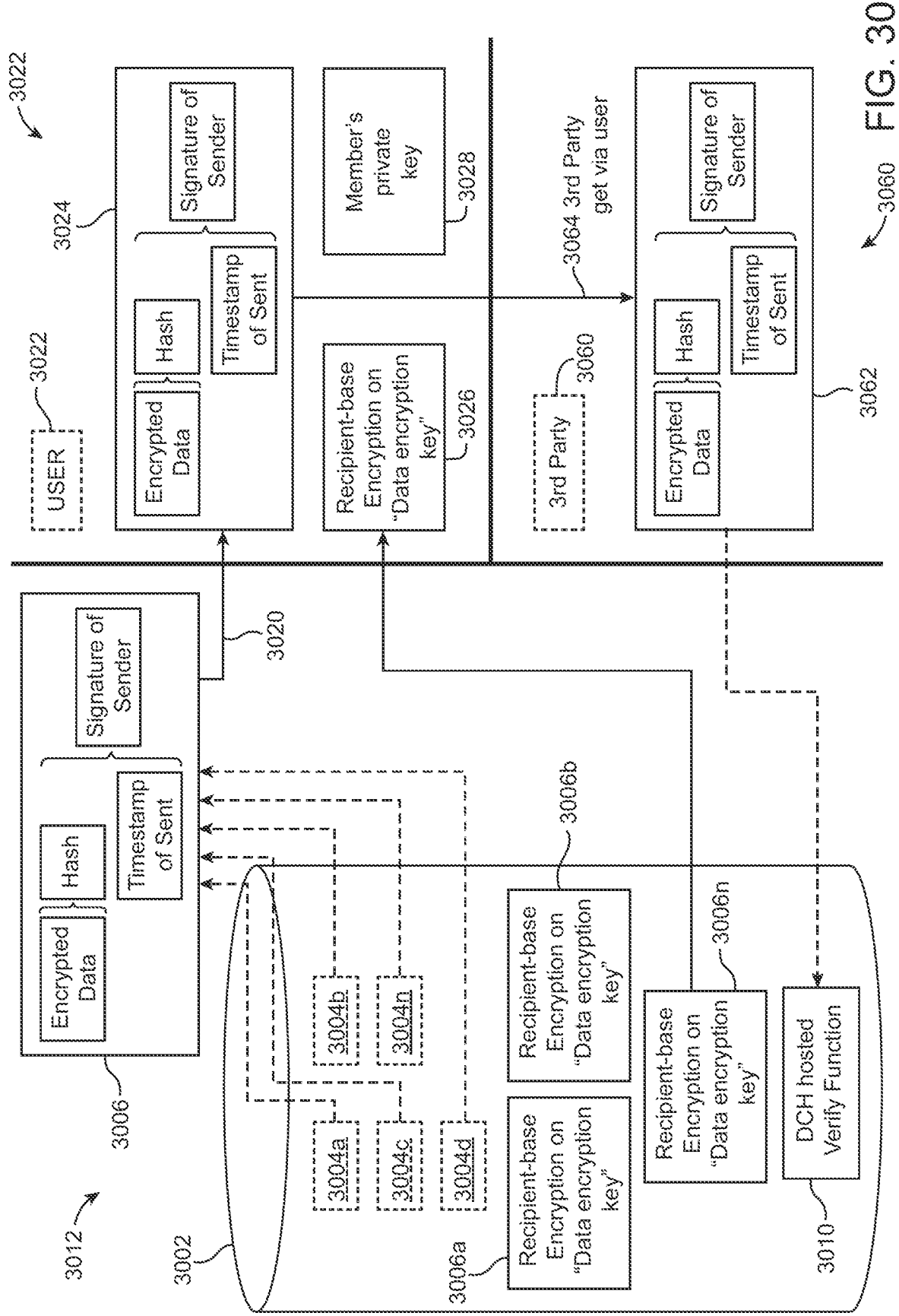
FIG. 30 illustrates a user providing information from the system to a $3^{rd}$ party in accordance with an embodiment.

In some embodiments, the relation between the document control hub 3002 (DCH) on the system side 3012, user 3022 and third party 3060 may be illustrated as shown in FIG. 30. The DCH 3002 may have a shipping document database 3004$_a$, and may have other databases such as an access policy repository 3004$_b$, a public key repository 3004$_c$, an ID repository 3004$_d$ or any other database 3004$_n$ for operation of the system. The user 3022 may make a request from the DCH 3002 for certain data and documents as the user 3022 may need for a bank loan. The user's request may be authenticated against the ID repository, and access policy repository or any other authentication methodology or requirement. The user may be identified in the system 3012 or the DCH 3002. The user may have one or more recipient-base encryption 3006$_{a\text{-}n}$ on "data encryption key" resident on the system side. Once the user request is authenticated, the DCH may extract the requested data from one or more databases and provide the information to the user 3022. The information may be bundled into a system produced data package 3006 with encrypted data encryption key, then sent to the user 3022.

The data package 3006 may contain encrypted data and the data package 3006 is sent with encrypted data encryption keys 3026. The user may receive the data package 3006 from the DCH 3002 or System 3012 via a secure communication link 3020. When the data package is in the user's zone of control, the user controlled data package 3024 may be modified, unpacked or left alone. In some embodiments, the data package 3024 may contain more or less material. In some embodiments, the data encryption keys 3026 may be encrypted using the user's public key. The data package 3024 and data encryption keys 3026 may be communicated to the user 3022.

On the user 3022 side, the user private key 3028 may be used to decrypt the encrypted data encryption keys 3026. The user may send the data package 3024 and decrypted data encryption keys 3026 to the third party 3060. The user may send the data package 3024 to the third party 3060 via a separate secure communication link 3064. Due to the encrypted nature of the data, in some embodiments the user, the DCH/system or the third party, may elect to use unsecure communications.

Once the third party 3060 has the encrypted data in their control, the third party controlled data package 3062 and decrypted data encryption keys 3026 from the user 3022, the third party 3060 may access the DCH 3002 through the third party node (not shown). The DCH 3002 may then use the DCH hosted verification function 3010, verify the authenticity of the third party request using the encrypted data in the third party data package 3062. The third party 3060 may then receive confirmation that the information provided by the user 3022 may be authentic, since the hash, and other data encryption elements match that of the system 3012 and/or the DCH 3002.

In some embodiments, a user may provide any amount of information to a third party as they have access too. Generally, a user may only provide that information which may be pertinent to the third party request for information. For example, a third party bank may request financial information, records of completed shipping agreements and payment from parties downstream from the user. An insurance third party may request history of shipping a particular kind of material, such as a hazardous good, as well as what the user's history may be with requests related to number of accidents, number of prior insurance claims, and so on. For example, a government agency may act as a third party and request information related to ultimate destination of a shipment, who an ultimate buyer may be, or whether the cargo will or has passed through the territory of a particular country. The types of requests may be limitless. The user may then make the data request to the system. The system may produce the data into the data package 3006. The data package 3006 may contain encrypted data, a hash, a time stamp, and a signature of the sender. The data package 3006 may contain additional material or less material, depending on the sender (user) request.

In some embodiments, the data package 3006 may be encrypted and sent to a user. In some embodiments, the data package 3024 the user possesses may be identical in all respects to the data package 3006 assembled by the system. However, since the user is now in control of the data package 3024, the data package 3024 is distinguished from the data package generated by the system 3006. The user 3022 may unpack the data package 3024 and share it with a third party 3060. The user may share the data package in its entirety (without unpackaging it) or may unpackage it, and re-encrypt it and send to the third party. For example, the user 3022 may obtain the data package via a first client node, and the data package may be sent or distributed to a third party (a third party non-user). When the third party receives the data package, the data package 3062 is now under the control of the third party. It may still be identical to the data package 3006 originally sent by the system, or identical to the data package 3024 of the user. The third party may seek to verify the contents of the data package 3062. The third party may use (or communicate via) a third party node to use or access the verify function 3010 in the DCH. For example, the third party may communicate with a verify function 3010 (also referred to as a verification function) in the DCH, to verify an integrity of the data package. In some embodiments, the third party node may call the verification function 3010 in the DCH, the DCH may get the encrypted data from the shipping document database 3004a, or any other database as needed. The verification function 3010 may then send the encrypted data to the third party node so the third party may compare the encrypted data from the verification function 3010 with the encrypted data in data package 3062 provided by the user 3022. In some embodiments, the third party may send the hash of the data package 3062 to the DCH hosted verification function 3010, and if the hash for the data package 3062 is the same as for the data package 3006, the third party may have evidence that the data provided is correct and unaltered from its source.

Figure 31:
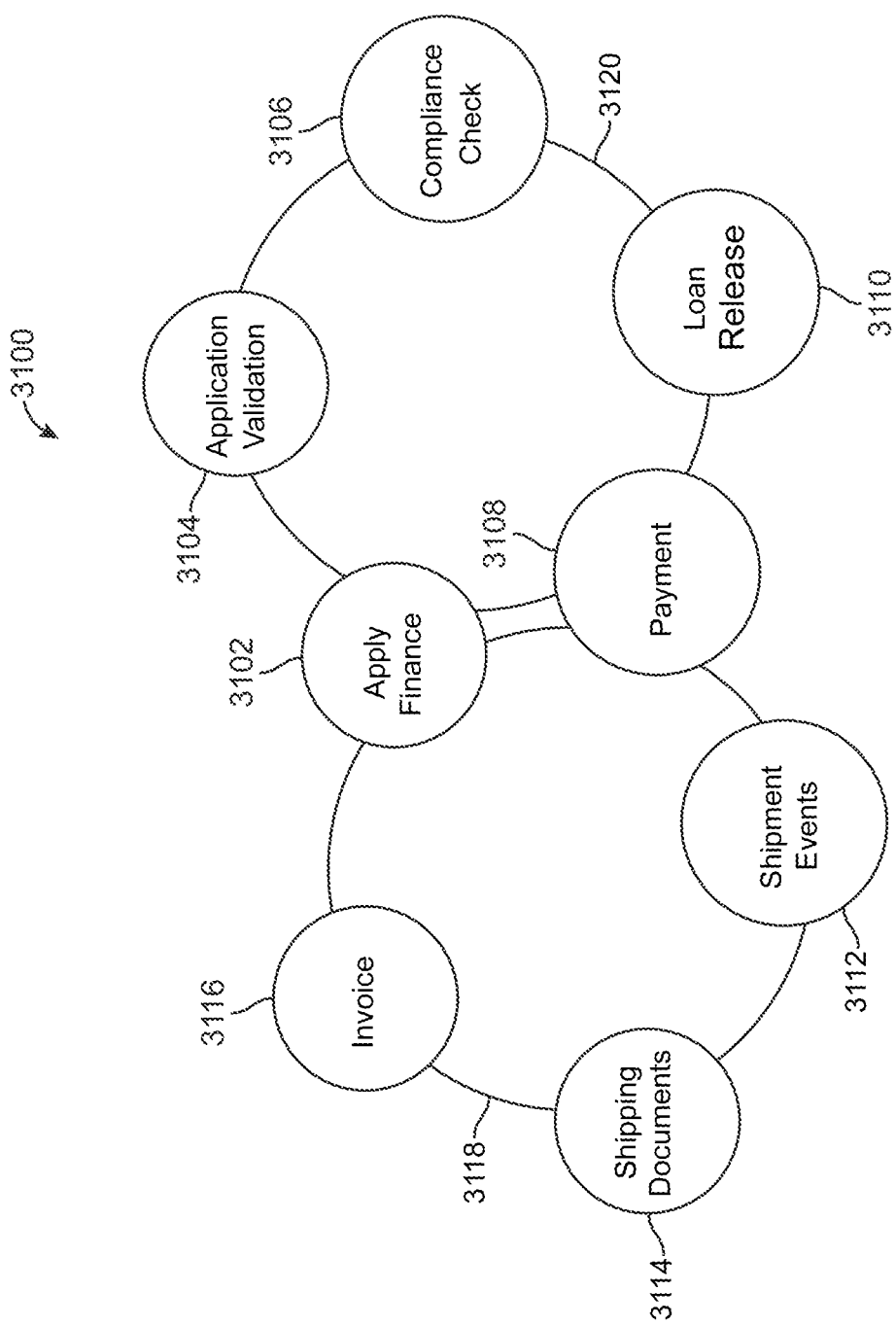
FIG. 31 illustrates a possible loan application process in accordance with an embodiment.

Example embodiments of the third party functions are now provided in FIGS. 31-35. In some embodiments, a forwarder may get or need financing from a bank (a non-party to a shipping transaction). In order for the bank to lend money to the forwarder, the bank is to carry out its normal due diligence to determine if the forwarder is an acceptable risk, and likely to pay back any monies loaned to it. For this example, the forwarder may submit a loan application 3102 to a bank or other lending institution, as shown in FIG. 31. The bank goes through its own bank activity 3120, while the forwarder goes through its own forwarder activity 3118. In the process of applying for a loan, the forwarder is to provide various documents and data to the bank. This may be thought of as the application validation 3104 step. The bank then goes through its own compliance check 3106 to determine if the forwarder is a trustworthy party, and a good financial risk. If so, the bank may approve and release the loan 3110 to the forwarder, and provide payment 3108.

The forwarder can go through its activities and perform the shipping event 3112 it is hired to do, provide shipping document 3114 to interested parties, and then invoice 3116 the party who contracted for the shipping event. Then the shipping event is completed, the contracting party may pay the forwarder, and the forwarder may repay the loan.

Figure 32:
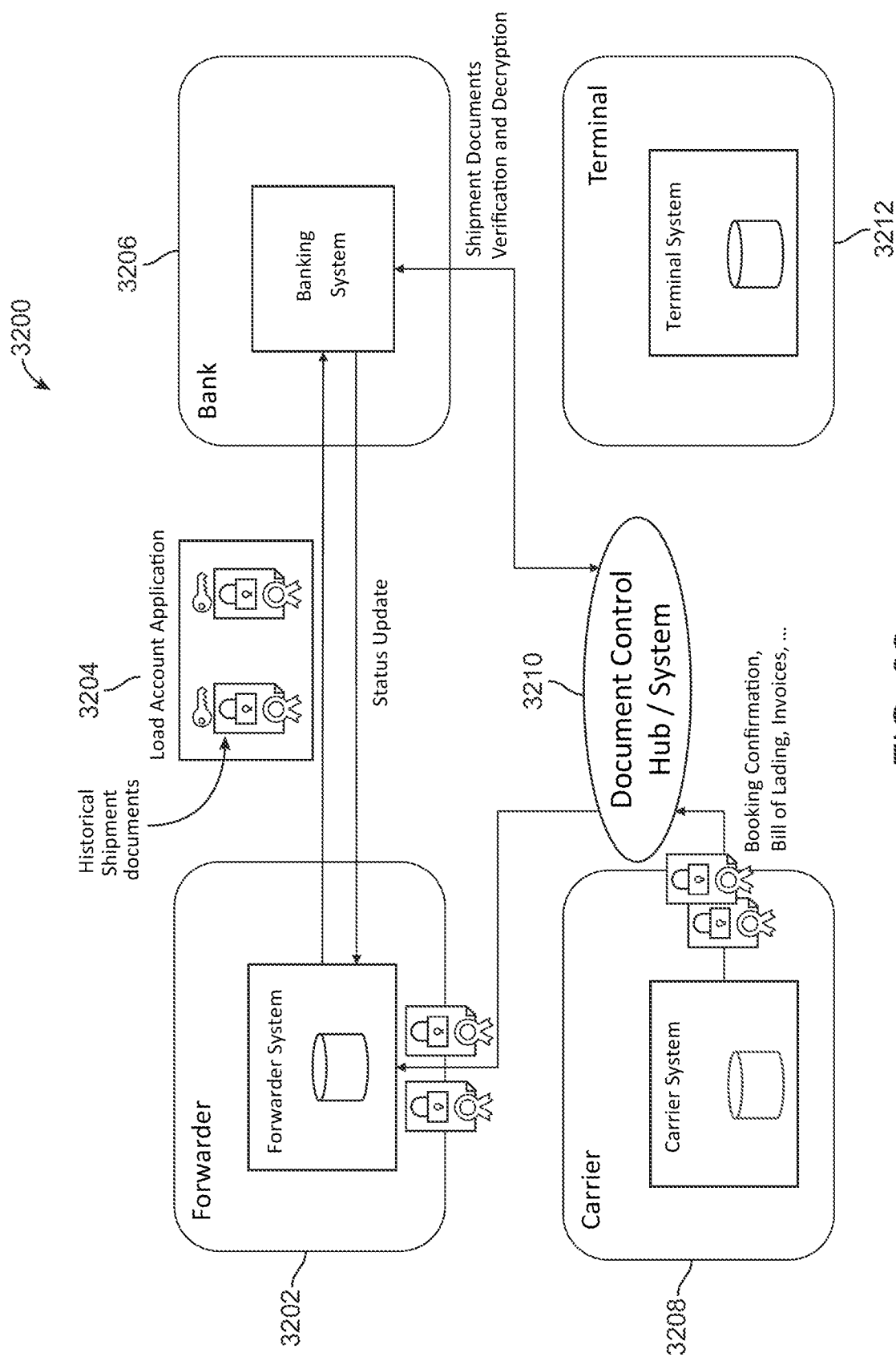
FIG. 32 illustrates the exchange of documentation to support establishing a loan account in accordance with an embodiment.

In the process where the forwarder wants to setup a loan account from a bank, the forwarder may involve the system to assist in providing verification of data and documentation using the trusted storage system. For example, the forwarder 3202 may uses a secure communication 3204 system to communicate with a bank 3206 or other financial institution to set up an account 3200, as shown in FIG. 32. The forwarder 3202 may send a loan account application and other support documents to the bank via the secure communication 3204. These documents may include historical data on past shipping transactions, safety records, payment history and so on. The documents may be sent between the forwarder 3202 and the bank 3206 using secure communication 3204. Secure communication may mean messages and attachments are encrypted. Secure communication 3204 may also involve secure systems like VPN, encoded communication channels and so on.

In this example, the bank 3206 may respond to the forwarder 3202 via the same secure communication 3204. In some embodiments, the communications may be encrypted. The secure communication 3204 may contain historical documents and a loan application (load account application). The documents and account application may be encrypted, as indicated by the lock and keys. In some embodiments the encryption mechanism may be different between the forwarder and the DCH. Other parties, such as a carrier 3208 and a terminal 3212, may also use the same system 3210. In some embodiments, the carrier and terminal may be the sources of shipping documents and shipping events. Since the forwarder may be involved in the shipment, the forwarder may get the documents and events and provide them to the bank for loan account application.

Other users of the system 3210 may be involved to provide additional documentation. For example, a carrier 3208 may verify that the forwarder 3202 is indeed about to engage in a shipping transaction. The carrier 3208 may provide such details as how much cargo is to be carried, and to what destination. The forwarder 3202 may use this data to support how much money they need to initiate their loan application.

The bank 3206 may request verification of the documents and send an inquiry to the system 3210. The inquiry may be encrypted and contain a hash. The hash can be identified and compared to the original data used to generate the hash. Then if everything matches, the system 3210 may verify the data sent by the bank 3206.

Figure 33:
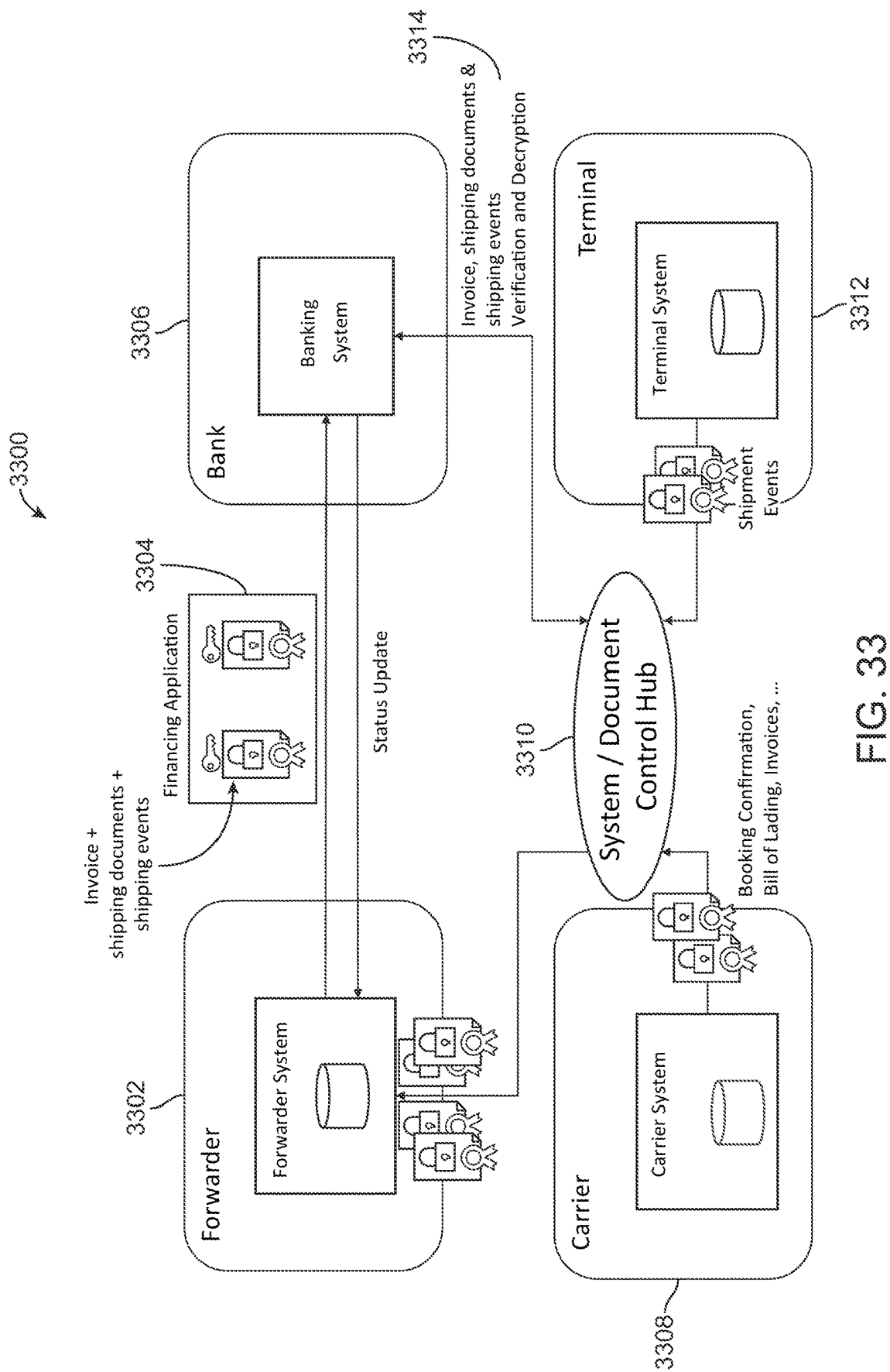
FIG. 33 illustrates the exchange of documentation to support applying for financing in accordance with an embodiment.

In some embodiments, after forwarder has set up a loan account, the forwarder may submit financing application to bank to borrow money, the bank is to carry out its normal due diligence to determine if the application is an acceptable risk, and likely to pay back any monies loaned to it. For this example, the forwarder may submit a loan application 3304 to a bank or other lending institution, as shown in FIG. 33. The forwarder may collect booking confirmation document from carrier and shipment events from terminal as supporting documents for the loan application 3304. The completion of the shipping event, item 3300, or fulfillment of the loan conditions may produce an event that triggers the repayment of the loan. For example, the arrival of a ship or carrier vehicle in a terminal 3312, and subsequent unloading of shipping goods, may trigger the sending of various documents 3314. The shipping event may be reported to the system 3310, then the system may notify all relevant parties. The carrier 3308 may be informed the vessel has arrived and been unloaded. The forwarder 3302 may be informed that the cargo has reached the port of destination, and that event has triggered the payment of the loan to the bank within a fixed period of time. The bank may also receive verification that the forwarder 3302 loan is now due, as the shipment has been completed. The system 3310 may have various triggers and alerts built into it so at each stage of a shipment, it may receive updates on the shipping process, and send alerts to all concerned parties of the same.

A sample invoice 3400 is now shown in FIG. 34.

Figure 35:
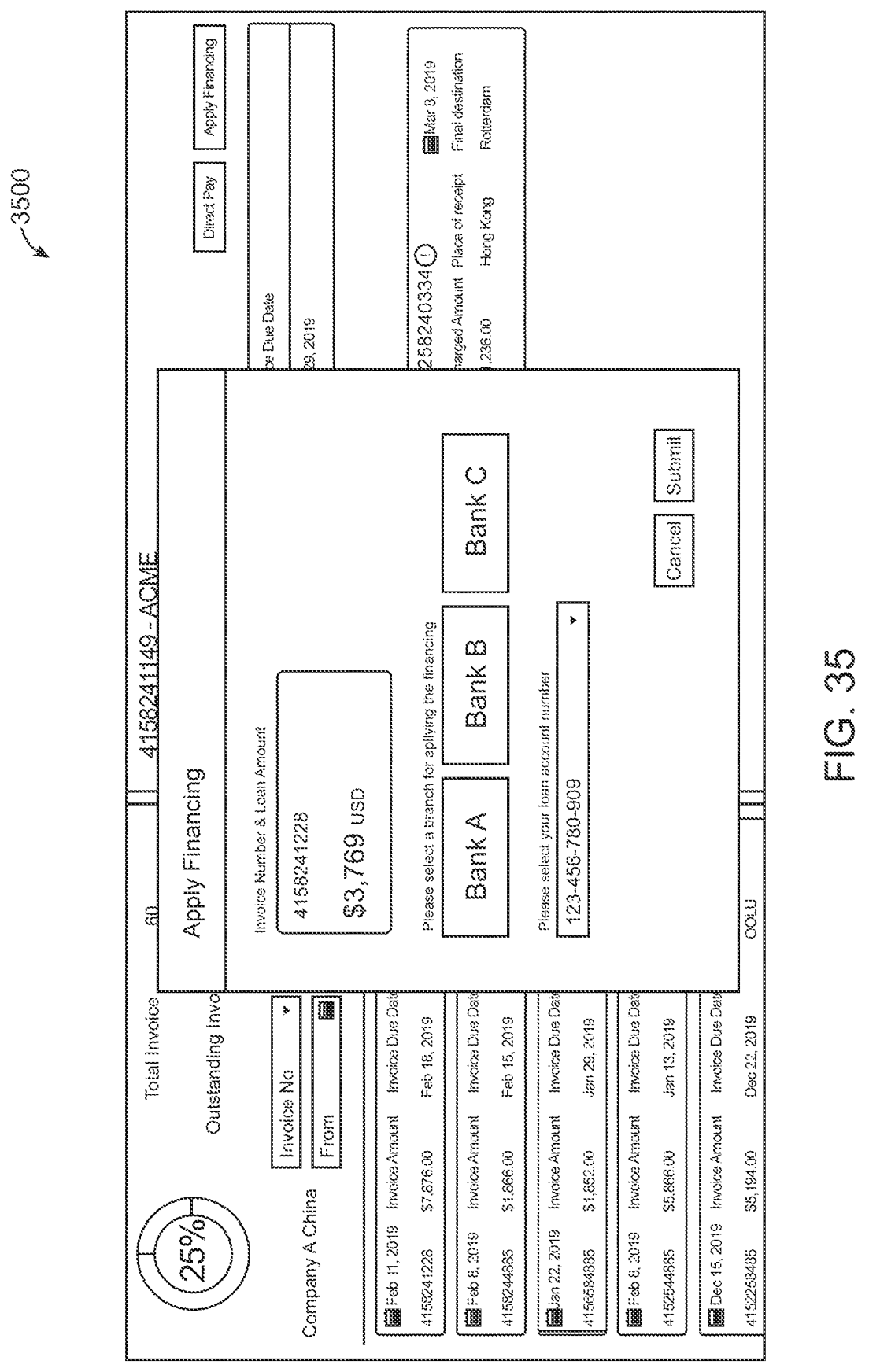

An example payment 3500 is now shown in FIG. 35. In this example, a forwarder may select one or more financing options from as many lending institutions as the forwarder may have. The transaction may be handled by the system so long as the various parties are able to receive and transmit data to and from the system.

In some embodiments, when a container loads on a terminal, terminal operator may issue a terminal event notification to inform carrier for tracking of shipment milestone. The terminal event notification contains location of the terminal, event type, date, time, carrier and container number, etc. Then the carrier finds the related parties of this container and informs the parties through encrypted distributed ledger.

The use of independent encryption for each data attribute of a shipping document, combined with a one to one relationship of encryption fields to encryption keys, allows any number of businesses engaged in a common enterprise (such as the shipping of intermodal containers or project cargo) to create a single shipping document laying out all aspects of a cargo booking without divulging any confidential information to any other party engaged in the booking, or in the public at large.

In some embodiments, when a container loads on a terminal, terminal operator may issue a terminal event notification to inform carrier for tracking of shipment milestone. The terminal event notification contains location of the terminal, event type, date, time, carrier and container number, etc. Then the carrier finds the related parties of this container and informs the parties through encrypted distributed ledger.

In some embodiments, a carrier may issue invoice(s) to a shipper and/or a consignee when a shipment is loaded. The shipper and/or consignee may then pay the invoice(s). Then the carrier issues an original bill of lading to the shipper. The consignee may pay the freight to the shipper. Then the shipper may pass the original bill of lading to the consignee to get the freight. The carrier may verify whether the consignee paid the invoice(s) if any, the carrier verifies the original bill of lading from consignee and other cargo release procedures. The carrier may use the encrypted distributed ledger to notify shipper or consignee about the invoice and update the invoice after shipper or consignee have paid.

Non-limiting aspects are now provided:
1. A method of securing data privacy for a shipping document shared in a distributed user group, the method comprising:
   receiving, via a communication network, the shipping document from a user, the user having an assigned role, wherein the shipping document comprises a plurality of data attributes;
   encrypting, via a first encryption logic, the plurality of data attributes into a like number of encrypted data attributes, the first encryption logic generating a data encryption key corresponding to each encrypted data attribute;
   organizing, via a programming logic, the plurality of encrypted data attributes into a distributed data ledger, the distributed data ledger containing at least one encrypted shipping document from a user;
   encrypting, via a second encryption logic, the encryption keys corresponding to the plurality of data attributes, the second encryption logic using a look up table providing permissions for one or more users of the distributed data ledger based on the user's assigned role; and
   distributing, via the communication network, the distributed data ledger to the distributed user group;
   wherein each user has access to a node, the node providing access to the distributed data ledger; and
   wherein each user can only decrypt data related to their assigned role.
2. The method of aspect 1, wherein an access policy is used to determine a plurality of blockchain nodes for writing the encrypted data.
3. The method of aspect 2, wherein the user assigned role is associated with a member access control policy.
4. The method of aspect 1, wherein the assigned role further comprises, a relationship between shipping parties.
5. The method of aspect 1, wherein the distributed data ledger contains a plurality of encrypted shipping documents from one or more users.
6. The method of aspect 1, wherein the shipping document supplied by a user includes the user's assigned role.
7. The method of aspect 1, wherein the first or second encrypting logic utilizes an asymmetric cryptography algorithm.
8. The method of aspect 1, wherein the communication network further comprises a secure internet access.
9. A communication system for providing parties in a shipment transaction real time update information on transaction progress, the system comprising:
   a portal to access the system via a secure internet access;
   a database, the database storing system configuration information, public keys and reference information of shipment transactions (bookings);
   a distributed ledger, the distributed ledger having a node for a user, the distributed ledger containing data relevant to the user related to the shipment transaction; and
   a program, the program coordinating the field level encryption process and distributes the encrypted results to the distributed ledger;
   wherein the user is a party of the shipment transaction; and
   wherein the portal, the database and the distributed ledger are accessible through a cloud computing environment.
10. The communication system of aspect 9, wherein the portal is a client application.
11. The communication system of aspect 9, wherein the distributed ledger is a hyper ledger.

Figure 36:
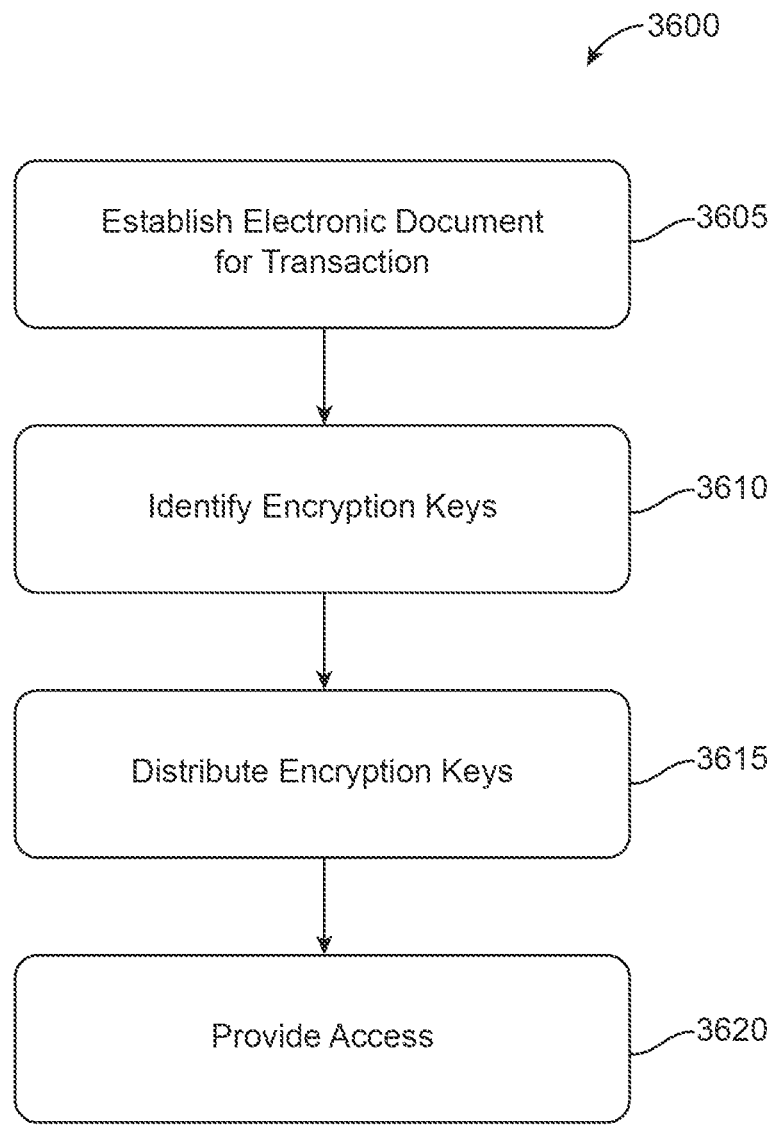
FIG. 36 is a flow diagram of a method of securely sharing data from multiple sources with different client terminals in accordance with an embodiment.

Referring now to FIG. 36, depicted is a flow diagram of a method 3600 of securely sharing data from multiple sources with different client terminals. The method 3600 may be implemented or performed using any of the components described herein in conjunction with FIG. 1-35 or 37. In brief overview, the method 3600 may include establishing an electronic document for transaction (3605). The method 3600 may include identifying encryption keys (3610). The method 3600 may include distributing the encryption keys (3615). The method 3600 may include providing access (3620).

In further detail, the method 3600 may include establishing an electronic document for transaction (3605). A server (e.g., a shipping document control hub) may identify, create, or establish the electronic document (sometimes referred herein as a shipping document). The electronic document may define, contain, or include information for a single transaction through multiple client terminals (or entities). The single transaction may involve a physical good (e.g., delivery from one point to another point), and may include a series of sub-transactions related to the physical good. Each sub-transaction of the physical good may be handled by at least one service provider (e.g., agent, intermediary). The service provider may operate or be associated with at least one of the client terminals involved in the transaction. One of the service providers may be the one that initiated establishment of the electronic document, with the remaining service providers accessing and/or contributing to (e.g., updating, or adding information to) the electronic document after the establishment.

The electronic document may include a set of data fields. Each data field of the electronic document may be related to or mapped to one of the sub-transactions of the single transaction involving the physical good. In the electronic document, each data field may be assigned an attribute or a value. The attribute for at least one of the data fields may be associated with (e.g., provided/contributed from, and/or updated by) one of the client terminals (e.g., user nodes of system 1300) involved in the single transaction. The attribute for at least one of the data fields may be from and/or updated by the client terminal operated by a first entity or first service provider that initiated or created the electronic document. The data fields may include parameters describing the transaction, such as container size, event date, port of landing, cargo description, gross weight, vessel name, and loan account, among others. In some embodiments, the electronic document may be maintained on a database (e.g., the document control hub 3002). The database may be maintained or belong to a shipping document control hub for coordinating communications among the client terminals. Each data field of the electronic document maintained on the database may correspond to a database entry on the database.

In some embodiments, in establishing the electronic document, the server may receive a request to set, assign, or otherwise update an attribute of a data field in the electronic document. The request may be from one of the client terminals associated with the service provider that contributes to the electronic document, subsequent to the initial establishment by the first entity. The service provider associated with the request may lack any (or have limited) knowledge or interaction with the first entity, or any of the other service providers that contributes or provides attributes to the data fields of the electronic document. In this manner, the data fields of the electronic document may be filled in an ad hoc manner using information from various entities. Some or all service providers may be introduced or involved in (e.g., sub-transactions or parts of) the single transaction, on an ad hoc manner (e.g., as-needed, or proximate to or at the time that a service provider's part in the transaction arises) instead of being predetermined, e.g., at the time of establishment of the electronic document. Each part or sub-transaction of the transaction may be filled or serviced by one of a plurality of available service providers, which may be dynamically matched, filled and/or selected as the transaction develops and/or when the need/part/sub-transaction arises). A service provider may have no (or limited) knowledge of the transaction other than the part/service and/or service provider(s) that the service provider directly interface with to perform the service provider's part/service in the transaction. The request may identify the data field in the electronic document to be updated and the new attribute to set to the data field. The server may determine whether the client terminal has permission to modify the data field in accordance with an access control policy for a role of the client terminal. The access control policy may specify which data fields the client terminals (or the corresponding roles) involved in the transaction have permission to access or modify. To determine whether there is permission, the client terminal may identify a role of the client terminal in the transaction. The role may be identified from a role list for the series of sub-transactions involved in the transaction.

When no role (or authorized/valid role) is identified for the client terminal, the server may determine that the client terminal lacks permission to modify the data field, and may maintain the attribute in the data field. Otherwise, when the role is identified, the server may identify the access control policy for the role. The server may determine whether the client terminal has permission based on the access control policy for the role identified for the client terminal. When the access control policy specifies that the client terminal (or the role) lacks permission, the server may determine that the client terminal lacks permission. The server may also prevent updating the attribute of the data field in the electronic document by the client terminal that submitted the request. Conversely, when the access control policy specifies that the client terminal (or the role) has permission, the server may determine that the client terminal has permission to access. The server may permit the client terminal to update the attribute of the data field in the electronic document. In some embodiments, the server may identify the attribute from the request and assign the attribute to the data field.

The method 3600 may include identifying encryption keys (3610). Each encryption key may be used to encrypt a corresponding data field in the electronic document. Each encryption key may also be associated with one of the client terminals that provided the attributed to the corresponding data field in the electronic document. The encryption keys may be generated by the server or the corresponding client terminal. The encryption key may be generated in accordance with asymmetric cryptography, such as public-key cryptography, Diffie-Hellman key exchange, elliptic curve function, and a RSA cryptosystem, among others. In some embodiments, the encryption keys identified may include a set of private encryption keys and a set of public encryption keys for the corresponding client terminals. Each private encryption key may correspond to one of the data fields and may be associated with one of the client terminals that provided the attribute to the data field. Each public encryption key may correspond to one of the data fields and may be associated with one of the client terminals that provided the attribute to the data field. In some embodiments, the server may retrieve, collect, or aggregate the encryption keys (e.g., public encryption keys) from the client terminals involved in the single transaction. Each encryption key aggregated by the server may be generated by one of the client terminals that provided the attribute to the data field in the electronic document. In some embodiments, a new encryption key may be identified for a data field that is updated using the attribute from one of the client terminals.

The method 3600 may include distributing the encryption keys (3615). The server may provide, deliver, distribute the encryption keys across the client terminals involved in the single transaction for the electronic document in accordance with the access control policy. The access control policy may specify access permissions (e.g., decrypt, open, write, or edit) for client terminals (or corresponding roles) to each data field in the electronic document. The access control policy may specify the access permissions based on a role of the individual client terminal. For each of the data fields in the electronic document, the access control policy may indicate at least two client terminals (or corresponding roles) have access to the data field.

In distributing, the server may provide a corresponding private encryption key to each of the client terminals involved in the single transaction. The private encryption key may be used to encrypt or decrypt the data field provided by the corresponding client terminal. In some embodiments, the server may identify two or more client terminals involved in the single transaction based on respective roles in accordance with the access control policy. For example, a first role associated with a first client terminal and a second role associated with a second client terminal may be specified by the access control policy as having access to one of the data fields in the electronic document. The server may encrypt an encryption key (e.g., the private encryption key) of the first client terminal using another encryption key (e.g., the public encryption key) of the second client terminal. Upon encryption, the server may provide the encryption key of first client terminal to the second client terminal.

Additionally, the server may provide a public encryption key to one or more of the client terminals in accordance with the access control policy. For example, the access control policy may specify for one of the data fields that two client terminals have permission to access the attribute in the data field. In this example, the server may provide the public encryption key to the two client terminals. In this manner, each of the data fields in the electronic document may be accessible by one or more of the client terminals using the private encryption key or the public encryption key provided to the client terminals.

In some embodiments, the server may determine whether a distribution of the encryption keys across the client terminals is successful. The server may transmit, send, or provide a message (e.g., an event notification) to one or more of the client terminals based on the determination. When the determination is that the distribution is successful, the server may publish or provide a success code to one or more of the client terminals, such as the client terminal that sent the request to update one of the data fields in the electronic document. Conversely, when the determination is that the distribution is unsuccessful, the server may publish or provide an error code to one or more of the client terminals.

In some embodiments, the server may identify a hash value derived from a corresponding attribute in one of the data fields in the electronic document. The hash value may be generated using a hash function, such as a cyclic redundancy check, a checksum, a cryptographic hash function, and a message authentication code, among others. The hash value may be generated by the client terminal that provided the attribute to the data field in the electronic document. The hash value may be to ensure data integrity of the attribute assigned to the data field in the electronic document. The server may also distribute the hash value across the client terminals in accordance with the access control policy.

In some embodiments, the server may receive or identify a signature for each client terminal of the client terminals involved in the single transaction. The signature may be generated by applying the encryption key corresponding to the client terminal to the hash value derived from the attribute of the data field provided by the client terminal. The signature may be generated by the server or the client terminal that provided the attribute. The signature may be to ensure data integrity of the attribute in the data field in the electronic document.

The method 3600 may include providing access (3620). The server may provide access to each client terminal access to one or more of the data fields in the electronic document using the encryption keys distributed in accordance with the access control policy. In some embodiments, the server may import, provide, generate and/or maintain the attributes of the data fields or the electronic document. In some embodiments, the server may receive a request to access one or more data fields of the electronic document using an identifier (e.g., a shipping document identifier, or booking number, carrier organization) from one of the client terminals. The server may determine whether the electronic document referenced by the identifier exists on the database. When the electronic document is determined to not exist, the server may return an error message. Conversely, when the electronic document is determined to exist, the server may continue to verify whether the client terminal has access to the data fields. Each client terminal may be able to access the data fields to which the client terminal provided the attribute using a corresponding encryption key provided to the client terminal. In addition, each client terminal may be able to access the data fields using a corresponding encryption key provided to the client terminal as specified by the access control policy.

In some embodiments, the server may provide access to one of the data fields in the electronic document to two or more client terminals identified based on the roles in accordance with the access control policy. Each of the identified clients may have been provided with the hash value and the signature for the data field in the electronic document. The hash value may be derived from the attribute in the data field and the signature may be generated using the hash value and the encryption key (e.g., the public encryption key) of the client terminal that provided the attribute. Via the hash value and the signature, the other client terminal may obtain the encryption key to access the attribute in the data field. The other client terminal may calculate the hash value from the encrypted attribute, and decrypt the signature using the hash value to obtain the decrypted hash value. The client terminal may then compare the decrypted hash value with the hash value to determine integrity. When the hash values match, the client terminal may determine that the attribute has data integrity. Otherwise, when the hash values do not match, the client terminal may determine that the attribute lacks data integrity.

Figure 37:
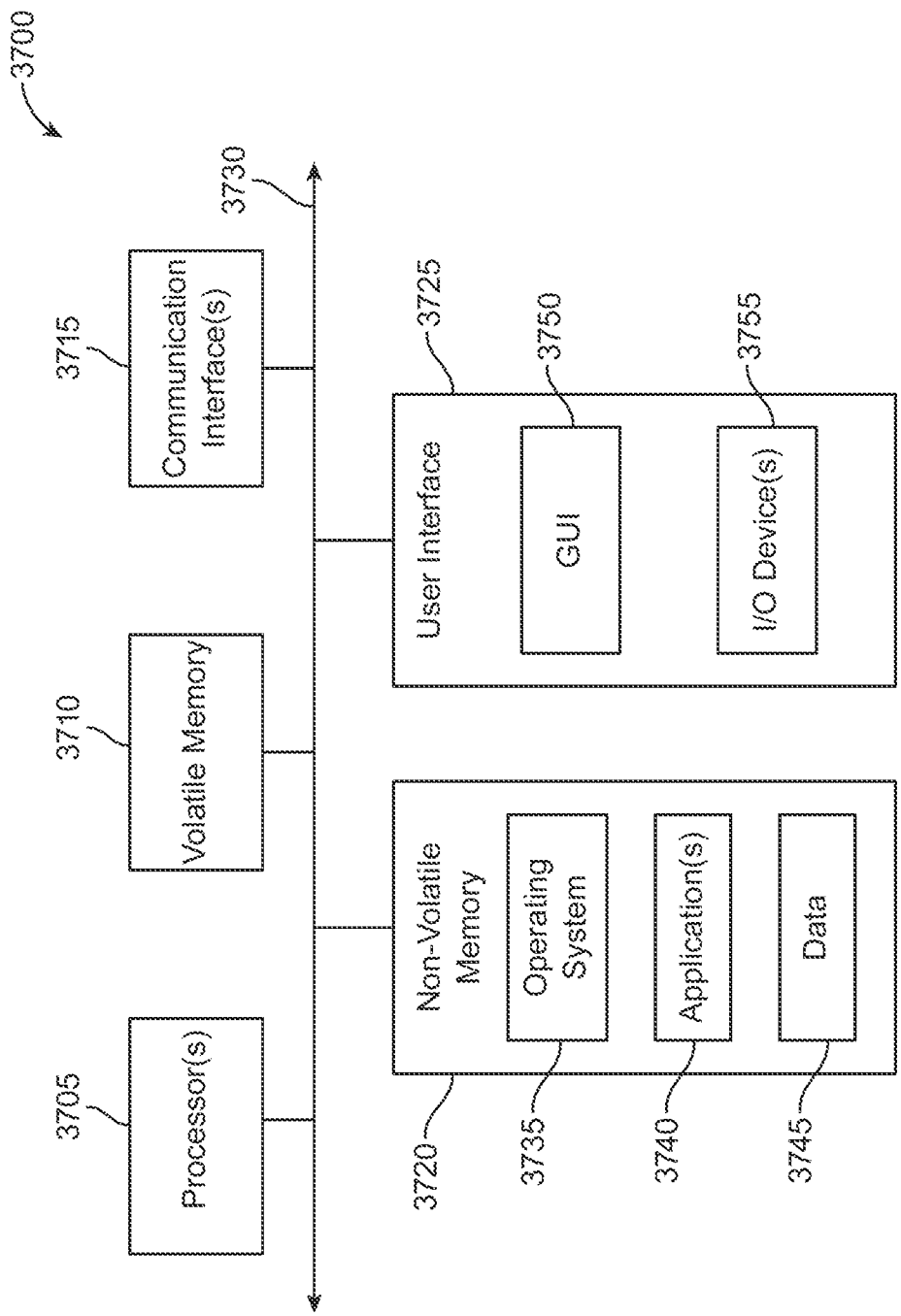
FIG. 37 is a block diagram of embodiments of a computing device.

Referring now to FIG. 37, computer 3700 may include one or more processors 3705, volatile memory 3710 (e.g., random access memory (RAM)), non-volatile memory 3720 (e.g., one or more hard disk drives (HDDs) or other magnetic or optical storage media, one or more solid state drives (SSDs) such as a flash drive or other solid state storage media, one or more hybrid magnetic and solid state drives, and/or one or more virtual storage volumes, such as a cloud storage, or a combination of such physical storage volumes and virtual storage volumes or arrays thereof), user interface (UI) 3725, one or more communications interfaces 3715, and communication bus 3730. User interface 3725 may include graphical user interface (GUI) 3750 (e.g., a touchscreen, a display, etc.) and one or more input/output (I/O) devices 3755 (e.g., a mouse, a keyboard, a microphone, one or more speakers, one or more cameras, one or more biometric scanners, one or more environmental sensors, one or more accelerometers, etc.). Non-volatile memory 3720 stores operating system 3735, one or more applications 3740, and data 3745 such that, for example, computer instructions of operating system 3735 and/or applications 3740 are executed by processor(s) 3705 out of volatile memory 3710. In some embodiments, volatile memory 3710 may include one or more types of RAM and/or a cache memory that may offer a faster response time than a main memory. Data may be entered using an input device of GUI 3750 or received from I/O device(s) 3755. Various elements of computer 3700 may communicate via one or more communication buses, shown as communication bus 3730.

Computer 3700 as shown in FIG. 37 is shown merely as an example, as clients, servers, intermediary and other networking devices and may be implemented by any computing or processing environment and with any type of machine or set of machines that may have suitable hardware and/or software capable of operating as described herein. Processor(s) 3705 may be implemented by one or more programmable processors to execute one or more executable instructions, such as a computer program, to perform the functions of the system. As used herein, the term "processor" describes circuitry that performs a function, an operation, or a sequence of operations. The function, operation, or sequence of operations may be hard coded into the circuitry or soft coded by way of instructions held in a memory device and executed by the circuitry. A "processor" may perform the function, operation, or sequence of operations using digital values and/or using analog signals. In some embodiments, the "processor" can be embodied in one or more application specific integrated circuits (ASICs), microprocessors, digital signal processors (DSPs), graphics processing units (GPUs), microcontrollers, field programmable gate arrays (FPGAs), programmable logic arrays (PLAs), multi-core processors, or general-purpose computers with associated memory. The "processor" may be analog, digital or mixed-signal. In some embodiments, the "processor" may be one or more physical processors or one or more "virtual" (e.g., remotely located or "cloud") processors. A processor including multiple processor cores and/or multiple processors multiple processors may provide functionality for parallel, simultaneous execution of instructions or for parallel, simultaneous execution of one instruction on more than one piece of data.

Communications interfaces 3715 may include one or more interfaces to enable computer 3700 to access a computer network such as a Local Area Network (LAN), a Wide Area Network (WAN), a Personal Area Network (PAN), or the Internet through a variety of wired and/or wireless or cellular connections.

Embodiments of the subject matter and the operations described in this specification may be implemented in digital electronic circuitry, or in computer software, firmware, or hardware, including the structures disclosed in this specification and their structural equivalents, or in combinations of one or more of them. Embodiments of the subject matter described in this specification may be implemented as one or more computer programs, i.e., one or more modules of computer program instructions, encoded on one or more computer storage medium for execution by, or to control the operation of, data processing apparatus, such as a processing circuit. A controller or processing circuit such as CPU may comprise any digital and/or analog circuit components configured to perform the functions described herein, such as a microprocessor, microcontroller, application-specific integrated circuit, programmable logic, etc. Alternatively or in addition, the program instructions may be encoded on an artificially generated propagated signal, e.g., a machine-generated electrical, optical, or electromagnetic signal, that is generated to encode information for transmission to suitable receiver apparatus for execution by a data processing apparatus.

A computer storage medium may be, or be included in, a computer-readable storage device, a computer-readable storage substrate, a random or serial access memory array or device, or a combination of one or more of them. Moreover, while a computer storage medium is not a propagated signal, a computer storage medium may be a source or destination of computer program instructions encoded in an artificially generated propagated signal. The computer storage medium may also be, or be included in, one or more separate components or media (e.g., multiple CDs, disks, or other storage devices). Accordingly, the computer storage medium is both tangible and non-transitory.

The operations described in this specification may be implemented as operations performed by a data processing apparatus on data stored on one or more computer-readable storage devices or received from other sources. The term "data processing apparatus" or "computing device" encompasses all kinds of apparatus, devices, and machines for processing data, including by way of example a programmable processor, a computer, a system on a chip, or multiple ones, or combinations, of the foregoing The apparatus may include special purpose logic circuitry, e.g., an FPGA (field programmable gate array) or an ASIC (application specific integrated circuit). The apparatus may also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment may realize various different computing model infrastructures, such as web services, distributed computing and grid computing infrastructures.

A computer program (also known as a program, software, software application, script, or code) may be written in any form of programming language, including compiled or interpreted languages, declarative or procedural languages, and it may be deployed in any form, including as a stand-alone program or as a module, component, subroutine, object, or other unit suitable for use in a computing environment. A computer program may, but need not, correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one computer or on multiple computers that are located at one site or distributed across multiple sites and interconnected by a communication network.

The processes and logic flows described in this specification may be performed by one or more programmable processors executing one or more computer programs to perform actions by operating on input data and generating output. The processes and logic flows may also be performed by, and apparatus may also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer may be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory may be supplemented by, or incorporated in, special purpose logic circuitry.

To provide for interaction with a user, embodiments of the subject matter described in this specification may be implemented on a computer having a display device, e.g., a CRT (cathode ray tube) or LCD (liquid crystal display) monitor, OLED (organic light emitting diode) monitor or other form of display for displaying information to the user and a keyboard and/or a pointing device, e.g., a mouse or a trackball, by which the user may provide input to the computer. Other kinds of devices may be used to provide for interaction with a user as well; for example, feedback provided to the user may be any form of sensory feedback, e.g., visual feedback, auditory feedback, or tactile feedback; and input from the user may be received in any form, including acoustic, speech, or tactile input. In addition, a computer may interact with a user by sending documents to and receiving documents from a device that is used by the user; for example, by sending web pages to a web browser on a user's client device in response to requests received from the web browser.

While this specification contains many specific embodiment details, these should not be construed as limitations on the scope of any embodiments or of what may be claimed, but rather as descriptions of features specific to particular embodiments. Certain features described in this specification in the context of separate embodiments can also be implemented in combination in a single embodiment. Conversely, various features described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a sub combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated in a single software product or packaged into multiple software products.

References to "or" may be construed as inclusive so that any terms described using "or" may indicate any of a single, more than one, and all of the described terms.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain embodiments, multitasking and parallel processing may be advantageous.

Having described certain embodiments of the methods and systems, it will now become apparent to one of skill in the art that other embodiments incorporating the concepts may be used. It should be understood that the systems described above may provide multiple ones of any or each of those components and these components may be provided on either a standalone machine or, in some embodiments, on multiple machines in a distributed system. The systems and methods described above may be implemented as a method, apparatus or article of manufacture using programming and/or engineering techniques to produce software, firmware, hardware, or any combination thereof. In addition, the systems and methods described above may be provided as one or more computer-readable programs embodied on or in one or more articles of manufacture. The term "article of manufacture" as used herein is intended to encompass code or logic accessible from and embedded in one or more computer-readable devices, firmware, programmable logic, memory devices (e.g., EEPROMs, ROMs, PROMs, RAMs, SRAMs, etc.), hardware (e.g., integrated circuit chip, Field Programmable Gate Array (FPGA), Application Specific Integrated Circuit (ASIC), etc.), electronic devices, a computer readable non-volatile storage unit (e.g., CD-ROM, floppy disk, hard disk drive, etc.). The article of manufacture may be accessible from a file server providing access to the computer-readable programs via a network transmission line, wireless transmission media, signals propagating through space, radio waves, infrared signals, etc. The article of manufacture may be a flash memory card or a magnetic tape. The article of manufacture includes hardware logic as well as software or programmable code embedded in a computer readable medium that is executed by a processor. In general, the computer-readable programs may be implemented in any programming language, such as LISP, PERL, C, C++, C#, PROLOG, or in any byte code language such as JAVA. The software programs may be stored on or in one or more articles of manufacture as object code.

What is claimed is:

1. A method of securely sharing data from multiple sources with different client terminals, the method comprising:

establishing, by at least one server having one or more processors, a shipping document defining a plurality of data attributes for a plurality of shipment parties, the shipping document having a plurality of data fields, each of the plurality of data fields to be associated with one of a plurality of client terminals each corresponding to one of the plurality of shipment parties;

identifying, by the at least one server, at least one encryption key to encrypt the at least one data field from the plurality of data fields included in the shipping document, to form an encrypted data field;

distributing, by the at least one server, the at least one encryption key to at least one of the plurality of client terminals in accordance with an access control policy, the access control policy specifying access permissions for a corresponding client terminal of the plurality of client terminals to one or more of the plurality of data fields, according to a shipment role of a corresponding shipment party in the shipping document; and distributing, by the at least one server, to at least one of the plurality of client terminals, the encrypted data field in the shipping document along with the at least one encryption key, in accordance with the access control policy.

2. The method of claim 1, wherein establishing the shipping document further comprises:

receiving, from a first client terminal of the plurality of client terminals, a request to update an attribute of a first data field of the plurality of the data fields in the shipping document;

determining, in accordance with the access control policy based on a role of the first client terminal in the booking, that the first client terminal has permission to modify the first data field; and permitting, responsive to determining that the first client terminal has the permission, the client terminal to update the attribute of the first data field in the shared shipping document.

3. The method of claim 1, wherein identifying the at least one encryption key further comprises identifying, for the plurality of client terminals, a private encryption key and a public encryption key; and wherein distributing the encryption key further comprises:

providing the private encryption key to a corresponding client terminal of the plurality of client terminals; and providing the public encryption key to at least one of the plurality of client terminals in accordance with the access control policy, at least one of the plurality of data fields in the electronic document accessible by at least two of the plurality of client terminals using at the private encryption key and the public encryption key.

4. The method of claim 1, further comprising:

identifying, by the at least one server, a plurality of hash values derived from a corresponding plurality of attributes in the plurality of data fields of the shared shipping document, each hash value of the plurality of hash values to ensure data integrity of one of the plurality of attributes; and generating, by the at least one server, for a first client terminal of the plurality of client terminals, a first signature using a first hash value of the plurality of hash values and a first encryption key of the plurality of encryption keys, the first hash value derived from a first attribute of the plurality of attributes, wherein the first encryption key is for a first data field of the plurality of data fields corresponding to the first attribute, the first signature to ensure data integrity of the first attribute and the first data field.

5. The method of claim 1, further comprising:

determining, by the at least one server, whether the at least one of the plurality of encryption keys and at least one of the encrypted data fields are distributed successfully across the plurality of client terminals; and providing, by the at least one server, based on a determination of whether the encryption key and the encrypted data field are distributed successfully, an event notification to at least one of the plurality of client terminals.

6. The method of claim 1, wherein the shipment of freight is an intermodal container.

7. A system for securely sharing data from multiple sources with different client terminals, comprising:

at least one server having one or more processors configured to:

establish a shared shipping document for defining at least one parameter for a shipment of freight, the shared shipping document comprising a series of data entries for a plurality of shipment parties, the shared shipping document having a plurality of data fields, each of the plurality of data fields to be associated with one of a plurality of client terminals each corresponding to one of the plurality of shipment parities;

identify a plurality of encryption keys to encrypt the corresponding plurality of data fields included in the shared shipping document;

distribute the plurality of encryption keys across the plurality of client terminals in accordance with an access control policy, the access control policy specifying access permissions for a corresponding client terminal of the plurality of client terminals to one or more of the plurality of data fields, according to a shipment role of a corresponding shipment party in the booking; and provide each of the plurality of client terminals with access to at least one of the plurality of data fields in the electronic document via the plurality of encryption keys distributed in accordance with the access control policy.

8. The system of claim 7, wherein the at least one server is further configured to:

receive, from a first client terminal of the plurality of client terminals, a request to update an attribute of a first data field of the plurality of the data fields in the shared shipping document;

determine, in accordance with the access control policy based on a role of the first client terminal in the single booking, that the first client terminal has permission to modify the first data field; and permit, responsive to determining that the first client terminal has the permission, the client terminal to update the attribute of the first data field in the electronic document.

9. The system of claim 7, wherein the at least one server is further configured to identify the at least one encryption key by identifying, for the plurality of client terminals, a private encryption key and a public encryption key; and wherein the at least one server is further configured to distribute the encryption key by:

providing the private encryption key to a corresponding client terminal of the plurality of client terminals; and providing the public encryption key to at least one of the plurality of client terminals in accordance with the access control policy, at least one of the plurality of data fields in the electronic document accessible by at least two of the plurality of client terminals using at the private encryption key and the public encryption key.

10. The system of claim 7, wherein the at least one server is further configured to:

identify a plurality of hash values derived from a corresponding plurality of attributes in the plurality of data fields of the shared shipping document, each hash value of the plurality of hash values to ensure data integrity of one of the plurality of attributes; and generate, for a first client terminal of the plurality of client terminals, a first signature using a first hash value of the plurality of hash values and a first encryption key of the plurality of encryption keys, the first hash value derived from a first attribute of the plurality of attributes, wherein the first encryption key is for a first data field of the plurality of data fields corresponding to the first attribute, the first signature to ensure data integrity of the first attribute and the first data field.

11. The system of claim 7, wherein the at least one server is further configured to:

determine whether the at least one of the plurality of encryption keys and at least one of the encrypted data fields are distributed successfully across the plurality of client terminals; and provide, based on a determination of whether the encryption key and the encrypted data field are distributed successfully, an event notification to at least one of the plurality of client terminals.

12. The system of claim 7, wherein the shipment of freight is an intermodal container.

13. A non-transitory computer readable medium storing instructions, which when executed by at least one processor, cause the at least one processor to:

establish a shared shipping document for defining at least one parameter for a shipment of freight, the shared shipping document comprising a series of data entries for a plurality of shipment parties, the shared shipping document having a plurality of data fields, each of the plurality of data fields to be associated with one of a plurality of client terminals each corresponding to one of the plurality of shipment parities;

identify a plurality of encryption keys to encrypt the corresponding plurality of data fields included in the shared shipping document;

distribute the plurality of encryption keys across the plurality of client terminals in accordance with an access control policy, the access control policy specifying access permissions for a corresponding client terminal of the plurality of client terminals to one or more of the plurality of data fields, according to a shipment role of a corresponding shipment party in the booking; and provide each of the plurality of client terminals with access to at least one of the plurality of data fields in the electronic document via the plurality of encryption keys distributed in accordance with the access control policy.

14. The non-transitory computer readable medium of claim 13, wherein the instructions further cause the at least one processor to:

receive, from a first client terminal of the plurality of client terminals, a request to update an attribute of a first data field of the plurality of the data fields in the shared shipping document;

determine, in accordance with the access control policy based on a role of the first client terminal in the single booking, that the first client terminal has permission to modify the first data field; and permit, responsive to determining that the first client terminal has the permission, the client terminal to update the attribute of the first data field in the electronic document.

15. The non-transitory computer readable medium of claim 13, wherein the instructions cause the at least one processor to identify the at least one encryption key by identifying, for the plurality of client terminals, a private encryption key and a public encryption key; and wherein the instructions further cause the at least one processor to distribute the encryption key by:

providing the private encryption key to a corresponding client terminal of the plurality of client terminals; and providing the public encryption key to at least one of the plurality of client terminals in accordance with the access control policy, at least one of the plurality of data fields in the electronic document accessible by at least two of the plurality of client terminals using at the private encryption key and the public encryption key.

16. The non-transitory computer readable medium of claim 13, wherein the instructions further cause the at least one processor to:

identify a plurality of hash values derived from a corresponding plurality of attributes in the plurality of data fields of the shared shipping document, each hash value of the plurality of hash values to ensure data integrity of one of the plurality of attributes; and generate, for a first client terminal of the plurality of client terminals, a first signature using a first hash value of the plurality of hash values and a first encryption key of the plurality of encryption keys, the first hash value derived from a first attribute of the plurality of attributes, wherein the first encryption key is for a first data field of the plurality of data fields corresponding to the first attribute, the first signature to ensure data integrity of the first attribute and the first data field.

17. The non-transitory computer readable medium of claim 13, wherein the instructions further cause the at least one processor to:

determine whether the at least one of the plurality of encryption keys and at least one of the encrypted data fields are distributed successfully across the plurality of client terminals; and provide, based on a determination of whether the encryption key and the encrypted data field are distributed successfully, an event notification to at least one of the plurality of client terminals.

18. The non-transitory computer readable medium of claim 13, wherein the shipment of freight is an intermodal container.

* * * * *